US012807054B2

(12) United States Patent
Oshino et al.

(10) Patent No.: US 12,807,054 B2
(45) Date of Patent: Nov. 24, 2026

(54) SEAT DEVICE FOR VEHICLE

(71) Applicant: TS TECH CO., LTD., Asaka (JP)

(72) Inventors: Yuta Oshino, Tochigi (JP); Jinichi Tanabe, Tochigi (JP); Munetaka Kowa, Tochigi (JP); Takayoshi Ito, Tochigi (JP); Yuki Yoshioka, Tochigi (JP); Kazuya Takahashi, Tochigi (JP); Tsutomu Matsuzaki, Tochigi (JP); Hidenori Kanai, Tochigi (JP); Ryosuke Takeda, Tochigi (JP)

(73) Assignee: TS TECH CO., LTD., Asaka (JP)

( * ) Notice: Subject to any disclaimer, the term of this patent is extended or adjusted under 35 U.S.C. 154(b) by 364 days.

(21) Appl. No.: 18/263,816

(22) PCT Filed: Jan. 7, 2022

(86) PCT No.: PCT/JP2022/000298

§ 371 (c)(1),
(2) Date: Oct. 14, 2024

(87) PCT Pub. No.: WO2022/168527

PCT Pub. Date: Aug. 11, 2022

(65) Prior Publication Data

US 2025/0033544 A1 Jan. 30, 2025

(30) Foreign Application Priority Data

Feb. 4, 2021 (JP) ................................ 2021-016191
Feb. 4, 2021 (JP) ................................ 2021-016203
(Continued)

(51) Int. Cl.
*B60N 2/90* (2018.01)

(52) U.S. Cl.
CPC .......... *B60N 2/90* (2018.02); *B60N 2002/981* (2018.02); *B60N 2210/00* (2023.08)

(58) Field of Classification Search
CPC . B60N 2/90; B60N 2002/981; B60N 2210/00
(Continued)

(56) References Cited

U.S. PATENT DOCUMENTS

| | | | |
|---|---|---|---|
| 5,842,738 | A | 12/1998 | Knoll et al. |
| 6,974,174 | B2 | 12/2005 | Imajo et al. |

(Continued)

FOREIGN PATENT DOCUMENTS

| | | | |
|---|---|---|---|
| FR | 3082469 | A1 | 12/2019 |
| JP | H07038734 | Y | 9/1995 |

(Continued)

OTHER PUBLICATIONS

International Search Report (with English translation) for Application No. PCT/JP2022/000298, dated Mar. 22, 2022, 4 pages.
(Continued)

*Primary Examiner* — Jose V Chen
(74) *Attorney, Agent, or Firm* — Dority & Manning, P.A.

(57) ABSTRACT

The air cells of the seat cushion are vibrated with a higher intensity than those of the seat back when the reclining angle is smaller than a predetermined value, and the air cells of the seat back are vibrated with a higher intensity than those of the seat cushion when the reclining angle is equal to or greater than the predetermined value.

9 Claims, 53 Drawing Sheets

(30) Foreign Application Priority Data

| | | | |
|---|---|---|---|
| Feb. 5, 2021 | (JP) | ................................ | 2021-017079 |
| Feb. 5, 2021 | (JP) | ................................ | 2021-017092 |
| Feb. 5, 2021 | (JP) | ................................ | 2021-017199 |
| Mar. 19, 2021 | (JP) | ................................ | 2021-046479 |
| Mar. 25, 2021 | (JP) | ................................ | 2021-051540 |

(58) Field of Classification Search
USPC ....................................................... 297/217.3
See application file for complete search history.

(56) References Cited

U.S. PATENT DOCUMENTS

| | | | | |
|---|---|---|---|---|
| 7,967,381 | B2 * | 6/2011 | Sugiyama | B60N 2/665 297/284.4 |
| 8,403,242 | B2 | 3/2013 | Ohno | |
| 8,403,272 | B2 | 3/2013 | Ohno | |
| 9,862,312 | B2 | 1/2018 | Sivak et al. | |
| 10,034,631 | B1 * | 7/2018 | Gallagher | B60N 2/0023 |
| 10,414,303 | B2 | 9/2019 | Fujikake et al. | |
| 10,796,507 | B2 | 10/2020 | Motomura et al. | |
| 11,617,451 | B1 * | 4/2023 | Caruso | A47C 7/462 297/217.3 |
| 11,682,256 | B2 * | 6/2023 | Ruggiero | G06Q 20/4015 297/217.3 |
| 2002/0101109 | A1 | 8/2002 | Stiller et al. | |
| 2007/0236363 | A1 | 10/2007 | Hamada et al. | |
| 2014/0008948 | A1 * | 1/2014 | Rockwell | B60N 2/0035 297/217.3 |
| 2014/0015293 | A1 * | 1/2014 | Pellenz | A61H 23/04 297/217.3 |
| 2015/0008710 | A1 * | 1/2015 | Young | B60N 2/0276 297/217.3 |
| 2015/0127225 | A1 * | 5/2015 | Honda | B60R 21/01516 701/45 |
| 2016/0157041 | A1 | 6/2016 | Shiozawa et al. | |
| 2018/0161537 | A1 * | 6/2018 | Ketels | B60N 2/99 |
| 2018/0304774 | A1 * | 10/2018 | Mizoi | B60N 2/003 |
| 2018/0334097 | A1 * | 11/2018 | Ishibashi | B60Q 9/00 |
| 2018/0345837 | A1 | 12/2018 | Catry et al. | |
| 2019/0160992 | A1 * | 5/2019 | Ishida | A61H 23/00 |
| 2019/0168771 | A1 * | 6/2019 | Migneco | B60W 30/09 |
| 2019/0176696 | A1 * | 6/2019 | Iwasaki | B60N 2/90 |
| 2020/0062271 | A1 * | 2/2020 | Onuma | B60H 1/00735 |
| 2021/0001876 | A1 * | 1/2021 | Ichimaru | A47C 7/72 |
| 2021/0039538 | A1 * | 2/2021 | Hashimoto | B60N 2/0031 |
| 2021/0331612 | A1 | 10/2021 | Sakota et al. | |
| 2022/0288490 | A1 * | 9/2022 | Kaku | A63F 13/428 |
| 2022/0289088 | A1 * | 9/2022 | Michielan | B60N 2/0296 |
| 2022/0332235 | A1 * | 10/2022 | Bennis | B60N 2/70 |
| 2022/0340063 | A1 * | 10/2022 | Soltner | B60N 2/64 |
| 2022/0388529 | A1 * | 12/2022 | Chang | G06V 10/82 |
| 2023/0075857 | A1 * | 3/2023 | Sato | B60N 2/90 |
| 2023/0166638 | A1 * | 6/2023 | Kotani | B60N 2/0029 701/49 |
| 2023/0219517 | A1 * | 7/2023 | Cheng | B60N 2/002 280/743.1 |

FOREIGN PATENT DOCUMENTS

| | | | |
|---|---|---|---|
| JP | H09182644 | A | 7/1997 |
| JP | 2005-296452 | A | 10/2005 |
| JP | 2010090906 | A | 4/2010 |
| JP | 2011020539 | A | 2/2011 |
| JP | 2012-065728 | A | 4/2012 |
| JP | 2016060313 | A | 4/2016 |
| JP | 2016068667 | A | 5/2016 |
| JP | 2016203825 | A | 12/2016 |
| JP | 2018135075 | A | 8/2018 |
| JP | 2019-008734 | A | 1/2019 |
| JP | 2019202667 | A | 11/2019 |
| JP | 2020-001559 | A | 1/2020 |
| JP | 2020-011594 | A | 1/2020 |
| JP | 2021051540 | A | 4/2021 |
| JP | 2022120281 | A | 8/2022 |
| WO | WO 2006/008994 | A1 | 1/2006 |

OTHER PUBLICATIONS

Japanese Office Action (w/ English translation) for corresponding Application No. 2021-017092, dated Oct. 8, 2024, 8 pages.

Japanese Office Action (w/ English translation) for corresponding Application No. 2021-046479, dated Nov. 12, 2024, 10 pages.

Japanese Office Action (w/ English translation) for corresponding Application No. 2021-016203, dated Nov. 26, 2024, 6 pages.

Japanese Office Action (w/ English translation) for corresponding Application No. 2021-051540, dated Nov. 26, 2024, 9 pages.

Japanese Office Action (w/ English translation) for corresponding Application No. 2021-017079, dated May 14, 2024, 9 pages.

Japanese Office Action (w/English translation) for corresponding Application No. 2021-016191, dated Mar. 25, 2025, 6 pages.

Office Action (w/ English translation) in corresponding JP Application No. 2021-017092, dated Feb. 3, 2025, in 8 pgs.

Chinese Office Action (w/English translation) for corresponding Application No. 202280012123.X, dated Jul. 30, 2025, 17 pages.

Japanese Office Action (w/English translation) for corresponding Application No. 2021-016191, dated Aug. 26, 2025, 6 pages.

Japanese Office Action (w/English translation) for corresponding Application No. 2024-189759, dated Aug. 26, 2025, 12 pages.

Japanese Office Action (w/English translation) for corresponding Application No. 2025-082116, dated Aug. 4, 2026, 4 pages.

* cited by examiner (A)

(B)

(A)

(B)

(A)

(B)

(A)

(B)

(A)

(B)

(A)

(B)

SEAT DEVICE FOR VEHICLE

CROSS REFERENCE TO RELATED APPLICATIONS

This application is the U.S. National Stage entry of International Application No. PCT/JP2022/000298, filed on Jan. 7, 2022, which, in turn, claims priority to Japanese Patent Application No. 2021-016191, filed on Feb. 4, 2021; Japanese Patent Application No. 2021-016203, filed on Feb. 4, 2021; Japanese Patent Application No. 2021-017079, filed on Feb. 5, 2021; Japanese Patent Application No. 2021-017092, filed on Feb. 5, 2021; Japanese Patent Application No. 2021-017199, filed on Feb. 5, 2021; Japanese Patent Application No. 2021-046479, filed on Mar. 19, 2021; and Japanese Patent Application No. 2021-051540, filed on Mar. 25, 2021, all of which are hereby incorporated herein by reference in their entireties for all purposes.

TECHNICAL FIELD

The present invention relates to a seat device for a vehicle, and in particular to a seat device for a vehicle that can be reclined.

BACKGROUND ART

Known seat devices for vehicles such as automobiles include those configured to apply stimulations such as compression and pressure onto the lumbar vertebrae and thoracic vertebrae of the seated occupant from behind at a prescribed cyclic interval by using air cells or the like provided in the seat back so as to induce the seat occupant to breath at a prescribed cyclic interval suitable for the seat occupant to relax. See Patent Documents 1 and 2, for instance.

A known driving assistance device prevents the reduction in the consciousness of a driver seated in a driver's seat by applying a vibratory stimulation to the driver by using a vibration generator provided in the seat cushion and the seat back of the driver's seat. See Patent Document 3, for instance.

PRIOR ART DOCUMENT(S)

Patent Document(s)

Patent Document 1: JP2005-296452A
Patent Document 2: JP2012-65728A
Patent Document 3: JP2019-8734A

SUMMARY OF THE INVENTION

Task to be Accomplished by the Invention

A seat occupant may be prevented from suffering from motion sickness if the seat occupant is made aware of the behavior of the vehicle by vibration applied from the seat cushion or the seat back, and is thereby enabled to adapt to the behavior of the vehicle.

A primary task of the present invention is to minimize motion sickness of a seat occupant by making the seat occupant to be aware of the behavior of the vehicle by vibration applied from the seat cushion or the seat back, and in particular to appropriately make an occupant of a reclining vehicle seat, that can change the tilt angle of the seat back relative to the seat cushion, to be aware of the behavior of the vehicle without regard to the tilt angle of the seat back relative to the seat cushion.

Means to Accomplish the Task

A vehicle seat device (10) according to an embodiment of the present invention comprises a seat main body (20) provided with a seat cushion (22) and a seat back (26) connected to a rear part of the seat cushion so as to be able to change a tilt angle thereof about a horizontal axis, wherein the vehicle seat device further comprises a plurality of vibration generators (30, 32) provided in the seat cushion and the seat back and configured to apply a vibrational stimulus to a seated occupant; a tilt angle detection unit (66) for detecting the tilt angle of the seat back relative to the seat cushion; a behavior detection unit (60, 62) for detecting a behavior of the vehicle; and a control unit (50) configured to receive the tilt angle detected by the tilt angle detection unit and the behavior of the vehicle detected by the behavior detection unit, and activate the vibration generators of the seat cushion and the seat back when the vehicle behavior that is received meets a prescribed behavior criterion in such a manner that the vibration generators of the seat cushion vibrate with a greater intensity than the vibration generators of the seat back when the tilt angle is less than a predetermined value, and the vibration generators of the seat back vibrate with a greater intensity than the vibration generators of the seat cushion when the tilt angle is equal to or greater than the predetermined value.

The prescribed behavior criterion may be related to an acceleration/deceleration, a yaw movement, or the like which tends to cause motion sickness to the seat occupant.

According to this configuration, regardless of the tilt angle of the seat back with respect to the seat cushion, the behavior of the vehicle is accurately notified to the seated occupant by means of vibration.

In this vehicle seat device, preferably, the behavior detection unit includes an acceleration detection unit (60) for detecting an acceleration of the vehicle, and the control unit causes an intensity of the vibration generated by the vibration generators to be greater when the acceleration is high than when the acceleration is low.

According to this configuration, the amplitude of the acceleration of the vehicle can be notified to the seat occupant by the intensity of the vibration.

In this vehicle seat device, preferably, the behavior detection unit includes a steering angle detection unit (62) for detecting a steering angle of the vehicle, and the control unit causes an intensity of the vibration generated by the vibration generators to be greater when the steering angle is large than when the steering angle is small.

According to this configuration, the severity of the cornering of the vehicle can be notified to the seat occupant by the intensity of the vibration.

In this vehicle seat device, preferably, the control unit includes an input unit (52) that accepts an input of navigation information including current location information of the vehicle and travel route information of the vehicle on map data from a navigation device (70) mounted on the vehicle, and the control unit causes an intensity of the vibration generated by the vibration generators to be greater when a curvature of a road on the travel route at a current location or a predetermined distance ahead of the current location is equal to or greater than a predetermined value than when the curvature is less than the predetermined value.

According to this configuration, the severity of the cornering of the vehicle can be notified to the seat occupant by the intensity of the vibration.

In this vehicle seat device, preferably, the vehicle seat device further includes a vehicle speed detection unit for detecting a traveling speed of the vehicle, and the control unit increases an intensity of the vibration according to the detected traveling speed.

According to this configuration, the seat occupant is notified of the severity of cornering of the vehicle by the intensity of vibration in dependence on the traveling speed.

In this vehicle seat device, preferably, the vibration generators are configured to adjust an intensity of the vibration by changing at least one of an amplitude and a frequency of the vibration.

According to this configuration, the adjustment of the vibration intensity can be performed over a wide range.

In this vehicle seat device, preferably, the vibration generators are arranged laterally, and the information on the behavior of the vehicle includes information about a turning direction of the vehicle, the control unit intensifying the vibration of the vibration generators on a side toward which the vehicle is turning to be greater than the vibration of the vibration generators on a side away from which the vehicle is turning.

According to this configuration, the seat occupant is notified of the turning direction of the vehicle by means of vibration.

In this vehicle seat device, preferably, the vibration generators provided on the seat cushion include a one that applies a vibration stimulation to a hip of the seat occupant.

According to this configuration, deep breathing which is effective in mitigating motion sickness is induced to the seat occupant so that prevention of motion sickness is improved.

In this vehicle seat device, preferably, the vibration generators include air cells (30, 32) that are selectively inflated by being supplied with compressed air.

According to this configuration, vibrations can be applied to the seat occupant by using air pressure.

A notification device is known that informs vehicle occupants of the behavior of a vehicle by arranging speakers in four locations on the front, back, left, and right of a vehicle cabin, and controlling the volume of the sound issuing from the speakers according to the behavior of the vehicle (See WO2006/006553A, for instance).

The speakers are installed in the instrument panel, side door lining, rear tray, etc., so that the notification sound can reach the entire vehicle cabin. Therefore, the quietness of the cabin may be impaired by the notification sound. Conversely, if the notification sound is reduced in volume in order to maintain the quietness of the cabin, the notification sound may not be appropriately conveyed to the occupants.

Thus, there is a task to convey the turning direction of the vehicle when the vehicle is about to corner to the occupants appropriately without impairing the quietness of the cabin.

To accomplish this task, a vehicle seat device according to an embodiment of the present invention comprises a seat cushion (22), a seat back (26) connected to a rear part of the seat cushion, and a headrest (28) attached to the seat back, the vehicle seat device further comprising a left speaker (130) for issuing sound from a left side of a laterally central part of the headrest; a right speaker (132) for issuing sound from a right side of the laterally central part of the headrest; a behavior detection unit (60, 62) that detects turning behavior of the vehicle; and a control unit (50) that controls the left speaker to issue sound when the vehicle is turning left, and the right speaker to issue sound when the vehicle is turning right.

According to this configuration, the turning direction of the vehicle can be accurately conveyed to the seat occupant seated on the seat main body while maintaining the quietness of the cabin.

To accomplish this task, a vehicle seat device according to an embodiment of the present invention comprises a seat cushion (22), a seat back (26) connected to a rear part of the seat cushion, and a headrest (26) attached to the seat back (28), the vehicle seat device further comprising: a left speaker (130) for issuing sound from a left side of a laterally central part of the headrest; a right speaker (132) for using sound from a right side of a laterally central part of the headrest; a behavior detection unit (60, 62) that detects a turning behavior of the vehicle; and a control unit (50) for controlling the sound issuing from the left speaker and the right speaker so that a sound image moves from right to left along the headrest when the turning behavior consists of a left turn, and a sound image moves from left to right along the headrest when the turning behavior consists of a right turn.

According to this configuration, the turning direction of the vehicle can be accurately conveyed to the seat occupant seated on the seat main body by the moving direction of the sound image while maintaining the quietness of the cabin.

In this vehicle seat device, preferably, the behavior detection unit includes an acceleration detection unit (60) for detecting a lateral acceleration of the vehicle, and the control unit causes the sound image to move faster when the lateral acceleration is large than when the lateral acceleration is small.

According to this configuration, the seat occupant can recognize the degree of lateral acceleration from the moving speed of the sound image.

In this vehicle seat device, preferably, the behavior detection unit includes a steering angle detection unit (62) for detecting a steering angle of the vehicle, and the control unit causes the sound image to move faster when the steering angle is large than when the steering angle is small.

According to this configuration, the seat occupant can recognize the degree of turning from the moving speed of the sound image.

In this vehicle seat device, preferably, the control unit includes an input unit that accepts an input of navigation information including current location information of the vehicle and travel route information of the vehicle on map data from a navigation device (70) mounted on the vehicle, and causes the sound image to move faster when a curvature of a part of a road on the travel route of a current location of the vehicle or a predetermined distance ahead of the current location of the vehicle is equal to or greater than a predetermined value than when the curvature is less than the predetermined value.

According to this configuration, the seat occupant can recognize the curvature of the road when traveling on a curved road from the moving speed of the sound image.

Preferably, this vehicle seat device further includes a vehicle speed detection unit (64) for detecting a traveling speed of the vehicle, and the control unit causes the sound image to move faster according to an increase in the traveling speed of the vehicle.

According to this configuration, the seat occupant can recognize the vehicle speed from the moving speed of the sound image.

In a known vehicle seat device for use in automobiles or the likes which is provided with a headrest in an upper part of a seat back, the two side parts of the head rest are configured to be individually bent forward in such a manner that the right side of the headrest is bent forward when turning left, and the left side of the headrest is bent forward when turning right. By supporting the head of the seat occupant in this manner, the seat occupant is prevented from suffering from motion sickness (See JP2020-59349A, for instance).

However, this conventional vehicle seat device intended to reduce motion sickness involves a large displacement of the headrest in operation.

Therefore, in a vehicle seat device, there is a task to avoid the need for a large displacement of the headrest for reducing motion sickness.

Such a task may be accomplished by providing a vehicle seat device having a seat main body including a seat cushion (22), a seat back (26) connected to a rear part of the seat cushion, and a headrest (28) attached to the seat back, wherein the headrest includes a main part (229) for supporting the head of a seat occupant, and a neck support portion (233) provided in a lower part of the main part and configured to selectively protrude forward, and wherein the vehicle seat device is provided with a control unit (50) for controlling the neck support portion to protrude forward when acceleration or turning of the vehicle is detected by the behavior detection unit.

According to this configuration, motion sickness can be mitigated without requiring a large displacement of the headrest.

In this vehicle seat device, preferably, the neck support portion includes an air cell (232) that is inflated forward by being supplied with compressed air.

According to this configuration, the neck support portion has a simple structure.

In this vehicle seat device, preferably, the headrest includes an upper member (240) fixed to the seat back to form a main body, and a lower member (242) attached to a lower part of the upper member so as to be displaceable in a fore and aft direction to form the neck support portion, the neck support portion including a linear actuator (248) for displacing the lower member in the fore and aft direction with respect to the upper member.

With this configuration, the neck support portion can be accurately displaced in the fore and aft direction.

In this vehicle seat device, preferably, the behavior detection unit includes an acceleration detection unit (60) for detecting a fore and aft acceleration and a lateral direction of the vehicle, and the control unit cause the neck support portion to displace further forward when the accelerations are high than when the accelerations are low.

According to this configuration, the seated occupant can recognize the magnitude of the accelerations and is less prone to motion sickness.

In this vehicle seat device, preferably, the behavior detection unit includes a steering angle detection unit (62) for detecting a steering angle of the vehicle, and the control unit causes the neck support portion to displace further forward when the steering angle is large than when the steering angle is small.

According to this configuration, the seated occupant can recognize the magnitude of the steering angle, and is less prone to motion sickness.

In this vehicle seat device, preferably, the control unit includes an input unit that receives an input of navigation information including current location information of the vehicle and travel route information of the vehicle on map data from a navigation device (70) mounted on the vehicle, wherein the control unit causes the neck support portion to displace further forward when the curvature of a part of a road at a current location or at a certain distance ahead of the current location is equal to or greater than a predetermined value than when the curvature is smaller than the predetermined value.

According to this configuration, the seated occupant can recognize the curvature of the road on the travel route in advance, and is thereby less prone to motion sickness.

In this vehicle seat device, preferably, the control unit is configured to displace the neck support portion forward in an oscillatory manner.

According to this configuration, the seated occupant is less prone to motion sickness due to the oscillatory stimulation.

A motion sickness preventing system for vehicle occupants is known (JP2019-523657A, for example). This motion sickness preventing system comprises a light emitting array system including a plurality of light emitting devices.

The light array system may be installed in a pillar, roof, sidewall, door, floor, dashboard, console, window, etc. of a vehicle cabin along the fore and aft direction of the vehicle. The light array system includes light emitting devices which can be lighted so as to simulate the movement of the vehicle. Since the movement of the vehicle can be visually perceived, the incongruity between visual information and other sensory information obtained by the inner ear, etc. can be reduced so that the frequency and severity of motion sickness may be minimized.

However, in this motion sickness preventing system, since the light array system extends in the fore and aft direction, it is not possible to notify the occupants of the lateral movement of the vehicle by the light emitted from the light emitting devices.

Therefore, there is a task to provide a motion sickness preventing system that can easily and effectively notify the occupant of the lateral movement of the vehicle.

To accomplish such a task, a certain aspect of the present invention provides a motion sickness preventing system configured to be mounted on a vehicle which is provided with a front seat (305) and a rear seat (306) placed one behind another on a floor (4), the motion sickness preventing system, comprising: an acquisition device (321) for acquiring behavior information relating to a behavior of the vehicle; a seat back light emitting device (331) extending laterally on a back side of a seat back (309) of the front seat and configured to light a plurality of laterally arranged regions thereof individually; and a control unit (324) for controlling the seat back light emitting device, wherein the control unit is configured to determine a cornering behavior of the vehicle according to the behavior information acquired by the acquisition device, and to dynamically change a distribution of the regions that are lighted so as to correspond to the cornering behavior when the cornering behavior is determined.

According to this aspect, since the seat back light emitting device is provided so as to extend in the vehicle width direction, the distribution of the light emitting regions can be changed according to the movement of the vehicle in the lateral direction, and the occupant can be easily notified of the lateral movement mode of the vehicle.

In the above aspect of the present invention, preferably, the seat back light emitting device is positioned at an upper end part of the back side of the seat back of the front seat.

According to this aspect, the occupant can favorably recognize the light emission from the seat back light emitting device.

Further, in the above aspect of the present invention, preferably, the acquisition device includes an acceleration sensor (321A) that detects an acceleration of the vehicle, and the control unit dynamically changes the distribution of the regions that are lighted along an extending direction of the seat back light emitting device according to a lateral acceleration detected by the acceleration sensor.

According to this aspect, the occupant can recognize that an inertial force is being applied to the body of the occupant from the changes in the illuminated regions so that motion sickness can be prevented.

In the above aspect of the present invention, preferably, the seat back light emitting device includes a plurality of light emitting regions (331A) each capable of individually emitting light and arranged along a lateral direction of the vehicle.

According to this aspect, it is possible to dynamically change the light emitting regions of the seat back light emitting device by controlling the timing of lighting the light emitting regions.

In the above aspect of the present invention, preferably, the control unit causes the light emitting regions to blink or emit light sequentially from left to right when the acceleration sensor detects a leftward acceleration, and to blink or emit light sequentially from right to left when the acceleration sensor detects a rightward acceleration.

According to this aspect, the occupant can predict the direction of the inertial force applied to the body of the occupant from the mode of blinking or emitting light from the light emitting regions, so that motion sickness can be prevented.

In the above aspect of the present invention, preferably, the motion sickness preventing system further comprises a floor light emitting device (41) that extends in a fore and aft direction on a floor of the vehicle and is configured to light a plurality of regions thereof arranged along the fore and aft direction individually, and the control unit is configured to dynamically change a distribution of the lighted regions arranged along the fore and aft direction so as to correspond to a fore and aft acceleration detected by the acceleration sensor.

According to this aspect, the occupant can recognize a fore and aft inertial force that is applied to the body of the occupant from the change in the lighted regions of the floor light emitting device so that motion sickness can be prevented.

Further, in the above aspect of the present invention, preferably, the motion sickness preventing system further comprises a pillar light emitting device (43) that extends in a fore and aft direction along a front pillar (18), and is configured to light a plurality of regions thereof arranged along the fore and aft direction individually, and the control unit is configured to dynamically change a distribution of the lighted regions arranged along the fore and aft direction so as to correspond to a fore and aft acceleration detected by the acceleration sensor.

According to this aspect, the occupant can recognize a fore and aft inertial force that is applied to the body of the occupant from the change in the lighted regions of the pillar light emitting device so that motion sickness can be prevented.

In the above aspect of the present invention, preferably, the motion sickness preventing system further comprises a door light emitting device (45, 46) that extends in a fore and aft direction along a door trim (15, 16), and is configured to light a plurality of regions thereof arranged along the fore and aft direction individually, and the control unit is configured to dynamically change a distribution of the lighted regions arranged along the fore and aft direction so as to correspond to a fore and aft acceleration detected by the acceleration sensor.

According to this aspect, the occupant can recognize a fore and aft inertial force that is applied to the body of the occupant from the change in the lighted regions of the door light emitting device so that motion sickness can be prevented.

In the above aspect of the present invention, preferably, the motion sickness preventing system further comprises a pillar light emitting device (43) that extends in a fore and aft direction along a front pillar (18), and is configured to light a plurality of regions thereof arranged along the fore and aft direction individually, and a door light emitting device (45, 46) that extends in a fore and aft direction along a door trim (15, 16) located on a side of the rear seat, and is configured to light a plurality of regions thereof arranged along the fore and aft direction individually, and the control unit is configured to dynamically change a distribution of the lighted regions of the pillar light emitting device and the door light emitting device arranged along the fore and aft direction so as to correspond to a fore and aft acceleration detected by the acceleration sensor, the lighted regions of the pillar light emitting device being changed at a faster rate than those of the door light emitting device.

According to this aspect, since the driver perceives a higher acceleration than actually produced, the driver tends to decelerate the vehicle. Thereby, the driver is prevented from excessively accelerating the vehicle so that the safety of the vehicle is enhanced.

In the above aspect of the present invention, preferably, the motion sickness preventing system further comprises a front door light emitting device (345) that extends along a door trim (315) located opposite to a side of the front seat and extends in the fore and aft direction, and includes a plurality of regions extending along the door trim and configured to be lighted individually, and a rear door light emitting device (346) that extends along a door trim (15) located opposite to a side of the rear seat and extends in the fore and aft direction, and includes a plurality of regions extending along the door trim and configured to be lighted individually, wherein the control unit is configured to dynamically change a distribution of the lighted regions of the front door light emitting device and a distribution of the lighted regions of the rear door light emitting device in the fore and aft direction, the lighted regions of the front door light emitting device being changed at a faster rate than the lighted regions of the rear door light emitting device.

According to this aspect, since the driver perceives a higher acceleration than actually produced, the driver tends to decelerate the vehicle. Thereby, the driver is prevented from excessively accelerating the vehicle so that the safety of the vehicle is enhanced.

In the above aspect of the present invention, preferably, the acquisition device includes a navigation device (352) that acquires a current location of the vehicle and a planned travel route of the vehicle, and the control unit determines presence or absence of the turning behavior according to the current location of the vehicle and the planned travel route of the vehicle.

According to this aspect, the occupant can recognize in advance that an inertial force will be applied to the body of the occupant so that motion sickness can be prevented.

A driving assist system is a known that prevents the occurrence of motion sickness of a vehicle occupant due to an abrupt cessation of deceleration (See JP2020-11594A, for example) This driving assist system includes notification devices such as a speaker, a head-up display, and an onboard monitor. The notifications device notifies the occupant to prepare for the inertial force due to an abrupt cessation of deceleration so that the occupant can prepare for the inertia force due to the abrupt cessation of deceleration, and motion sickness of the occupant due to the abrupt cessation of deceleration can be prevented.

In this known driving assist system, when a notification is displayed on the head-up display or the onboard monitor, the occupant's line of sight is required to be directed to the head-up display or the onboard monitor. However, if the occupant is preoccupied with operating a terminal device such as a smartphone, it may not be easy for the occupant to direct the line of sight to the head-up display or the onboard monitor.

Thus, there is a task to provide a motion sickness preventing system that allows an occupant operating a terminal device to easily understand that an inertial force is about to be applied.

In order to accomplish such a task, a certain aspect of the present invention provides a motion sickness preventing system (1) for preventing motion sickness of an occupant of a vehicle, comprising a terminal device (417) held by an occupant, and an acquisition device (413, 415) for acquiring behavior information about a behavior of the vehicle, wherein the terminal device is configured to display the behavior of the vehicle on a screen (427) thereof according to the behavior information acquired by the acquisition device.

According to this aspect, since the behavior of the vehicle is displayed on the terminal device according to the acquired behavior information, the occupant can easily understand that the inertial force is about to be applied even when the occupant is operating the terminal device.

Further, in the above aspect of the present invention, preferably, the acquisition device includes a navigation device (413) that sets a route to a destination, and the terminal device is configured to display a cornering behavior of the vehicle that is predicted from a current position of the vehicle and the destination on the screen (27, 27A) as the behavior information.

According to this aspect, the cornering behavior based on the set route is displayed on the terminal device. As a result, the occupant is enabled to estimate the direction of the inertial force that is about to be applied to the occupant, and prepare for the inertial force in advance, thereby preventing motion sickness of the occupant.

In the above aspect of the present invention, preferably, the terminal device displays the behavior information by a moving direction of an icon (V) corresponding to the vehicle.

According to this aspect of the present invention, the occupant can recognize the direction of the inertial force acting on the vehicle regardless of the posture that is taken by the occupant. Therefore, the occupant can be prepared in advance for the inertial force, so that motion sickness of the occupant can be prevented.

In the above aspect, preferably, the acquisition device acquires a lateral acceleration of the vehicle, and the terminal device displays the behavior information by causing an arrow to be displayed in association with an icon corresponding to the vehicle to indicate a turning of the vehicle in the direction of the lateral acceleration acquired by the acquisition device.

According to this aspect, the occupant can easily recognize the turning direction of the vehicle from the arcuate arrow displayed on the screen of the terminal device.

In the above aspect of the present invention, preferably, the acquisition device acquires a fore and aft acceleration of the vehicle, and the terminal device displays an icon corresponding to the vehicle on the screen at a reference position, and at a position displaced from the reference position by a distance corresponding the fore and aft acceleration of the vehicle acquired by the acquisition device According to this aspect, the occupant can recognize the magnitude of the fore and aft acceleration of the vehicle from the position of the icons displayed on the screen of the terminal device.

In the above aspect of the present invention, preferably, the acquisition device acquires a steering angle of the vehicle, and the terminal device displays the behavior information of the vehicle by superimposing an arrow on the icon corresponding to the vehicle to indicate a rotation of the icon by an angle corresponding to the steering angle acquired by the acquisition device.

According to this aspect, the occupant can easily recognize the turning direction from the arcuate arrow displayed on the screen of the terminal device.

In the above aspect of the present invention, preferably, when a prescribed application is being executed, the terminal device displays the behavior information superimposed on an edge part of an execution screen (427A) of the application.

According to this aspect, the occupant can be made more reliably aware of the behavior of the vehicle.

In the above aspect of the present invention, preferably, when a predetermined application is running, the terminal device displays the behavior information by superimposing an illuminated area (440) on an edge part of the screen that corresponds to a turning behavior of the vehicle.

According to this aspect, the occupant can be made more reliably aware of the behavior of the vehicle.

In the above aspect of the present invention, preferably, when a predetermined application is running, the terminal device displays the behavior information by superimposing an illuminated area (440) on an edge part of the screen, and the acquisition device causes the illuminated area to move in a direction corresponding to a turning direction of the vehicle.

According to this aspect, the occupant can easily recognize the turning direction of the vehicle from the moving direction of the illuminated area.

In the above aspect of the present invention, preferably, the motion sickness preventing system further comprises a biosensor for acquiring biometric information of an occupant, and the terminal device is configured to detect a sign of motion sickness of the occupant from the biometric information acquired by the biosensor (302), and when no sign of motion sickness is detected in the occupant, to cease the display of the vehicle behavior. According to this aspect, the behavior of the vehicle is not displayed on the screen of the terminal device which belongs to the occupant who does not have any sign of motion sickness. This prevents the display of the vehicle behavior from interfering with the execution screen of the application on the terminal device.

Further, in the above aspect of the present invention, preferably, the biosensor is provided in a seat (405, 406) on which the occupant is seated.

According to this aspect, the biological information of the occupant can be obtained more accurately.

In the above aspect of the present invention, preferably, the vehicle includes a light emitting device (1311L, 1311R, 1313) that emits light toward the cabin, and a control unit (416) that controls the light emitting device according to the behavior information.

According to this aspect, the behavior of the vehicle is reliably notified to the occupant.

A certain aspect of the present invention provides a motion sickness preventing system for preventing motion sickness of an occupant, comprising: a terminal device held by the occupant; and an acquiring device that detects behavior information regarding a behavior of a vehicle which the occupant is onboard, wherein the terminal device displays the behavior of the vehicle on a screen according to the behavior information acquired by the acquiring device. According to this aspect, since the behavior of the vehicle is displayed on the terminal device according to the behavior information, the occupant can easily understand that the inertial force will be applied even when the terminal device is being operated.

Further, in the above aspect of the present invention, preferably, the acquisition device includes a navigation device that sets a route to a destination, and the terminal device is configured to display a cornering behavior of the vehicle that is predicted from a current position of the vehicle and the route as the behavior information. According to this aspect, the cornering behavior based on the set route is displayed on the terminal device. As a result, the occupant can predict the direction of the inertial force that is going to be applied to the occupant in advance, and is thereby enabled to prepare for the internal force so that the occupant is protected from motion sickness.

Further, in the above aspect of the present invention, preferably, the terminal device is configured to display the behavior information by a moving direction of an icon corresponding to the vehicle. According to this aspect, the occupant can recognize the direction of the inertial force with respect to the vehicle regardless of the posture of the occupant. Therefore, the occupant can be prepared in advance for the inertial force, so that motion sickness of the occupant can be prevented.

In the above aspect of the present invention, preferably, the acquisition device acquires a lateral acceleration of the vehicle, and the terminal device is configured to display the behavior information by showing an arrow in association with an icon corresponding to the vehicle so as to turn in a direction of the lateral acceleration acquired by the acquisition device. Thereby, the occupant is enabled to easily recognize the turning direction from the arcuate arrow displayed on the screen of the terminal device.

In the above aspect of the present invention, preferably, the acquisition device acquires the fore and aft acceleration of the vehicle, and the terminal device displays an icon corresponding to the vehicle on the screen at a reference position, and a displaced position to which the vehicle will have traveled according to the fore and aft acceleration detected by the acquisition device. According to this aspect, the occupant can recognize the magnitude of the fore and aft acceleration of the vehicle from the position of the icon displayed on the screen of the terminal device.

In the above aspect of the present invention, preferably, the acquisition device acquires the steering angle of the vehicle, and the terminal device displays the behavior of the vehicle by superimposing an arrow on the icon representing the vehicle so as to show the turning of the vehicle by an angle corresponding to the steering angle acquired by the acquisition device. According to this aspect, the occupant can easily recognize the turning direction of the vehicle from the arcuate arrow displayed on the screen of the terminal device.

In the above aspect of the present invention, preferably, when a predetermined application is being executed, the terminal device superimposes the behavior information on an edge part of the execution screen of the application. According to this aspect, it is possible to make the occupant more reliably aware of the behavior of the vehicle.

In the above aspect of the present invention, preferably, when a predetermined application is being executed, the terminal device superimposes an illuminated area on an edge part of the screen that corresponds to the turning behavior of the vehicle. According to this aspect, it is possible to make the occupant more reliably aware of the behavior of the vehicle. Further, in the above aspect of the present invention, preferably, when a predetermined application is being executed, the terminal device displays the behavior information by superimposing an illuminated area on an edge part of the screen, and the acquisition device causes the illuminated area to move so as to correspond to the turning direction of the vehicle. According to this aspect, the occupant can easily recognize the turning direction of the vehicle from the moving direction of the illuminated area.

Further, in the above aspect of the present invention, preferably, the motion sickness preventing system further comprises a biosensor for acquiring biometric information of the occupant, and the terminal device is configured to determine if the occupant has gotten motion sickness from the biometric information acquired by the biosensor, and when the occupant is determined not to have motion sickness, to cease displaying the behavior of the vehicle on a screen. According to this aspect, the behavior of the vehicle is not displayed on the screen of the terminal device which belongs to the occupant who does not have motion sickness. Thereby, the execution screen of the application displayed on the terminal device is prevented from being interfered by the display of the behavior of the vehicle.

In the above aspect of the present invention, preferably, the biosensor is provided on a seat on which the occupant is seated. According to this aspect, the biological information of the occupant can be obtained accurately.

Further, in the above aspect of the present invention, preferably, the vehicle includes a light emitting device that emits light toward a cabin, and a control unit that controls the light emitting device, and the control unit is configured to control the light emission according to the behavior information. According to this aspect, the behavior of the vehicle is reliably notified to the occupant.

In a seat such as a vehicle seat that includes a pad and a skin member that covers the pad, the seating surface of the seat cushion or seat back may be provided with a linear recessed part or a listing part to maintain the external shape of the seat cushion or seat back. The skin member is locally forced into this listing part, and secured to an engaging member fixed to the pad.

JP2020-1559A discloses a listing member including a fabric connecting portion provided in an edge part of a skin member and extending in the same direction as a listing groove in the pad, and an engaged member attached to the tip end of the connecting portion so as to bulge out laterally. The skin member is pulled into the listing groove of the pad by engaging the engaged member with clips fixed to the bottom of the groove in the pad.

In a seat provided with such a listing portion, it may be desired to provide an irregularity or an undulation to the part of the pad adjacent to the listing groove along the length of the listing portion. In such a case, if the elevation of the bottom of the listing groove is constant, an unevenness may be created in the listing edge of the skin member. In the listing member described in JP2020-1559A, since the engaged member resists bending deformation, some difficulty is encountered in sewing or otherwise securing the listing member to the edge part of the skin member. Therefore, the listing member is required to be secured only to parts of the edge part of the skin member which are linear. As a result, the parts of the edge part of the skin member where the listing member is absent cannot be pulled into the listing groove, and the undulating external appearance of the surface of the seat could not be favorably produced. In addition, since the listing member is provided so as to avoid the curved edge part of the skin member, the listing member is required to consist of a large number of relatively short pieces, and this causes an increase in the number of component parts.

In view of such a problem of the prior art, a primary task of the present invention is to provide a seat listing structure for an uneven edge part of a skin member, and a method for assembling the same, wherein the edge part and the listing member can be connected in a both favorable and easy manner.

A certain aspect of the present invention provides a listing structure for a seat (10), comprising: a pad (625) provided with a listing groove (629); a plurality of engaging members (6160) secured to the pad at a bottom part of the listing groove, and arranged along a lengthwise direction of the listing groove in a spaced apart relationship; a skin member (626) covering a surface of the pad, and provided with a listing edge part (611) extending in the listing groove along the lengthwise direction thereof; and a listing member (614) extending in the listing groove along the length thereof, and provided with a first edge part (612) connected to the listing edge part (611) and a second edge part (613) engaged by the engaging members, the listing edge part being provided with an edge profile which is curved in a concave or convex shape, the first edge part of the listing member being provided with a readily deformable portion (617).

According to this configuration, since the listing member is readily deformable at the readily deformable portion, the listing member can be easily attached to the listing edge part which is curved by having a convex or concave contour by readily conforming thereto. In addition, according to this configuration, since the listing member is not required to avoid the curved part of the listing edge part of the skin member, an increase in the number of component parts can be avoided.

According to an embodiment of the present invention, in the configuration described above, the readily deformable portion includes a cutout cut into the first edge part and has a predetermined length in the lengthwise direction.

According to this configuration, since the readily deformable portion is a cutout portion, the readily deformable portion can be easily formed.

According to an embodiment of the present invention, in any one of the above configurations, the listing member is configured such that the first edge part can more readily bend that the second edge part.

According to this configuration, since the first edge part connected to the listing edge part is easier to bend and deform than the second edge part, the work for connecting the listing edge part to the first edge part is facilitated.

In an embodiment of the present invention, in any of the above configurations, the first edge part and the listing edge part are provided with respective markings (618, 619) aligning with each other on either side of the readily deformable portion.

According to this configuration, since the markings are provided so as to interpose the readily deformable portion therebetween, the listing member can be bent into an appropriate shape and positioned at an appropriate position by matching the markings In an embodiment of the present invention, in the configuration mentioned immediately above, the first edge part is connected to the listing edge part by sewing along a predetermined sewing line (620), and with an edge of the first edge part aligning with an edge of the listing edge part, the first edge part is folded back at the sewing line.

According to this configuration, when the listing edge part and the first edge part are connected to each other by sewing, the listing edge part and the first edge part are caused to overlap with each other with their edges aligning with each other so that the matching of the markings while the listing member is bent is facilitated.

In an embodiment of the present invention, in the above configuration, the markings of the first edge part and the listing edge part comprise notches cut into the first edge part and the listing edge part, and the sewing line is provided so as to avoid the markings.

According to this configuration, since the sewing line avoids the markings, even if the markings comprise notches, the connecting strength between the listing edge part and the first edge part is not impaired.

In an embodiment of the present invention, in any one of the configurations mentioned above, the engaging members are provided at positions aligning with the markings.

According to this configuration, since the markings are provided at positions aligning with the engaging members, the listing edge part can be inserted into the appropriate position of the listing groove.

In an embodiment of the present invention, in any one of the configurations mentioned above, the engaging members are provided only at positions shifted in the lengthwise direction from the readily deformable portion.

The second edge part undergoes a greatest bending deformation at the position aligning with the readily deformable portion. According to this configuration, the second edge part engages with the engaging members while avoiding the most deformed part so that the engaging the second edge part with the engaging members is facilitated.

In an embodiment of the present invention, instead of the configuration mentioned immediately above, one of the engaging members is provided at a position aligning with the readily deformable portion.

According to this configuration, since the most curved part of the listing edge part engages with the engaging members via the listing member, the unevenness of the seating surface of the seat can be easily reproduced as designed.

A certain aspect of the present invention provides a method for assembling a listing structure for a seat (10), comprising: a pad (625) provided with a listing groove (629); a plurality of engaging members (6160) secured to the pad at a bottom part of the listing groove, and arranged along a lengthwise direction of the listing groove in a spaced apart relationship; a skin member (626) covering a surface of the pad, and provided with a listing edge part (611) extending in the listing groove along the lengthwise direction thereof so as to define a convex or concave curved profile; and a listing member (614) extending in the listing groove along the length thereof, and provided with a first edge part (612) connected to the listing edge part (611) and a second edge part (613) engaged by the engaging members, the method comprising the steps of providing a readily deformable portion (617) on the first edge part (12); providing markings (618, 619) on the first edge part and the listing edge part so as to align with each other on either side of the readily deformable portion; bending the listing member along the listing edge part with the markings of the first edge part and the listing edge part aligning with each other; connecting the first edge part and the listing edge part to each other; and engaging the second edge part with the engaging members.

According to this configuration, the presence of the readily deformable portion makes it easier for the listing member to bend, and the markings arranged on either of the readily deformable portion on the first edge are aligned with the markings of the listing member. As a result, the listing member has an appropriate shape and is arranged at an appropriate position, which facilitates assembly.

In a seat back of a vehicle seat, it is known to use a plastic clip for securing an end of a rod member extending upward from a pressure receiving member to an upper member. The clip includes a main body defining a through hole for receiving the rod member therein, and an elastic claw projecting from the main body is fitted into an engagement hole formed in the upper member. See JP2004-262294A, for instance.

The clip disclosed in JP2004-262294A is movable relative to the rod member. Therefore, after attaching the clip which is movably connected to the rod member, the position and orientation of the clip must be fixed with respect to the rod member. As a result, the assembling of the rod member to the upper member by using the clip becomes complicated. In particular, when attaching the rod member to the upper member by using an automated machine, a complicated mechanism is required for positioning the clip.

In view of this background, there is a task to provide a clip that is easy to assemble and a vehicle seat that includes the clip.

In order to accomplish such a task, an aspect of the present invention provides a clip (713) for fixing a first member including a first rod part (715) and a second rod part (716) connected to each other via a bend (714) to a second member (710), the clip comprising: a first portion (717) provided with a first groove (724) for receiving at least a part of the first rod part; a second portion (718) provided with a second groove (727) for receiving at least a part of the second rod part; a connecting portion (719) connecting the first portion and the second portion to each other so as to maintain a position of the first member relative to the second position; and an engaging portion (731) provided on the first portion to engage the second member.

According to this aspect, the position of the clip with respect to the first member is determined by receiving the first rod part in the first groove and receiving the second rod part in the second groove. Therefore, the assembling of the first member to the second member by using the clip can be facilitated.

In the above aspect of the present invention, the first groove and the second groove have mutually different opening directions.

According to this aspect, the clip is less likely to come off from the first member.

In the above aspect of the present invention, the first portion and the second portion have a first end surface (722) and a second end surface (723), respectively, on a side of the connecting portion, an end of the first groove reaching the first end surface, an end of the second groove reaching the second end surface, and the first end surface, the connecting portion and the second end surface jointly define a third groove (728) that extends orthogonally to the first groove and the second groove, the first groove opening toward a first side of the third groove along a lengthwise direction of the third groove, the second groove opening toward a second side of the third groove along the lengthwise direction of the third groove.

According to this aspect, the worker is able to cause the first rod part and the second rod part to be received in the first groove and the second groove, respectively, by inserting a boundary part between the first rod part and the second rod part in the third groove, and turning the clip. Thereby, the clip can be easily assembled to the first member.

In the above aspect of the present invention, preferably, the width of the first groove at an open end thereof is smaller than the diameter of the first rod part, and the width of the second groove at an open end thereof is smaller than the diameter of the second rod part.

According to this aspect, the first rod part and the second rod part can be retained in the first groove and in the second groove, respectively. Thereby, the clip is prevented from being dislodged from the first member.

In the above aspect of the present invention, preferably, the open end of the first groove is defined by a pair of edges that are inclined so as to come closer to each other toward a bottom of the first groove, and the open end of the second groove is defined by a pair of edges that are inclined so as to come closer to each other toward a bottom of the second groove.

According to this aspect, the first rod part can be received in the first groove by pushing the first rod part into the first groove. Further, the second rod part can be received in the second groove by pushing the second rod part into the second groove.

In the above aspect of the present invention, preferably, the second rod part is inclined relative to the first rod part by a first angle (a) and the second portion is inclined relative to the first portion by the first angle.

According to this aspect, the clip can be positioned with respect to the first member with a simple configuration.

In the above aspect of the present invention, preferably, the engaging portion is provided with an elastic claw (734) projecting from the first portion, and the second member is provided with an engaging hole (732) into which the engaging portion is inserted.

According to this aspect, the clip attached to the first member can be easily attached to the second member.

In the above aspect of the present invention, preferably, the first portion is longer than the second portion.

According to this aspect, the clip can be connected to the first member and the second member in a stable manner.

Another aspect of the present invention provides a vehicle seat (20) provided with the clips (713), the vehicle seat comprising a right and a left side member (709) extending vertically; an upper member (710) extending laterally between upper ends of the side members (710); a lower member (711) extending laterally between the lower ends of the side members; a plurality of wires (712) made of metal rods and extending from the lower member to the upper members; and a plate-like pressure receiving member (708) positioned between the side members and between the upper member and the lower member, wherein the first member is the wires, and the second member is the upper member, the clips connecting the upper ends of the wires to the upper member (10).

According to this aspect, the wires can be easily attached to the upper member by using the clips.

In the above aspect of the present invention, preferably, the engaging portion of each clip is inserted from front into a corresponding engaging hole (732) formed in a front surface (710A) of the upper member.

According to this aspect, the wire can be easily attached to the upper member by using the clips.

Effect of the Invention

According to the vehicle seat device of the present invention, the seat occupant can be made aware of the behavior of the vehicle regardless of the tilt angle of the seat back with respect to the seat cushion.

DESCRIPTION OF THE PREFERRED EMBODIMENT(S)

First Embodiment

A vehicle seat device according to a first embodiment of the present invention will be described in the following with reference to FIGS. 1 to 3.

Figure 1:
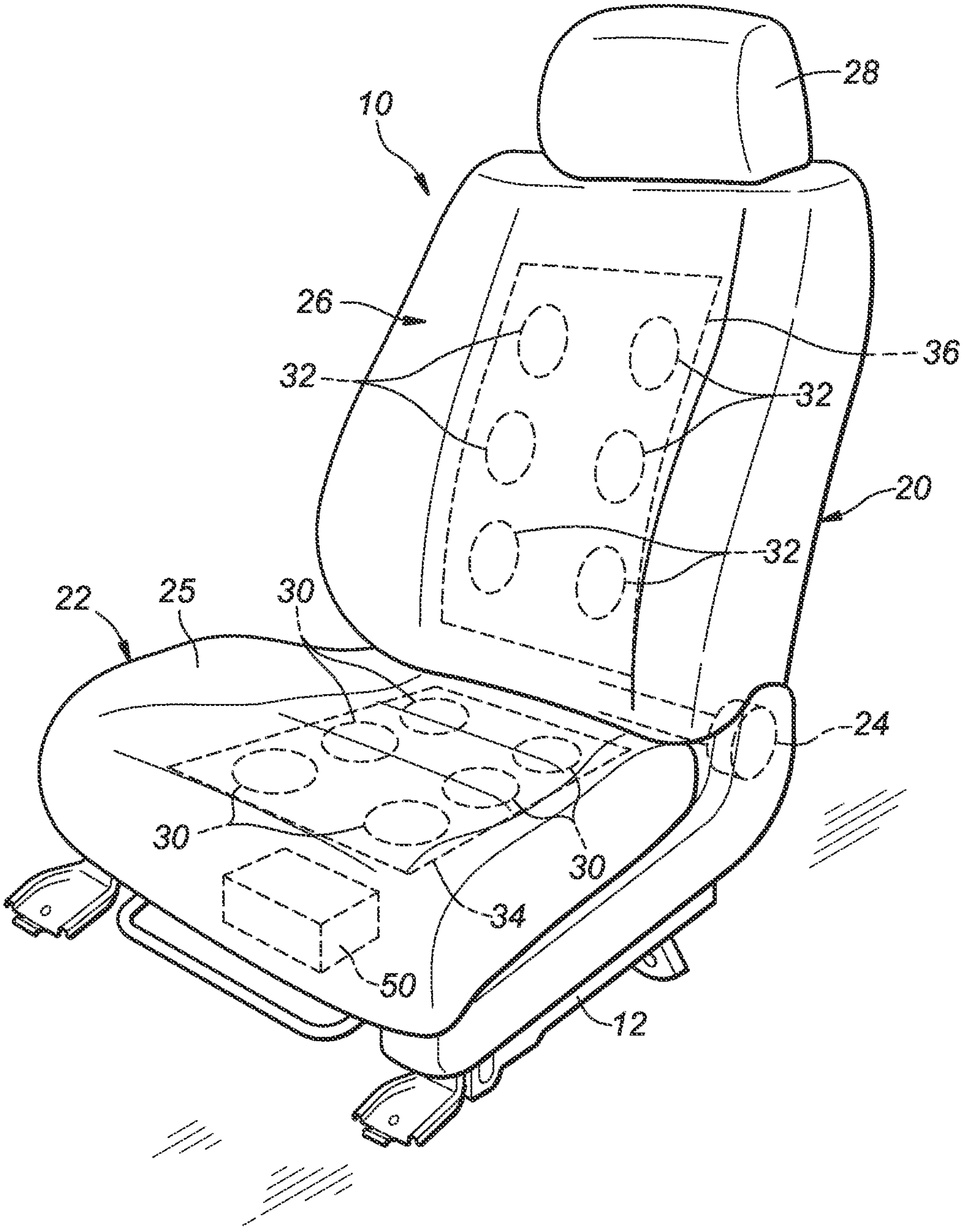
FIG. 1 is a perspective view of a vehicle seat device according to a first embodiment of the present invention.
Figure 2:
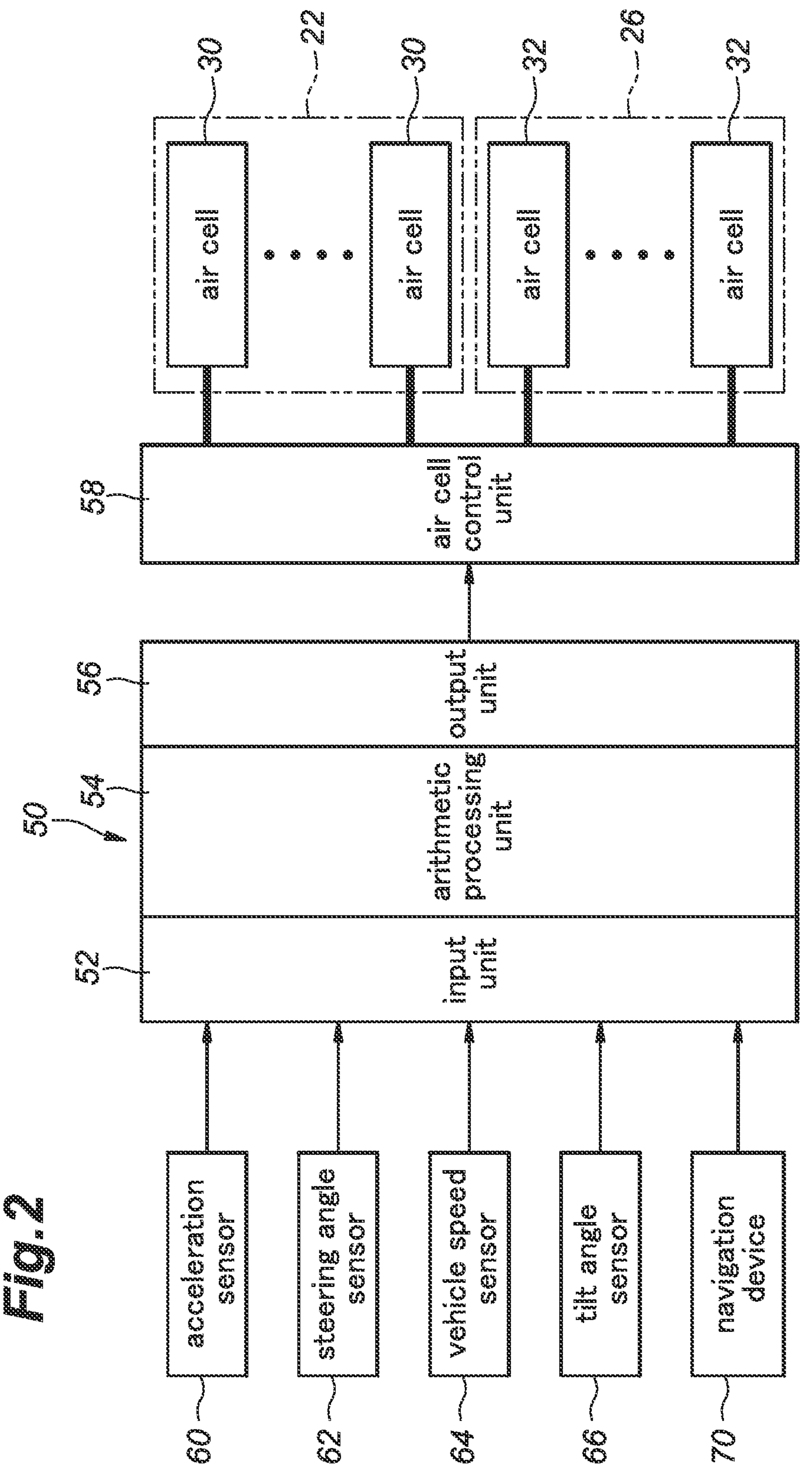
FIG. 2 is a block diagram of a control system of the vehicle seat device of the first embodiment.

As shown in FIG. 1, the vehicle seat device 10 of this embodiment includes a seat main body 20 supported on a floor panel (not shown in the drawings) of an automobile by a left and a right slide rail device 12 extending in the fore and aft direction.

The seat main body 20 includes a seat cushion 22 providing a seating surface and a seat back 26 providing a backrest surface and connected to a rear part of the seat cushion 22 via an electric reclining device 24 that allows the tilt angle of the seat back 26 to be changed about a horizontal axis. A headrest 28 is attached to an upper part of the seat back 26.

The seat cushion 22 is provided with a plurality of air cells 30 serving as vibration generators and spaced apart from each other in the fore and aft direction and the lateral direction in a grid pattern. Each air cell 30 can be inflated and deflated by selectively supplying compressed air thereto from a compressed air source (not shown in the drawings), and can transmit vibrations to the buttocks and thighs of the seat occupant.

The seat back 26 is provided with a plurality of air cells 30 serving as vibration generators and spaced apart from each other in the vertical direction and the lateral direction in a grid pattern. Each air cell 30 can be inflated and deflated by selectively supplying compressed air thereto from a compressed air source (not shown in the drawings), and can transmit vibratory stimulation effective in reducing motion sickness to the back and hip of the occupant. The air cells 32 in the seat back 26 are configured to apply vibratory stimulation to the hip, in particular the part of the occupant corresponding to the lumbar vertebrae so as to promote abdominal breathing.

By changing at least one of the amplitude and frequency of vibratory inflation of the air cells 30 and 32, the intensity of vibration applied to the seat occupant can be adjusted. Under the seat cushion 22 is provided a control unit 50 which forms a part of a control system of the vehicle seat device 10. The details of the control unit 50 will be described in the following with reference to FIG. 2.

The control unit 50 is based on an electronic information processing device including a microcomputer, and has an input unit 52, an arithmetic processing unit 54 and an output unit 56.

The input unit 52 is connected to an onboard acceleration sensor (acceleration detection unit) 60, a steering angle sensor (steering angle detection unit) 62, and a vehicle speed sensor (vehicle speed detection unit) 64 as behavior detection units for detecting the behavior of the automobile (vehicle).

The acceleration sensor 60 is of a multi-axis type, and outputs to the input unit 52 information on the longitudinal and lateral acceleration of the vehicle. The steering angle sensor 62 outputs information regarding the steering angle of the automobile to the input unit 52. The vehicle speed sensor 64 outputs information about the traveling speed of the automobile to the input unit 52.

An onboard tilt angle sensor (tilt angle detection unit) 66 is connected to the input unit 52. The tilt angle sensor 66 detects the tilt angle of the seat back 26 about the horizontal axis with respect to the seat cushion 22 (hereinafter referred to as the reclining angle), and outputs information about the reclining angle to the input unit 52.

An onboard navigation device 70 is connected to the input unit 52. The navigation device 70 detects the current position of the vehicle on map data by receiving GPS signals, displays the travel route of the vehicle from the current position to the destination set by the user on the monitor on the map data, and displays the travel route. Navigation information including route information is forwarded to the input unit 52. In other words, the input unit 52 receives navigation information including travel route information on the map data from the navigation device 70.

When the input information of the input unit 52 indicates a travel behavior of the vehicle which is likely to cause motion sickness, such as an acceleration and deceleration of the vehicle that can be determined from the fore and aft direction, and a cornering of the vehicle determined from the lateral acceleration and the steering angle, the arithmetic processing unit 54 generates a vibration control command that causes the air cells 30 of the seat cushion 22 to vibrate with a higher vibration intensity that the air cells 32 of the seat back 26 depending on if the reclining angle is less than a prescribed value or if the seat back 26 is in a relatively upright posture, and causes the air cells 32 of the seat back 26 to vibrate with a higher vibration intensity that the air cells 30 of the seat cushion 22 depending on if the reclining angle is equal to or greater than the prescribed value or if the seat back 26 is in a relatively flat posture, and forwards the vibration control command to the output unit 56.

Furthermore, the arithmetic processing unit 54 corrects the vibration control command such that the vibration intensity is increased as the accelerations in the fore and aft direction and the lateral acceleration, the differential values thereof, the steering angle, the differential value thereof, and the vehicle speed increase, and forwards the corrected vibration control command to the output unit 56.

Based on the navigation information inputted to the input unit 52, when it is determined that the current part of the road or a part of the road certain distance ahead of the current position is curved, the arithmetic processing unit 54 generates a control command that causes the air cells 30 of the seat cushion 22 to vibrate at a higher intensity than the air cells 32 of the seat back 26 when the reclining angle is less than a prescribed value, and the air cells 32 of the seat back 26 to vibrate at a higher intensity than the air cells 30 of the seat cushion 22 than when the reclining angle is equal to or greater than the prescribed value, and forwards the control command to the output unit 56.

Further, based on the navigation information, the arithmetic processing unit 54 corrects the control command in such a manner that the vibration intensity is greater when the current part of the road or a part of the road certain distance ahead of the current position is a sharp curve than when the current part of the road or a part of the road certain distance ahead of the current position is mild curve, and forwards this control command to the output unit 56. The certain distance as used here may be a distance which the vehicle is expected to travel in tens of seconds, and may thus depends on the vehicle speed.

An air cell control unit 58 is connected to the output unit 56, and the air cells 30 and 32 are connected to the air cell control unit 58. The air cell control unit 58 includes electromagnetic intake/exhaust valves and the like, and based on the oscillation operation command from the output unit 56, the supply/discharge cycle of the compressed air to the air cells 30 and 32 and the supply/discharge time of the compressed air in each cycle are variably determined.

As a result, each of the air cells 30 and 32 is repeatedly inflated and deflated with a period (or a frequency) corresponding to the compressed air supply/discharge cycle and with a volume determined by the compressed air supply/discharge time in each cycle. In other words, the air cells 30 and 32 vibrate with a variable frequency and a variable amplitude determined by the oscillation operation command.

When the reclining angle is less than a predetermined value, since the seat back 26 is near a vertical upright state, the body pressure acting on the seat cushion 22 is greater than the body pressure acting on the seat back 26. Conversely, when the reclining angle is equal to or greater than the predetermined value, since the seat back 26 is near a horizontal flat state, the body pressure acting on the seat back 26 is comparatively great.

Thus, in the vehicle seat device 10 of the first embodiment, the air cells 30 of the seat cushion 22 are caused to oscillate with a greater vibration intensity than the air cells 32 of the seat back 26 when the reclining angle is less than the predetermined value, and the air cells 32 of the seat back 26 are caused to oscillate with a greater vibration intensity than the air cells 30 of the seat cushion 22 when the reclining angle is equal to or greater than the predetermined value. Thereby, the vibration can be conveyed to the occupant in a reliable manner without regard to the reclining angle.

The behavior of the vehicle which is likely to cause motion sickness such as acceleration/deceleration and cornering of the vehicle can be accurately conveyed to the occupant without regard to the reclining angle. In other words, the seat occupant is enabled to know the behavior of the vehicle by vibration without regard to the reclining angle.

In the vehicle seat device 10 of the first embodiment, since the navigation information is used, and the presence of a curve can be detected in advance, the vibration of the air cells 30, 32 may be initiated in advance of the vehicle reaching the curve. In other words, the seat occupant knows that the vehicle will turn before the vehicle reaches the curve.

Alternatively, only the air cells 30 of the seat cushion 22 may be vibrated when the reclining angle is less than a predetermined value, and only the air cells 32 of the seat back 26 may be vibrated when the reclining angle is equal to or greater than the predetermined value.

In the vehicle seat device 10 of the first embodiment, the greater the acceleration/deceleration in the longitudinal direction, the acceleration/deceleration in the lateral direction, the steering angle, and the change rate thereof, the sharper the curve, and the higher the vehicle speed, the greater the vibration intensity is, the greater the intensity of the vibration is. The occupant can know the levels of the longitudinal acceleration/deceleration, the lateral acceleration/deceleration, the steering angle, and the change rate thereof from the intensity of the vibration.

When navigation information is used, since the vibration intensity is greater when the curvature of the part of the road ahead of the current position is equal to or greater than the predetermined value (mild curve) than when the curvature is smaller than the predetermined value (sharp curve), the occupant is able to know the curvature of the curve into which the vehicle is entering in advance. The curvature of the road can be translated into a turning radius, and the vibration intensity is greater when the turning radius is equal to or smaller than a predetermined value than when the turning radius is greater than the predetermined value.

Since the air cells 32 of the seat back 26 are configured to apply vibration stimulation to the hip region of the seat occupant, particularly the lumbar vertebrae, the vibration stimulation can promote abdominal breathing of the seat occupant. As a result, deep breathing is induced, which is effective in reducing motion sickness by calming the mind, and the effect of reducing motion sickness is improved.

The information about the steering angle provided by the steering angle sensor 62 and the navigation information provided by the navigation device 70 include information about the turning direction (left turn, right turn) of the vehicle. In this conjunction, the control unit 50 generates an oscillation control command that makes the vibration intensity of the air cells 30 and 32 on the side of the turning direction side higher than the vibration intensity of the air cells 30 and 32 on the opposite side, and forwards the oscillation control command to the output unit 56.

As a result, in the case of a leftward turn, the air cells 30, 32 on the left side of the seat occupant vibrate more intensely than the air cells 30, 32 on the right side of the seat occupant. In the case of a rightward turn, the air cells 30, 32 on the right side of the seat occupant vibrate more intensely than the air cells 30, 32 on the left side of the occupant.

The vibration of the air cells 30 and 32 allows the seated occupant to recognize the turning direction of the automobile, and this recognition (awareness) reduces motion sickness compared to when the occupant is not aware of the turning direction.

Next, the mode of operation of the vehicle seat device 10 of the first embodiment will be described in the following with reference to the flowchart shown in FIG. 3. The control routine shown in this flow chart is cyclically executed by the control unit 50 at predetermined time intervals.

This control routine is executed during acceleration/deceleration, turning, etc. of the vehicle, when motion sickness is likely to occur. First, it is determined if the reclining angle is equal to or greater than a predetermined value (step ST10). The predetermined value of the reclining angle may be 135 degrees when the reclining angle range is 90 degrees to 180 degrees.

If the reclining angle is equal to or greater than the predetermined value, the air cells 32 of the seat back 26 are vibrated more intensely than the air cells 30 of the seat cushion 22 (step ST11). On the other hand, if the reclining angle is less than the predetermined value, the air cells 30 of the seat cushion 22 is vibrated more intensely than the air cells 32 of the seat back 26 (step ST12).

Next, it is determined if the steering angle is equal to or greater than a predetermined value, for example, 35 degrees (step ST13). If the steering angle is equal to or greater than the predetermined value, the vibration intensity is increased according to the vehicle speed (step ST14).

If the steering angle is less than the predetermined value, then it is determined if the accelerations in the fore and aft direction and in the lateral direction are equal to or greater than predetermined values (step ST15). If at least one of the accelerations in the fore and aft direction and the lateral direction is equal to or greater than a predetermined value, the vibration intensity is increased according to the vehicle speed (step ST14).

If both the fore and aft acceleration and the lateral accelerations are less than predetermined values, then it is determined if the curve radius (turning radius) is less than a predetermined value (step ST16). The predetermined value of the curve radius is set according to the vehicle speed so as to decrease as the vehicle speed increases. For example, when the vehicle speed is 60 km/h, it may be set to 60 m. If the curve radius is less than the predetermined value, the vibration intensity is increased according to the vehicle speed (step ST14).

If the curve radius is equal to or greater than the predetermined value, the routine ends without increasing the vibration intensity.

As shown in FIG. 1, the air cells 30 provided on the seat cushion 22 are integrally formed in a rectangular resin sheet 34, and the air cells 32 provided on the seat back 26 are similarly formed as a resin rectangular sheet 36.

Figure 4:
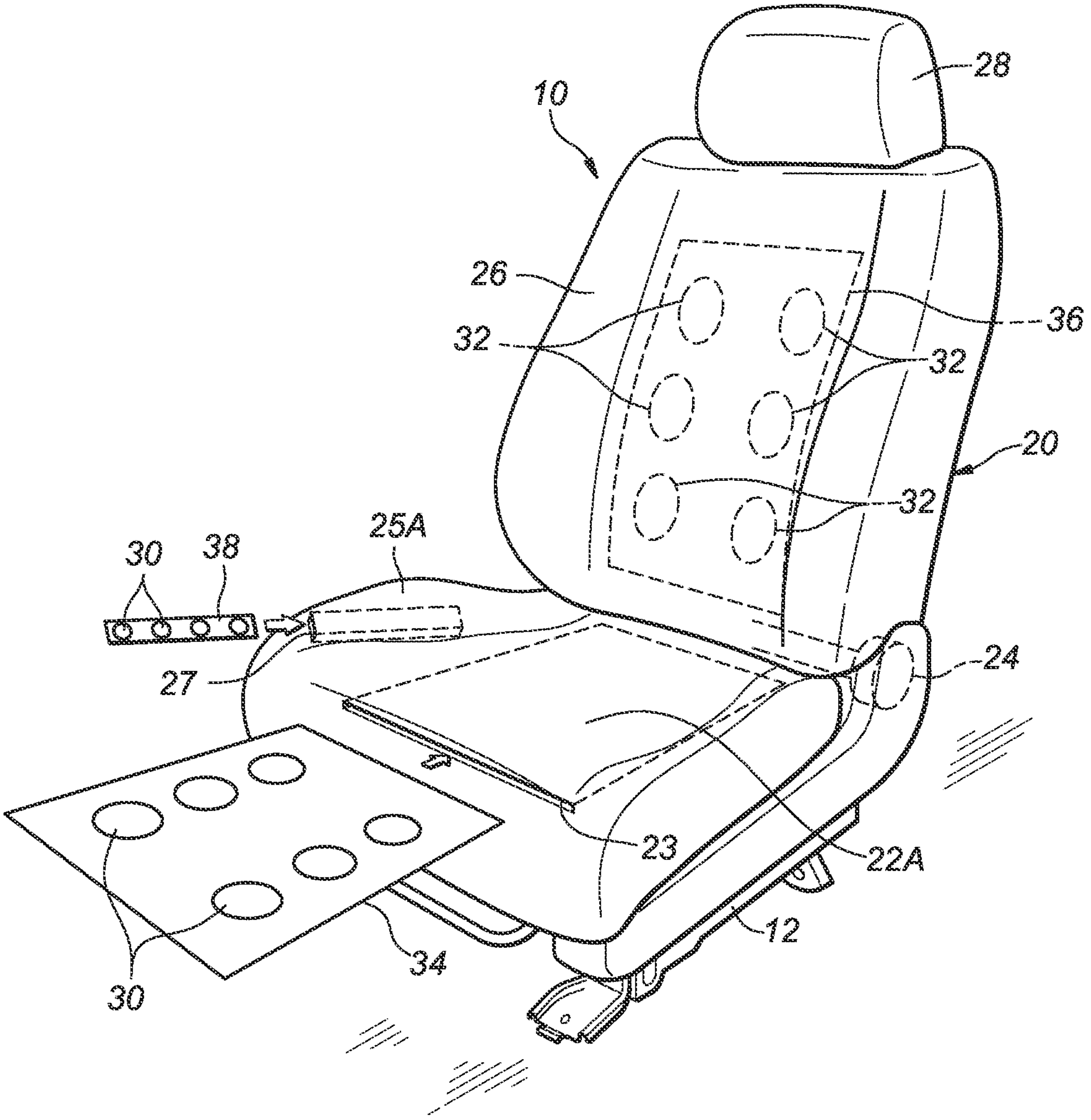
FIG. 4 is a perspective view showing the process of installing air cells into the vehicle seat device of the first embodiment.

The resin sheet 34 containing the air cells 30 may be inserted into the pad 22A of the seat cushion 22 through a slit 23 formed in a front part of the pad 22A as shown in FIG. 4.

The air cells 30 may also be provided on a pair of bolster portions 25 (see FIG. 1) provided on either side of the seat cushion 22. In this case, as shown in FIG. 4, a strip of rectangular resin sheet 34 having a plurality of air cells 30 arranged in a row may be inserted into the pad 22A of each bolster portion via a corresponding slit 27 formed in a front part of the pad 25A of the bolster portion 25.

The number of air cells 30 and 32 is not limited to 2×3=6, but may be any number other than six. The vibration generators are not limited to the air cells 30, 32, but may be piezoelectric devices that deform when supplied with electric power, or mechanical devices using cams or the like. The vibration generator may also be provided in an ottoman (not shown in the drawings).

Second Embodiment

Figure 6:
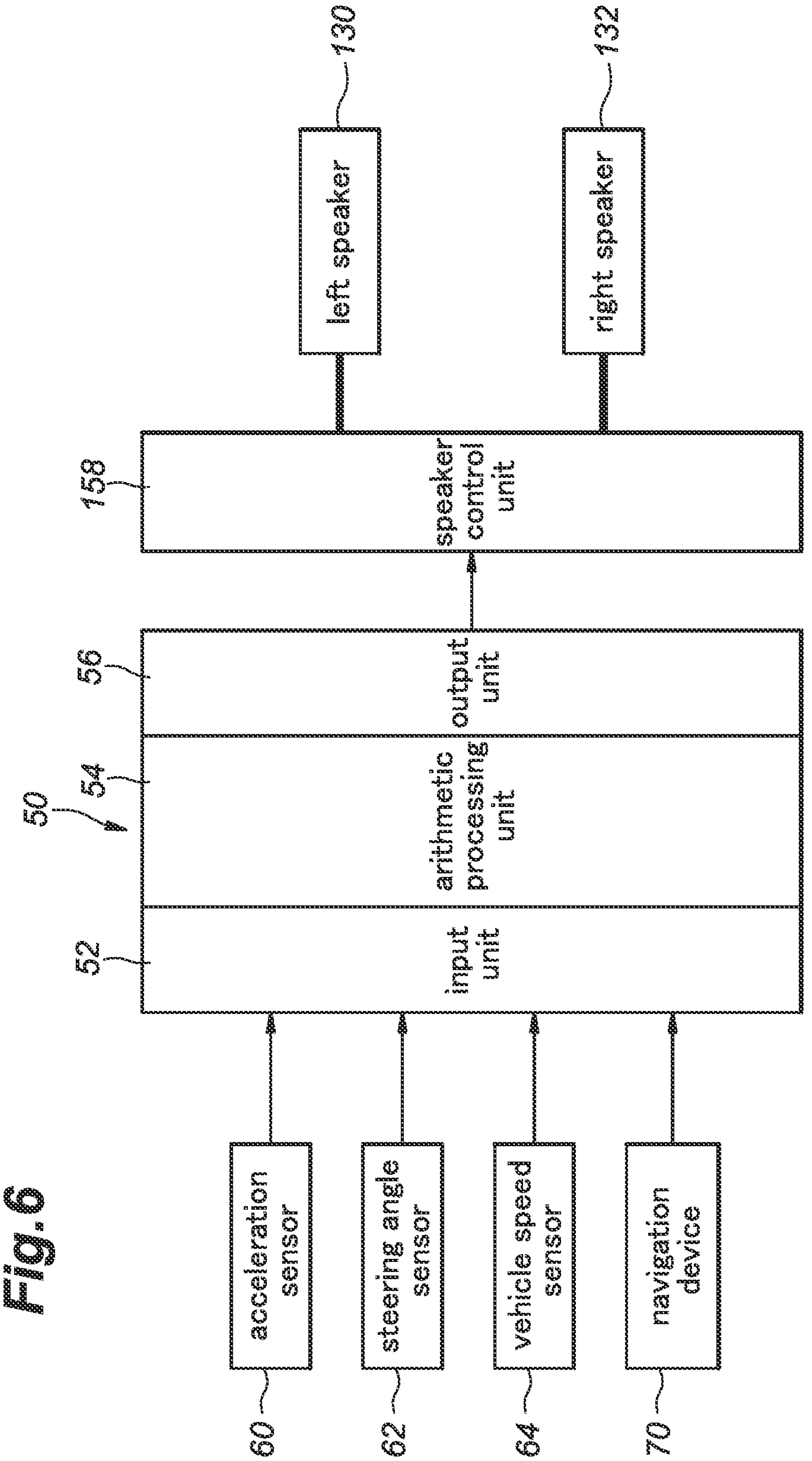
FIG. 6 is a block diagram of a control system of the vehicle seat device of the second embodiment.
Figure 7:
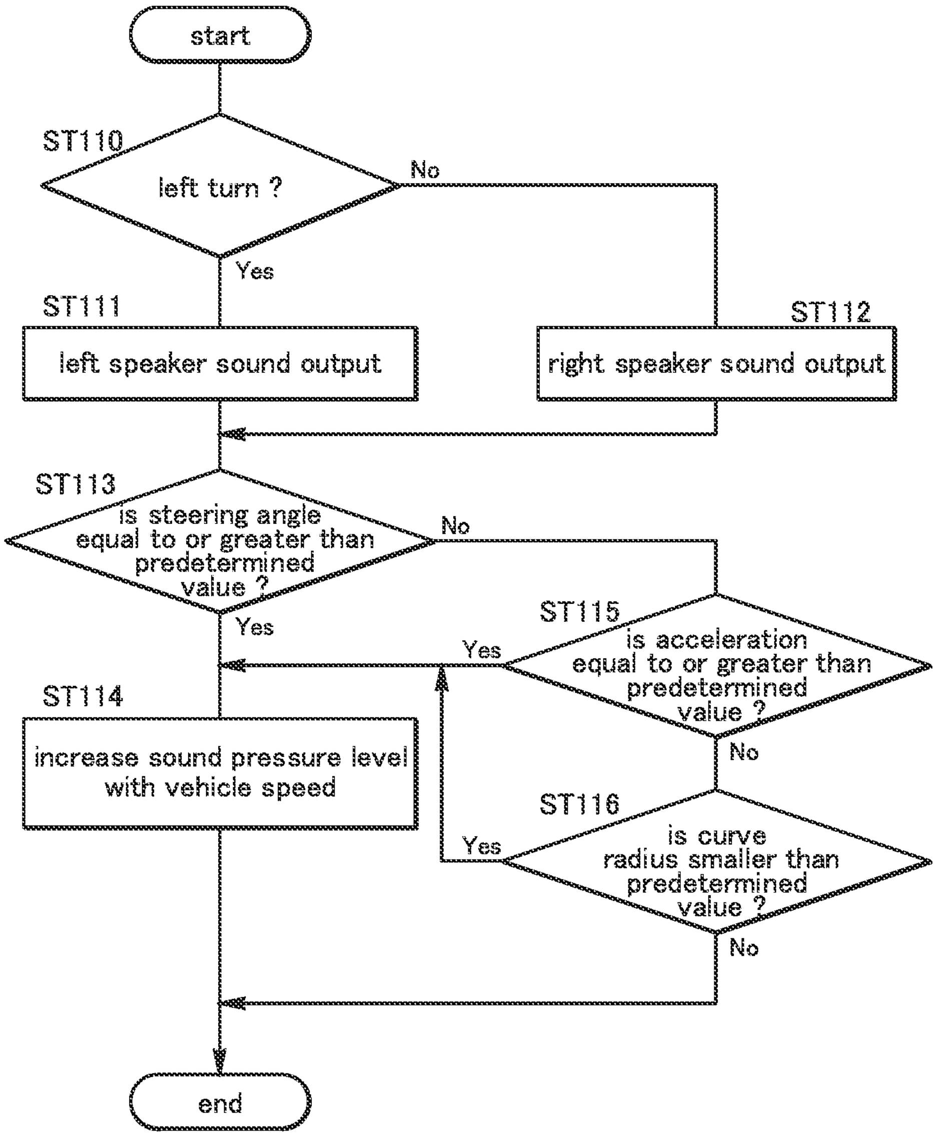
FIG. 7 is a flow chart of the control system of the vehicle seat device of the second embodiment.

A vehicle seat device according to a second embodiment of the present invention will be described in the following with reference to FIGS. 5 to 7.

Figure 5:
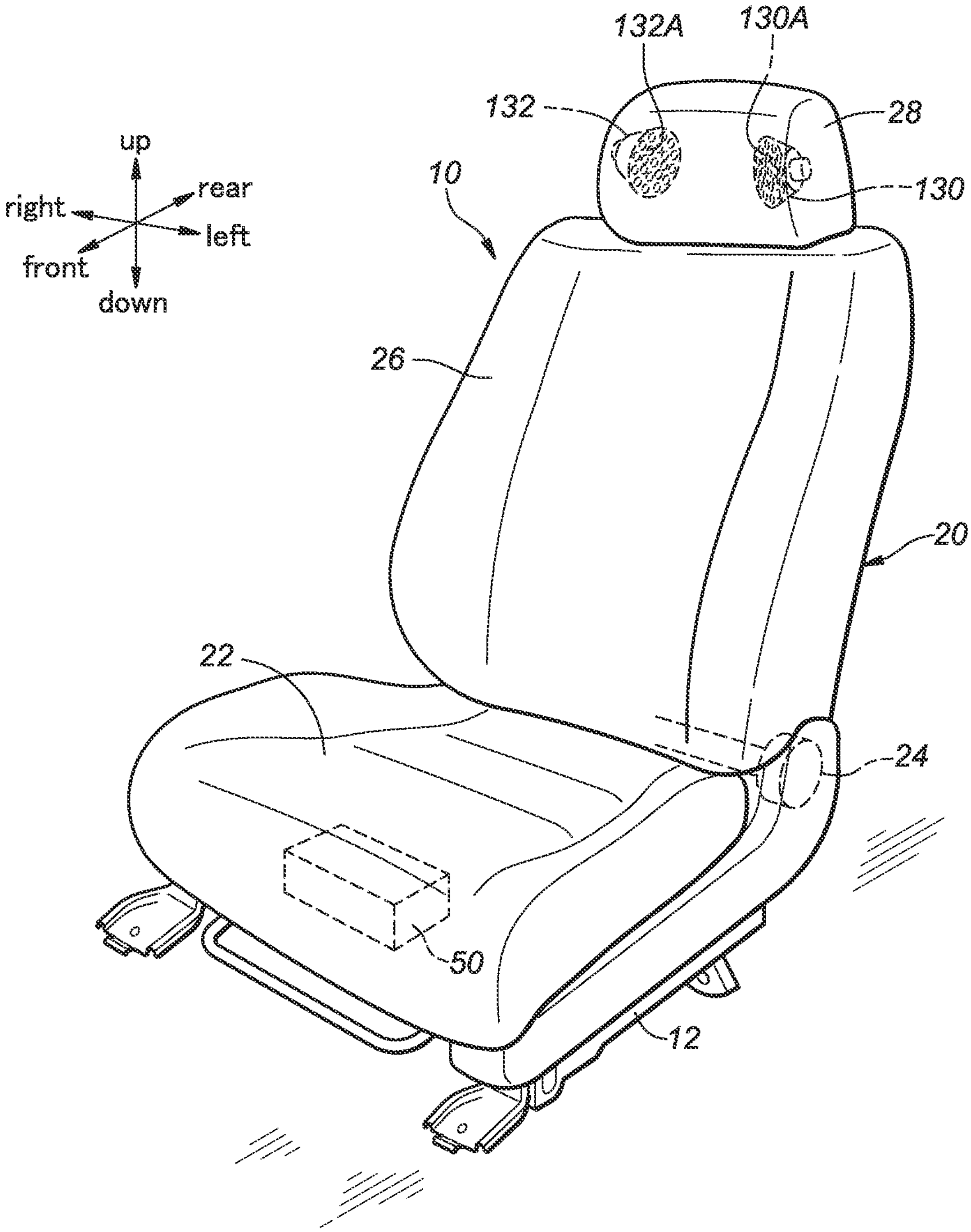
FIG. 5 is a perspective view of a vehicle seat device according to a second embodiment of the present invention.

As shown in FIG. 5, the vehicle seat device 10 of the second embodiment is provided with a seat main body 20 provided on a floor panel (not shown in the drawings) of a vehicle such as an automobile via a pair of slide rail devices 12 extending in the fore and aft direction on either side.

The seat main body 20 includes a seat cushion 22 providing a seating surface and a seat back 26 connected to a rear part of the seat cushion 22 so as to be able to change the tilt angle thereof about a horizontal axis by an electric reclining device 24 and providing a backrest surface. A headrest 28 is attached to an upper part of the seat back 26.

A left speaker 130 and a right speaker 132 are incorporated in the headrest 28. The left speaker 130 outputs sound toward the left ear of the seat occupant via a perforated sound output unit 130A formed in the part of the skin member on the left side of the headrest 28 away from the central portion in the lateral direction. The right speaker 132 outputs sound toward the right ear of the seat occupant from a perforated sound output unit 132A formed in the part of the skin member on the right side of the headrest 28 away from the central portion in the lateral direction.

The left speaker 130 and the right speaker 132 may be provided for each of the seat main bodies 20 including a front seat, a rear seat, or the like arranged in the vehicle cabin. A control unit 50 is provided under the seat cushion 22. The control unit 50 may be shared by different seat main bodies 20.

The control system of the vehicle seat device 10 will be described in the following with reference to FIG. 6. The control unit 50 is based on an electronic information processing device including a microcomputer, and has an input unit 52, an arithmetic processing unit 54 and an output unit 56.

The input unit 52 is connected to behavior detection devices for detecting behaviors of the automobile (vehicle) such an onboard acceleration sensor (acceleration detection unit) 60, a steering angle sensor (steering angle detection unit) 62, and a vehicle speed sensor (vehicle speed detection unit) 64.

The acceleration sensor 60 outputs to the input unit 52 vector information regarding the lateral acceleration of the automobile. The steering angle sensor 62 outputs vector information regarding the turning direction and steering angle of the automobile to the input unit 52. A vehicle speed sensor 64 outputs information about the traveling speed of the automobile to the input unit 52.

An onboard navigation device 70 is connected to the input unit 52. The navigation device 70 detects the current position of the vehicle on map data by receiving GPS signals, displays on the map data the traveling route of the vehicle from the current position to the destination set by the user on the monitor, and displays the traveling route. Navigation information including route information is outputted to the input unit 52. In other words, the input unit 52 inputs navigation information including travel route information on the map data from the navigation device 70.

Based on the input information of the input unit 52, the arithmetic processing unit 54 determines when the vehicle is turning if the vehicle is turning left or right, which can be determined from the acceleration in the lateral direction and the steering angle. A control command for sound output by the left speaker 130 is generated when the vehicle is turning left, and a control command for sound output by the right speaker 132 is generated when the vehicle is turning right, and these control commands are forwarded to the output unit 56.

Furthermore, the arithmetic processing unit 54 corrects the control commands in such a way that the sound pressure level of the sound to be outputted from the left speaker 130 or the right speaker 132 increases as the lateral acceleration, the change (differential value) of the lateral acceleration, the steering angle, the change (differential value) of the steering angle, or the vehicle speed increases.

Based on the navigation information inputted to the input unit 52, the arithmetic processing unit 54 generates a control command to output a sound from the left speaker 130 when the current location of the vehicle or the road on the travel route ahead of the current location by a predetermined distance is a left turn curve. When the road is a right turn curve, a control command is generated for the right speaker 132 to output sound. In either case, the control command is forwarded to the output unit 56.

Furthermore, based on the navigation information, the arithmetic processing unit 54 corrects the control command in such a manner that the sound pressure level of the sound outputted by the left speaker 130 and the right speaker 132 is higher when the curvature of the road on the current location or a part of the road ahead of the current location by a predetermined distance is equal to or greater than a predetermined value (when the curve is sharp) than when the curvature is less than the predetermined value (when the curve is mild), and forwards the corrected control command to the output unit 56. The predetermined distance from the current location may be a distance which the vehicle takes several tens of seconds to reach, and may thus depend on the vehicle speed.

A speaker control unit 158 is connected to the output unit 56. A left speaker 130 and a right speaker 132 are individually connected to the speaker control unit 158. The speaker control unit 158 includes an amplifier or the like, and individually controls the sound outputs of the left speaker 130 and the right speaker 132 based on control commands.

By the control action described above, the left speaker 130 outputs sound when turning left. As a result, the occupant seated on the seat main body 20 hears the sound emitted from the sound output unit 130A from the side of the left ear. In addition, the right speaker 132 outputs sound when turning right. As a result, the occupant seated on the seat main body 20 hears the sound emitted from the sound output unit 132A from the side of the right ear.

The sound output of the left speaker 130 and the right speaker 132 may be repeating single pattern, rhythmic sounds, songs, voices, and the like. The sound may also be a voice guidance such as "Turning left" and "Turning right".

Accordingly, the occupant seated on the seat main body 20 can recognize the turning direction by the sound output of the left speaker 130 or the right speaker 132 when the vehicle is turning. In this way, by making the seat occupant aware of the turning direction, motion sickness is less likely to occur than when the occupant is not aware of the turning direction so that motion sickness can be effectively prevented.

In the vehicle seat device 10 of the second embodiment, since the navigation information is used, turning of the vehicle can be detected in advance, and the sound can be outputted from the left speaker 130 or the right speaker 132 depending on the turning direction while the vehicle is still traveling a straight part of the road before reaching the curve.

Therefore, the occupant seated on the seat main body 20 can recognize the turning direction by the sound output from the left speaker 130 or the right speaker 132 before turning. In this manner, the seat occupant is made aware of the turning direction prior to turning, thereby motion sickness can be effectively prevented.

The control unit 50 controls the sound pressure level of the sound output of the left speaker 130 or the right speaker 132 such that the sound pressure level increases as the acceleration/deceleration in the left/right direction, the steering angle, and the change rate thereof increase, or as the curve gets sharper.

As a result, the seated occupant can recognize the acceleration/deceleration in the left/right direction, the steering angle or the change rate thereof, or the degree of curve by the sound pressure level of the sound outputted from the left speaker 130 or the right speaker 130 so that motion sickness can be prevented even more effectively.

Since the left speaker 130 or the right speaker 132 outputs sound from the sound output unit 130A or 132A provided in the headrest 28 adjacent to the left or right ear of the seat occupant, the information can be accurately transmitted to the seat occupant seated on the seat main body 20 while maintaining the quietness of the cabin.

In the case where there are a plurality of seat main bodies 20 in the cabin, the notification of the turning direction of the automobile by the sound described above may be performed individually for each seat main body 20. As a result, even when there are a plurality of seat main bodies 20 in the cabin, the turning direction of the vehicle can be individually and accurately transmitted to the occupants seated on the seat main bodies 20 while maintaining the quietness of the cabin.

Next, the mode of operation of the vehicle seat device 10 of the second embodiment will be described in the following with reference to the flowchart shown in FIG. 7. The control routine shown in this flow chart is cyclically executed by the control unit 50 at predetermined time intervals.

This control routine is executed during cornering when motion sickness is likely to occur. First, it is determined if the vehicle is turning left (step S110). When the vehicle is turning to the left, sound is outputted from the left speaker 130 (step S111). When the vehicle is not turning to the left, or when the vehicle is turning to the right, sound is outputted from the right speaker 132 (step S112).

Next, it is determined if the steering angle is equal to or greater than a predetermined value, 35 degrees for example (step S113). If the steering angle is equal to or greater than the predetermined value, the sound output level of the left speaker 130 or the right speaker is increased according to the vehicle speed (step S114).

If the steering angle is less than the predetermined value, then it is determined if the lateral acceleration is equal to or greater than a predetermined value (step S115). If the lateral acceleration is equal to or greater than the predetermined value, the sound level of the sound outputted from the left speaker 130 or the right speaker 132 is increased according to the vehicle speed (step S14).

If the lateral acceleration is less than the predetermined value, then it is determined if the curve radius is less than a predetermined value (step S116). The predetermined value of the curve radius is set according to the vehicle speed so as to decrease as the vehicle speed increases. For example, when the vehicle speed is 60 km/h, it is set to 60 m. If the curve radius is less than the predetermined value, the sound output level of the left speaker 130 or the right speaker 132 is increased according to the vehicle speed (step S14).

If the curve radius is equal to or greater than the predetermined value, the routine ends without increasing the sound output levels of the left speaker 130 or the right speaker 132.

Third Embodiment

In the third embodiment of the present invention, when the vehicle is turning left, the control unit 50 moves the sound image from the right side to the left side of the headrest 28 by controlling the left speaker 130 and the left speaker 132. When the vehicle is turning right, the control unit 50 moves the sound image from the left side to the right side of the headrest 28 by controlling the left speaker 130 and the left speaker 132.

In the third embodiment, when the vehicle is turning to the left, the seat occupant on the seat main body 20 hears the sound output from the left speaker 130 and the right speaker 132 close to the ears as if the sound image moves from the right sound output unit 132A to the left sound output unit 130A. When the vehicle is turning to the right, the seat occupant on the seat main body 20 hears the sound output from the left speaker 130 and the right speaker 132 close to the ears as if the sound image moves from the left sound output unit 132A to the right sound output unit 130A.

The seat occupant can thus recognize the turning direction of the vehicle from the moving direction of this sound image. In this way, the turning direction of the vehicle can be accurately conveyed to the seat occupant seated on the seat main body 20 while maintaining the quietness of the vehicle cabin.

In the third embodiment as well, the arithmetic processing unit 54, based on the navigation information inputted to the input unit 52, generates a control command for controlling the left speaker 130 and the right speaker 132 such that the sound image moves from the right side to the left side of the headrest 28 when the current position or a part of the road some distance ahead of the current position is a leftward turn, and the sound image moves from the left side to the right side of the headrest 28 when the current position or a part of the road some distance ahead of the current position is a rightward turn, and forwards the control command to the output unit 56. In this case as well, the predetermined distance from the current position may be a distance which the vehicle requires to travel in several tens of seconds, and may be set in dependence on the vehicle speed.

Furthermore, in the third embodiment, the arithmetic processing unit 54, based on the navigation information, when the curvature of the road at the current location or a part of the road ahead of the current location by a predetermined distance is equal to or greater than a predetermined value (when the curve is sharp), the control command is corrected so that the moving speed of the sound image is faster than when the curvature is less than the predetermined value (when the curve is gentle), and the corrected control command is forwarded to the output unit 56.

The control unit 50 performs the control action so as to increase the moving speed of the sound image as the acceleration/deceleration in the lateral direction, the steering angle, and the change rate thereof increase.

As a result, the seat occupant can recognize the acceleration/deceleration in the lateral direction, the steering angle and the change rate thereof, and the severity of the curve from the moving speed of the sound image.

The output sound of the left speaker 130 and the right speaker issue from the sound output units 130A and 132A located in the parts of the headrest 28 near the left and right ears of the seat occupant, respectively so that the turning direction of the vehicle can be accurately conveyed to the seat occupant seated on the seat main body 20 while maintaining the quietness of the cabin.

Figure 8:
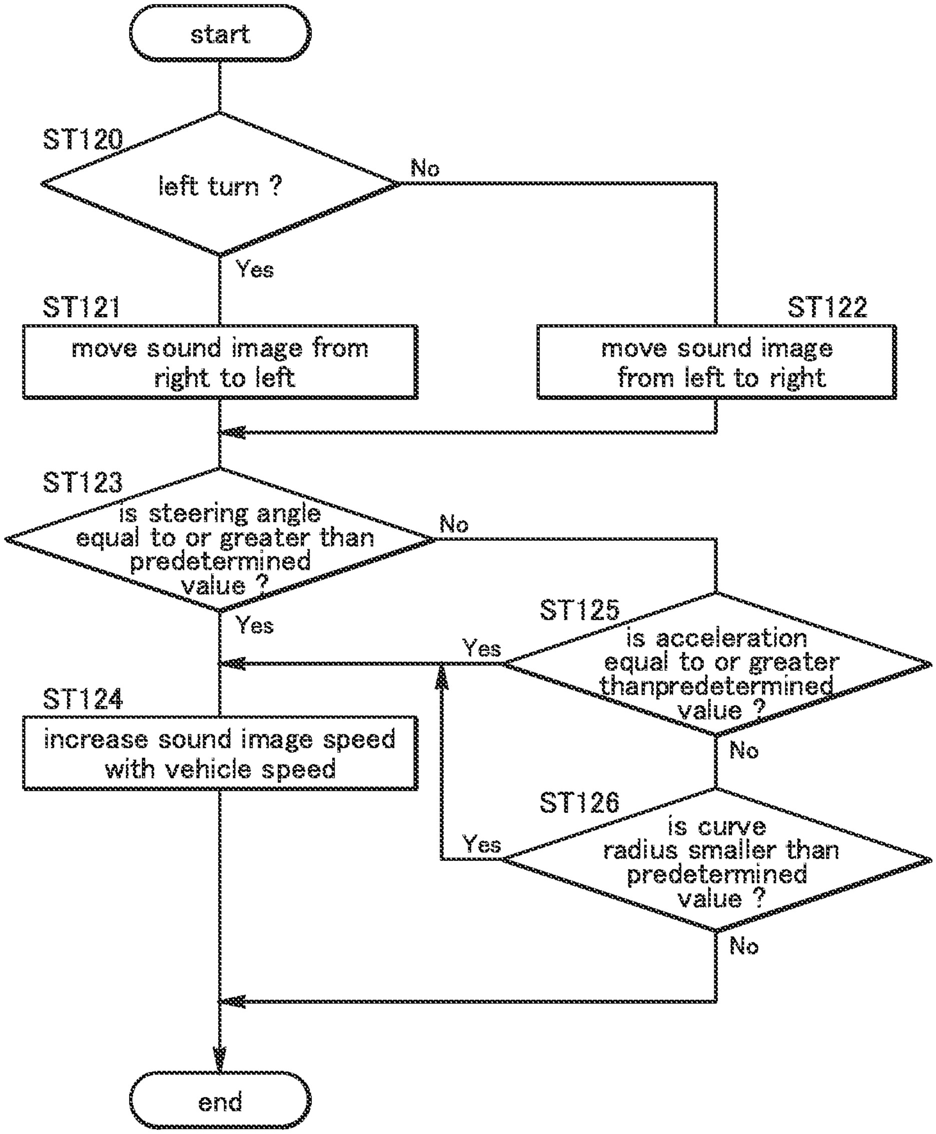
FIG. 8 is a flow chart of the control system of a vehicle seat device according to a third embodiment of the present invention.

Next, the mode of operation of the vehicle seat device 10 according to the third embodiment will be described in the following with reference to the flowchart shown in FIG. 8. The control routine shown in this flow chart is cyclically executed by the control unit 50 at predetermined time intervals.

This control routine is to be executed during cornering when motion sickness is likely to occur. For this purpose, it is determined if the vehicle is turning to the left (step S120). When the vehicle is turning to the left, sound is outputted from the left speaker 130 and the right speaker 132 as if the sound image is moving from the right side to the left side (step S121). When it is not the case of a leftward turn, or when the vehicle is turning to the right, the left speaker 130 and the right speaker 132 output sound as if the sound image moves from left to right (step S122).

Next, it is determined if the steering angle is equal to or greater than a predetermined value, 35 degrees for example (step S123). If the steering angle is equal to or greater than the predetermined value, the moving speed of the sound image is increased (speeded up) in accordance with the vehicle speed (step S124).

If the steering angle is less than the predetermined value, then it is determined if the lateral acceleration is equal to or greater than a predetermined value (step S125). If the lateral acceleration is equal to or greater than the predetermined value, the moving speed of the sound image is increased according to the vehicle speed (step S124).

If the lateral acceleration is less than the predetermined value, then it is determined if the curve radius is less than s predetermined value (step S126). The predetermined value of the curve radius is set according to the vehicle speed so as to decrease as the vehicle speed increases. For example, when the vehicle speed is 60 km/h, it is set to 60 m. If the curve radius is less than the predetermined value, the moving speed of the sound image is increased according to the vehicle speed (step S124).

If the curve radius is equal to or greater than the predetermined value, the routine ends without increasing the moving speed of the sound image.

The left speaker 130 and the right speaker 132 do not necessarily have to be provided on the left and right sides of the headrest 28, respectively, as long as the sound output units 130A and 32A are located on the left and right sides of the headrest 28, respectively.

Fourth Embodiment

A vehicle seat device according to a fourth embodiment of the present invention will be described in the following with reference to FIGS. 9 and 10.

Figure 9:
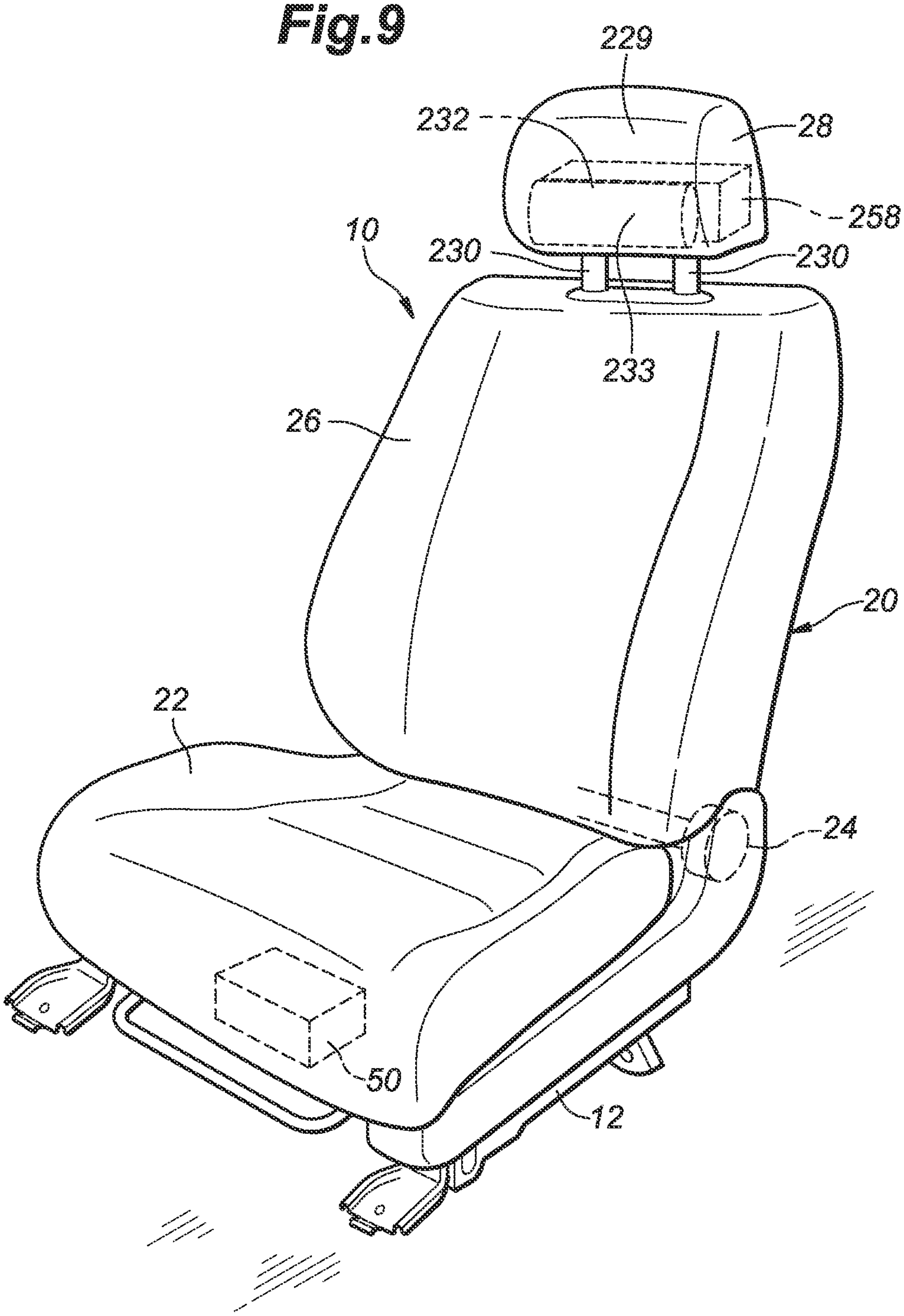
FIG. 9 is a perspective view of a vehicle seat device according to a fourth embodiment of the present invention.
Figure 10:
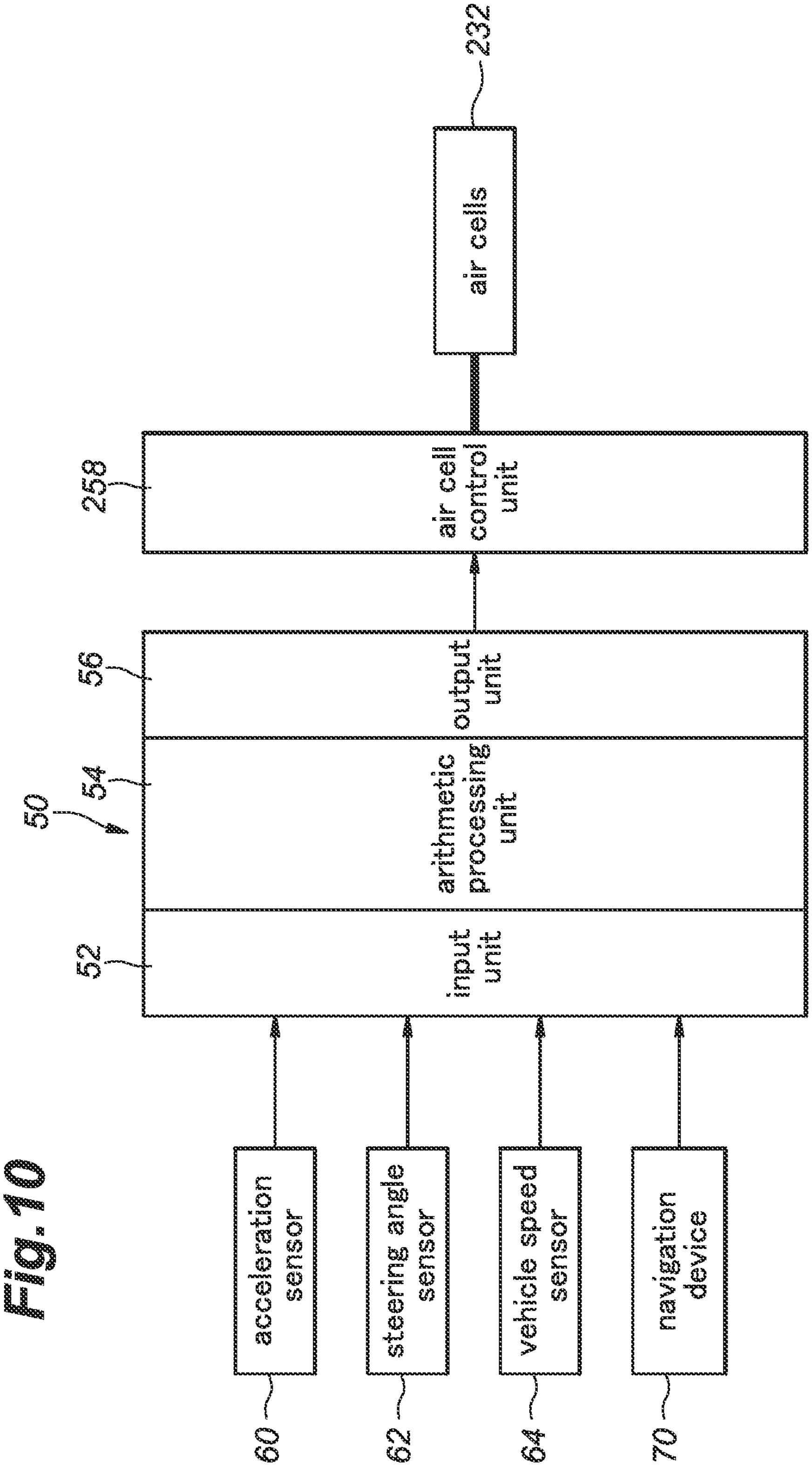
FIG. 10 is a block diagram of a control system of the vehicle seat device of the fourth embodiment.

As shown in FIG. 9, the vehicle seat device 10 of this embodiment is provided with a seat main body 20 supported on a floor panel (not shown in the drawings) of a vehicle such as an automobile via a pair of slide rail devices 12 extending in the fore and aft direction on either side thereof.

The seat main body 20 includes a seat cushion 22 providing a seating surface and a seat back 26 connected to a rear end part of the seat cushion 22 via an electric reclining device 24 that can change the tilt angle of the seat back 26 around a horizontal axis, and providing a backrest surface. A headrest 28 is attached to an upper part of the seat back 26 via a pair of posts 230 extending upward from the seat back 26.

The headrest 28 includes a main part 229 that supports the head of the seat occupant, and a neck support portion 233 that is provided in a lower part of the main part 229 and protrudes forward. The neck support portion 233 incorporates therein an air cell 232. The air cell 232 protrudes forward when inflated forward by being supplied with compressed air. The neck support portion 233 thus protrudes forward owing to the inflation of the air cell 232.

A control unit 50 is positioned under the seat cushion 22.

A control system of the vehicle seat device 10 will be described in the following with reference to FIG. 10. The control unit 50 is based on an electronic information processing device including a microcomputer, and includes an input unit 52, an arithmetic processing unit 54 and an output unit 56.

The input unit 52 is connected to an onboard acceleration sensor (acceleration detection unit) 60, a steering angle sensor (steering angle detection unit) 62, and a vehicle speed sensor (vehicle speed detection unit) 64 which serve as behavior detection units for detecting the behavior of the automobile (vehicle).

The acceleration sensor 60 outputs information on the longitudinal and lateral acceleration of the vehicle to the input unit 52. The steering angle sensor 62 outputs vector information regarding the steering angle of the vehicle to the input unit 52. A vehicle speed sensor 64 outputs information about the traveling speed of the automobile to the input unit 52.

An onboard navigation device 70 is connected to the input unit 52. The navigation device 70 detects the current position of the vehicle on the map data by receiving GPS signals, displays the travel route of the vehicle from the current position to the destination on the map data which is set by the user on the monitor, and displays the travel route. Navigation information including route information is outputted to the input unit 52. In other words, the input unit 52 inputs navigation information including travel route information on the map data from the navigation device 70.

Based on the input information from the input unit 52, the arithmetic processing unit 54 generates a control command that inflates the air cell 232 to a predetermined volume when a vehicle behavior that is likely to cause motion sickness such as cornering of the automobile that can be detected from the lateral acceleration and the steering angle is detected, and forwards this control command to the output unit 56. This control command may be an oscillation control command for a vibrating operation that repeatedly inflates the air cell 232.

Inflation of the air cell 232 causes the neck support portion 233 to protrude forward, so that the neck of the seat occupant, especially the cervical vertebrae, can be supported in a favorable manner, and prevents the neck from wobbling. This is effective in preventing or mitigating motion sickness.

The forward projection of the neck support portion 233 requires less movement than bending the left and right sides of the headrest, and the responsiveness can be improved.

Further, the arithmetic processing unit 54 corrects the control command so as to increase the degree of inflation of the air cell 232, or the forward projection of the neck support portion 233 as the lateral acceleration, the change rate thereof (differential value), the steering angle, the change rate thereof (differential value), and the vehicle speed increase.

Based on the navigation information inputted to the input unit 52, if the current location of the vehicle or the part of the road on the travel route ahead of the current location by a predetermined distance is curved (a curved road), the arithmetic processing unit 54 generates a control command to inflate the air cell 232 to a predetermined volume, and forwards the control command to the output unit 56. This control command may be an oscillation control command for vibrating the air cell 232 by repeatedly inflating and deflating the air cell 223. The predetermined distance from the current location may be a distance for the vehicle to travel in several tens of seconds, and may be set in dependence on the vehicle speed.

Furthermore, based on the navigation information, the arithmetic processing unit 54 corrects the control command in such a manner that the air cell 232 is inflated more or the forward protrusion of the neck support portion 233 is greater when the curvature of the road at the current location or at the part of the road on the travel route ahead of the current location by a predetermined distance is equal to or greater than a predetermined value (when the curve is sharp) than when the curvature is smaller than the predetermined value.

An air cell control unit 258 is connected to the output unit 56. The air cell 232 is connected to the air cell control unit 258. The air cell control unit 258 includes an electromagnetic intake/exhaust valve and the like, and based on the control command from the output unit 56, variably sets the compressed air supply/discharge cycle for the air cell 232 and the compressed air supply/discharge duty time in each cycle.

As a result, the air cell 232 is repeatedly inflated and deflated with a cyclic period (frequency) corresponding to the compressed air supply/discharge cycle with a prescribed compressed air supply/discharge duty time in each cycle. In other words, the air cell 232 vibrates with a variable frequency and variable amplitude determined by the control command, and can provide the seat occupant with vibration stimulation suitable for alleviating motion sickness by using the neck support portion 233. The frequencies, amplitudes and waveforms that are effective in correcting autonomic nerve activity are known to be also effective in alleviating motion sickness. The vibration waveform can be determined by the speed at which the compressed air is supplied to and discharged from the air cell 232.

In the vehicle seat device 10 of the fourth embodiment, a cornering of the vehicle can be detected in advance owing to the use of the navigation information. Therefore, the air cell 232 may be inflated, and cause the neck support portion 233 to project forward to retain the neck of the occupant more firmly before the cornering of the vehicle takes place or before the vehicle enters a curve from a straight road. By thus retaining the neck of the seat occupant securely prior to cornering, motion sickness can be more effectively prevented.

The control unit 50 performs a control action that increases the inflation of the air cell 232 as the acceleration in the longitudinal direction, the acceleration in the lateral direction, the steering angle, and the change rates thereof increase, and as the curve gets sharper. As a result, the occupant is made aware of the intensities of the longitudinal and lateral accelerations, the steering angle, the change rates thereof, and the curvature of the curve by the amount of forward protrusion of the neck support portion 233 so that motion sickness can be prevented even more effectively.

Fifth Embodiment 5

A vehicle seat device according to a fifth embodiment of the present invention will be described in the following with reference to FIG. 11.

In this embodiment, the headrest 28 includes an upper member 240 which is fixed to the seat back 26 by a pair of posts 230 to form an upper part of the headrest 28, and a lower member 242 positioned in a lower part of the upper member 240 via a pair of mutually cooperating guide rails 244 and 246 so as to be movable in the fore and aft direction relative to the upper member 240 so form a lower part of the headrest 28. The upper member 240 forms the main body of the headrest 28 and the lower member 242 forms a neck support portion.

The posts 230 are fixedly connected to the upper member 240 at the upper ends thereof, and extend through a cavity 242A formed in the lower member 242. The guide rails 244 and 246 jointly form a linear guide so as to be relatively movable in the longitudinal direction. The upper guide rail 244 is fixed to the lower surface of the upper member 240 and the lower guide rail 246 is fixed to the upper surface of the lower member 242.

A linear actuator 248 is attached to a lower part of the upper member 240 via a bracket 245, and is provided with an actuating rod 249 which is connected to the lower member 242 via a bracket 245.

The linear actuator 248, which may be hydraulic or electric, can displace the lower member 242 forward and rearward relative to the upper member 240.

Figure 11:
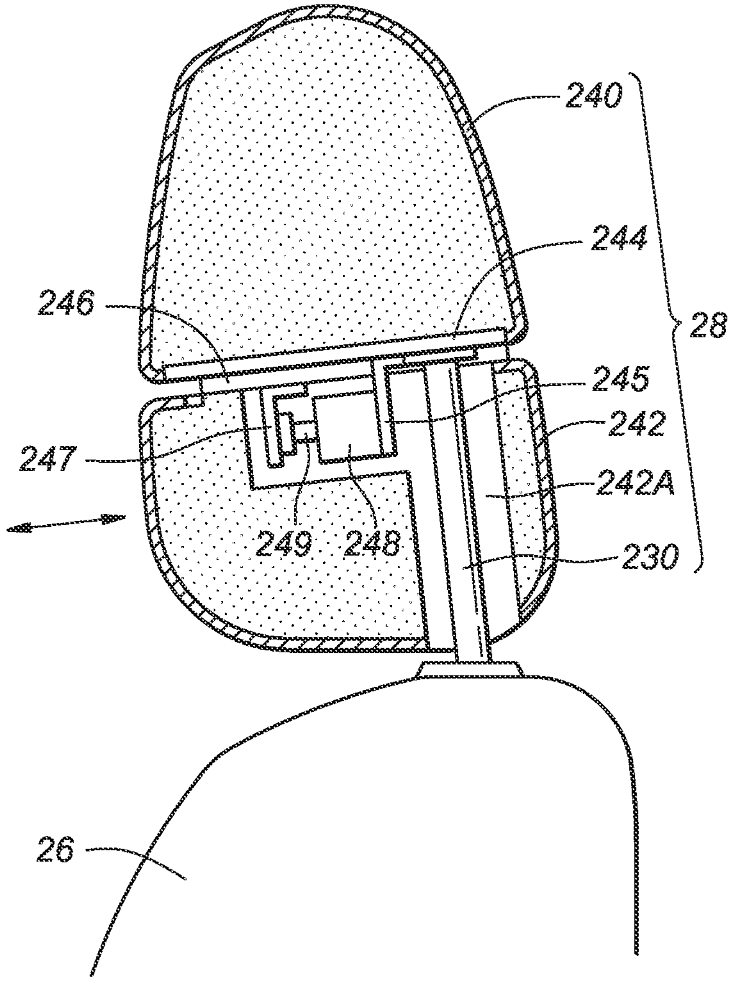
FIG. 11 is a sectional view of a part of a vehicle seat device according to a fifth embodiment of the present invention.

The linear actuator 248 may be controlled by a controller similar to the control unit 50 shown in FIG. 11. Thereby, the lower member 242 operates in the same manner as the neck support portion 233 of the above-described embodiment, and the same effect as that of the above-described embodiment can be obtained.

It is also possible to laterally arrange three air cells 232 on the left, right, and center of the headrest 28, and to allow these air cells 232 to be individually inflated so that the neck of the seat occupant may be retained in an even more favorable manner.

Sixth Embodiment

In the following description, the various directions such as the front/rear, left/right, and up/down directions will be defined with respect to the vehicle.

Figure 12:
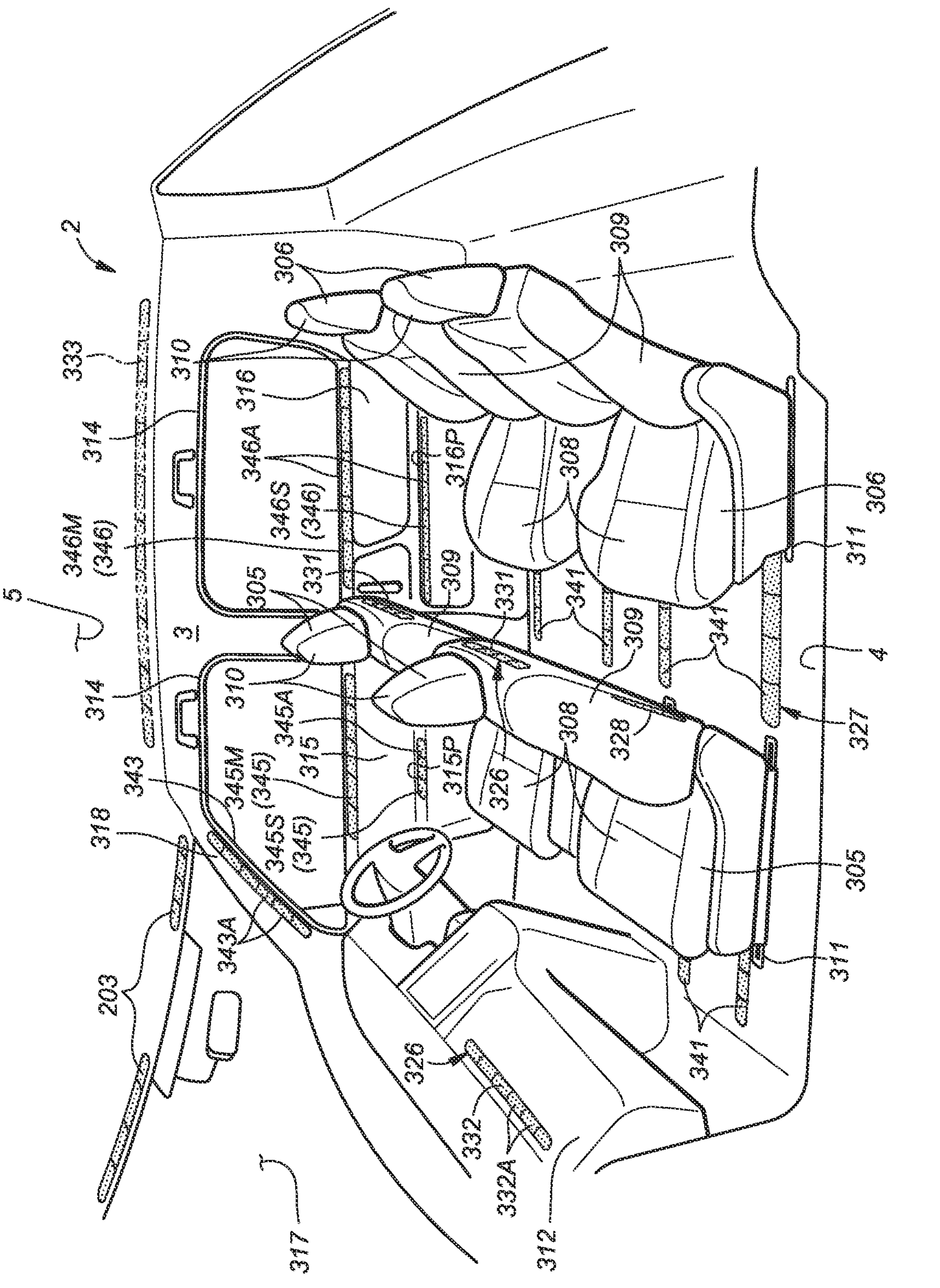
FIG. 12 is a perspective view of a cabin of a vehicle provided with a motion sickness preventing system according to a sixth embodiment of the present invention.
Figure 13:
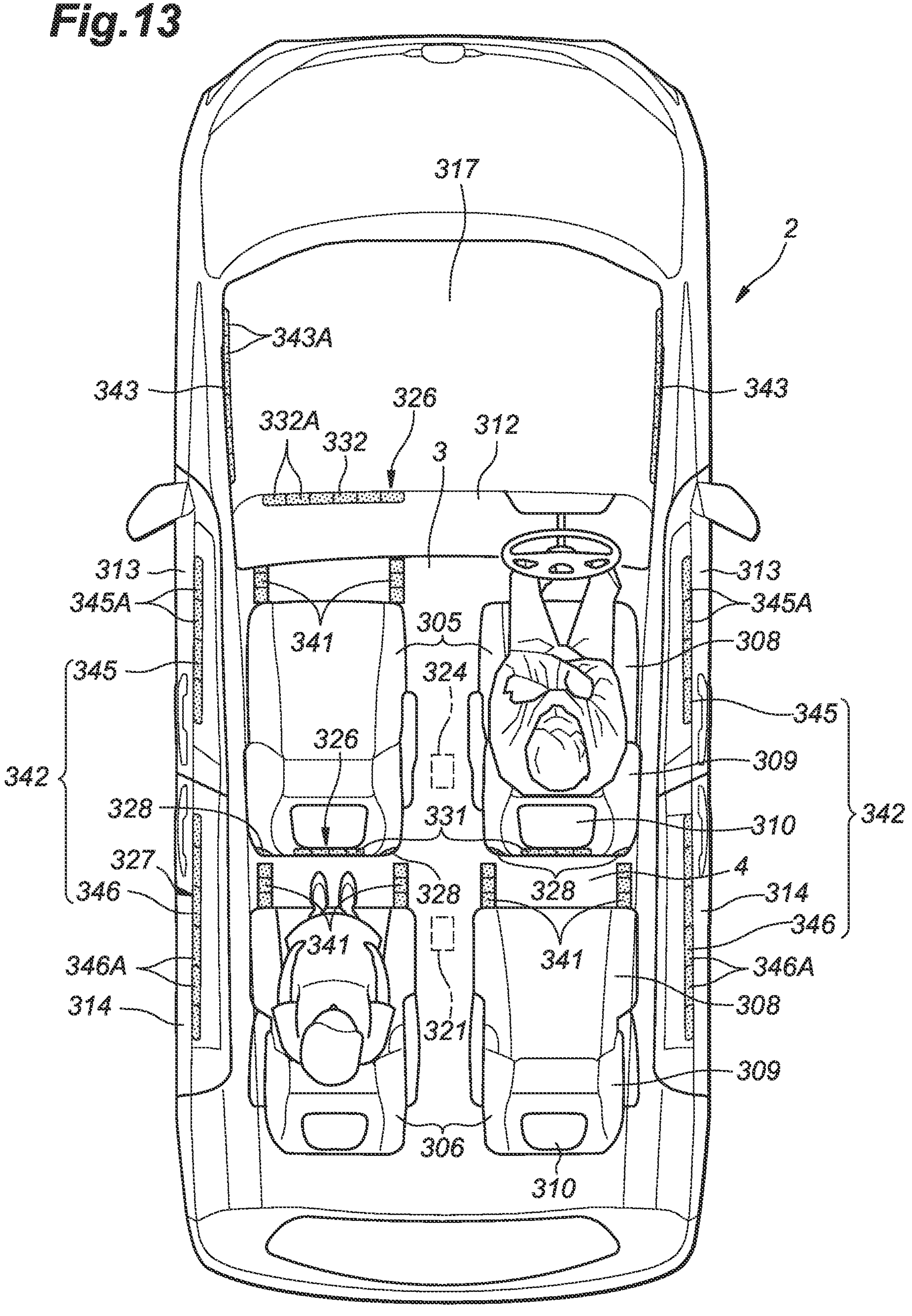
FIG. 13 is a top view of a cabin of the vehicle provided with the motion sickness preventing system of the sixth embodiment.

As shown in FIGS. 12 and 13, the vehicle 2 to which the motion sickness preventing system 1 (see FIG. 14) is applied is a four-wheel automobile. The vehicle 2 is provided with a vehicle cabin 3 for occupants to board. A pair of front seats 305 and a pair of rear seats 306 are placed one behind the other on a floor 4 that defines the bottom of the vehicle cabin 3. One of the front seats 305 constitutes a driver's seat, and the other constitutes an assistant's seat.

The front seats 305 are positioned in front of the rear seats 306, and the rear seats 306 are positioned behind the front seats 305. Thus, the front seats 305 form front row seats positioned in front of the rear seats 306, and are located in the front row among the seats arranged in the vehicle cabin 3. The rear seats 306 form rear row seats located behind the front seats 305.

Each of the front seats 305 and the rear seats 306 is provided with a seat cushion 308 supported by the floor 4, a seat back 309 connected to a rear part of the seat cushion 308, and a headrest 310 provided in an upper part of the seat back 309.

In the sixth embodiment, each seat cushion 308 is attached to the floor 4 via a pair of slide rails 311 extending in the fore and aft direction. Therefore, the front seats 305 and the rear seats 306 are slidable in the fore and aft direction with respect to the floor 4.

An instrument panel 312 is provided in front of the front seats 305. A pair of front doors 313 are provided on either side of the front seats 305 and a pair of rear doors 314 are provided on either side of the rear seats 306. The inner surfaces of the front doors 313 and the rear doors 314 are fitted with door trims 315 and 316.

A windshield 317 (also referred to as a front window) is provided above the instrument panel 312. A pair of front pillars (A pillars) 318 are provided on either side of the windshield 317. The front pillars 318 extends obliquely upward toward the rear.

Next, the motion sickness preventing system 1 will be described. The motion sickness preventing system 1 is a system intended to prevent occupants from suffering from motion thickness, or to alleviate motion sickness even when the occupants should get motion sickness. In the following disclosure, the term "preventing motion sickness" should be understood to mean either case.

Figure 14:
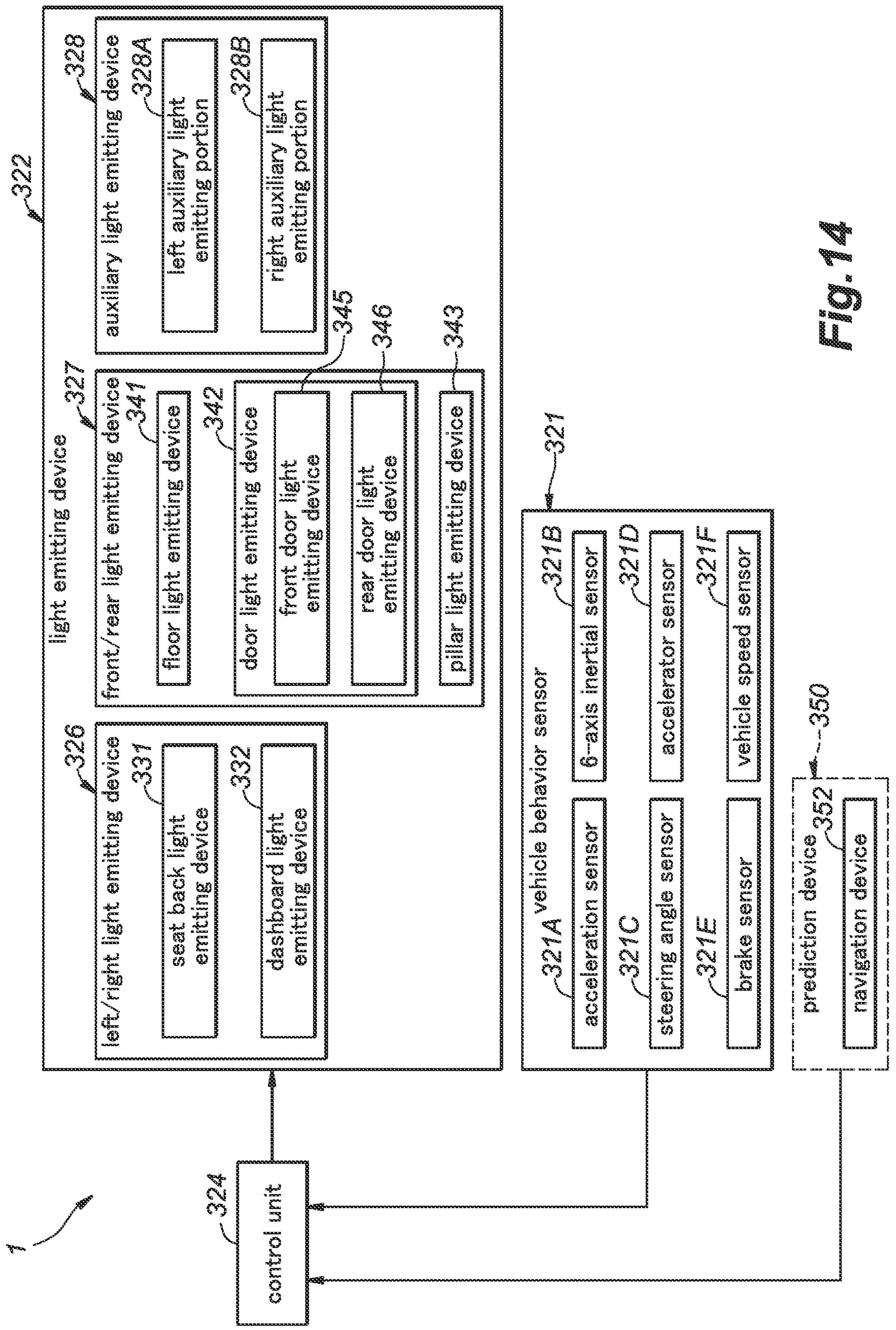
FIG. 14 is a block diagram of the motion sickness preventing system.

The motion sickness preventing system 1 includes, as shown in FIG. 14, a vehicle behavior sensor 321, a light emitting device 322, and a control unit 324 that controls the light emitting device 322 based on a signal from the vehicle behavior sensor 321.

The vehicle behavior sensor 321 is a device (acquisition device) for obtaining information (vehicle behavior information) regarding the behavior of the vehicle 2, and is connected to the control unit 324. The behavior of the vehicle 2 here includes, for example, a cornering of the vehicle 2, a lateral acceleration of the vehicle 2, and the like. The behavior information acquired by the vehicle behavior sensor 321 includes, for example, a fore and aft acceleration, a lateral acceleration, a vertical acceleration, a roll rate, a pitch rate, a yaw rate, a fore and aft velocity, a lateral velocity, a vertical velocity, and a traveling speed of the vehicle.

The vehicle behavior sensor 321 includes an acceleration sensor 321A that acquires fore and aft acceleration and lateral acceleration of the vehicle 2. The vehicle behavior sensor 321 may further include a 6-axis inertia sensor 321B that detects the longitudinal, lateral and vertical accelerations, and the angular velocities such as the roll rate, pitch rate and yaw rate, a steering angle sensor 321C that detects the steering angle, an accelerator sensor 321D that detects the accelerator pedal depression, a brake sensor 321E that detects the depression of the brake pedal, a vehicle speed sensor 321F that detects the vehicle speed, and the like.

Light emitting devices 322 are provided inside the vehicle cabin 3 and emit light toward the inside of the vehicle cabin 3. The light emitting devices 322 are connected to and controlled by the control unit 324. The light emitting devices 322 include linear lateral light emitting devices 326 arranged along the vehicle width direction, linear longitudinal light emitting devices 327 arranged along the longitudinal direction, and linear auxiliary light emitting devices 328 arranged along the vertical direction.

The lateral light emitting devices 326 include a pair of seat back light emitting device 331 and a dashboard light emitting device 332.

Figure 15:
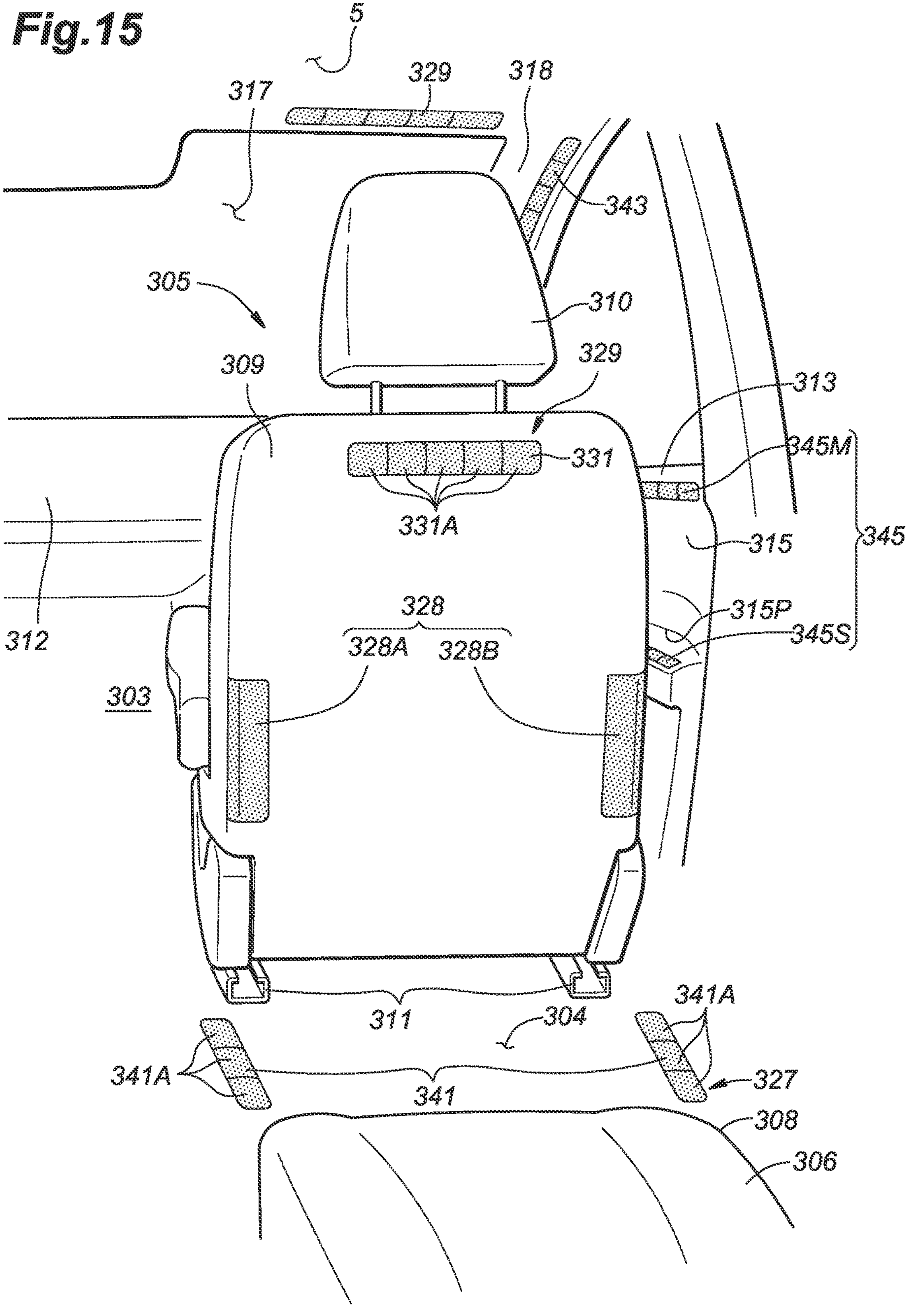
FIG. 15 is a view of an interior of a cabin as viewed from a rear seat toward a back side of a front seat.

As shown in FIGS. 12, 13 and 15, the seat back light emitting devices 331 are provided on the rear surfaces of the seat backs 309 of the front seats 305, respectively. More specifically, the seat back light emitting devices 331 are each arranged in an upper part of the back surface of the seat back 309 of the corresponding front seat 305 and extend in the vehicle width direction (horizontal direction). Each seat back light emitting device 331 includes a plurality of light emitting regions 331A (see FIG. 15) which may consist of individual LEDs arranged in the vehicle width direction in an upper part of the back surface of the seat back 309. The light emitting regions 331A can blink individually.

Figure 16:
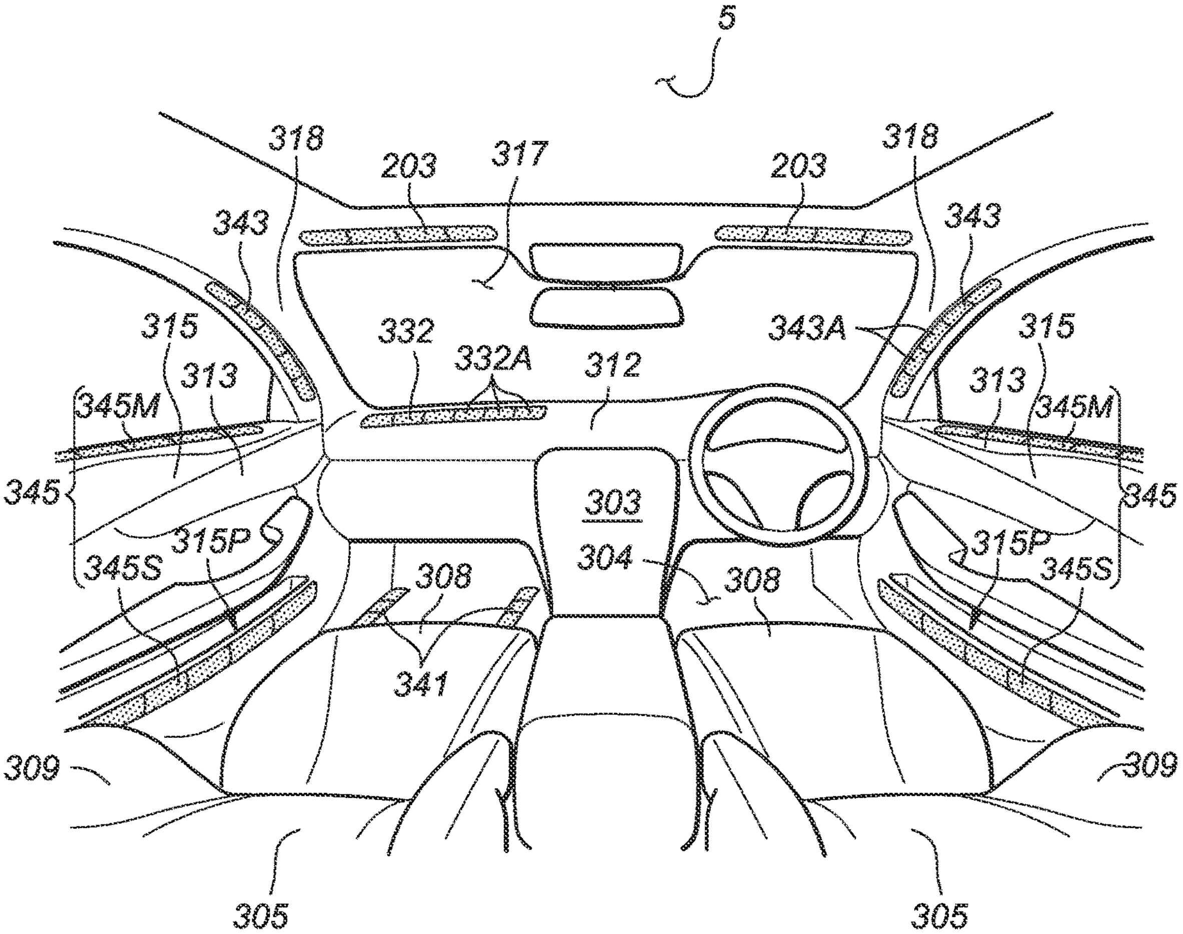
FIG. 16 is a view of a front part of the cabin of the vehicle provided with the motion sickness preventing system of the sixth embodiment.

The dashboard light emitting device 332 is provided on the instrument panel 312 as shown in FIGS. 12, 13 and 16. In the sixth embodiment, the dashboard light emitting device 332 is provided in a part of the instrument panel 312 in front of the front seat 305 forming the assistant's seat, and extends in the vehicle width direction (horizontal direction). The dashboard light emitting device 332 includes a plurality of light emitting regions 332A which may consist of LEDs arranged in the vehicle width direction. The light emitting regions 332A can blink individually.

The longitudinal light emitting devices 327 include floor light emitting devices 341, door light emitting devices 342 and pillar light emitting devices 343.

As shown in FIGS. 12, 13, 15 and 16, the floor light emitting devices 341 are provided on the floor 4 so as to extend in the fore and aft directions. The floor light emitting devices 341 are provided on the floor 4 between the front seats 305 and the rear seats 306 in pairs. More specifically, the floor light emitting devices 341 are provided on the part of the floor 4 located in front of each of the rear seats 306 in a laterally spaced relationship. The floor light emitting devices 341 are also provided in front of the front seat 305 forming the assistant's seat. It should be noted that the floor light emitting device 341 is not provided in front of the front seat 305 that forms the driver's seat. Preferably, each pair of floor light emitting devices 341 are respectively provided on the outer sides of the left and right legs of the occupant seated on the corresponding seat located immediately behind the floor light emitting device 341. For example, the floor light emitting devices 341 provided on the floor 4 between the front seats 305 and the rear seats 306 may extend in the fore and aft direction slightly outside the corresponding left and right slide rails 311.

Each floor light emitting device 341 includes a plurality of light emitting regions 341A which may consist of LEDs arranged in the fore and aft direction. Each light emitting device 341A can blink individually.

FIGS. 12, 13, 15 and 16 show the door light emitting devices 342 which include front door light emitting devices 345 which are provided in the door trims 315 of the right and left front doors 313, and rear door light emitting devices 346 which are provided in the door trims 316 of the right and left rear doors 314.

Each front door light emitting device 345 includes a primary front door light emitting portion 345M extending longitudinally along the upper edge of the door trim 315 of the corresponding front door 313, and an auxiliary front door light emitting portion 345S extending longitudinally along the open end of a door pocket 315P provided in the door trim 315, and is thus positioned laterally next to the front seat 305 of the corresponding side.

Each front door light emitting device 345 (primary front door light emitting portion 345M and auxiliary front door light emitting portion 345S) includes a plurality of light emitting regions 345A consisting of individual LEDs arranged in the fore and aft direction on the door trim 315 of the front door 313. The light emitting regions 345A can blink individually.

Each rear door light emitting device 346 includes a primary rear door light emitting portion 346M extending in the fore and aft direction along the upper edge of the door trim 316 of the rear door 314, and an auxiliary rear door light emitting portion 346S extending in the fore and aft direction along the opening of the door pocket 316P provided in the door trim 316, The rear door light emitting device 346 is thus positioned laterally next to the rear seat 306 of the corresponding side.

Each rear door light emitting device 346 (primary rear door light emitting portion 346M and auxiliary front door light emitting portion 346S) includes a plurality of light emitting regions 346A consisting of individual LEDs arranged in the fore and aft direction on the door trim 316 of the rear door 314. The light emitting regions 346A can blink individually.

FIGS. 12, 15 and 16 show the pillar light emitting devices 343 that are provided on the surfaces of the left and right front pillars 318 facing the cabin 3. Each pillar light emitting device 343 extends along the surface of the front pillar 318 on the side of the cabin 3 while tilting upward toward the rear. Each pillar light emitting device 343 includes a component extending forward due to the inclination of the front pillar 318 in the fore and aft direction.

Each pillar light emitting device 343 includes a plurality of light emitting regions 343A consisting of individual LEDs arranged along the extending direction of the front pillar 318. The light emitting regions 343A can blink individually.

FIGS. 12, 13 and 15 show the auxiliary light emitting devices 328 which include a pair of left auxiliary light emitting portions 328A provided along either lower side edge of the back surface of the seat back 309 of the left front seat 305, and a pair of right auxiliary light emitting portions 328B provided along either lower side edge of the back surface of the seat back 309 of the right front seat 305. The left auxiliary light emitting portion 328A and the right auxiliary light emitting portion 328B each include a plurality of light emitting regions (not shown in the drawings) consisting of individual LEDs arranged in the vertical direction, and each light emitting region can blink individually.

FIG. 14 shows a control unit 324 (see FIG. 14) which consists of a computer having a central processing unit (CPU), RAM, ROM, and a storage device, and controls the light emitting devices 322 based on the vehicle behavior information acquired by the vehicle behavior sensor 321. More specifically, when the vehicle 2 is running, the control unit 324 repeatedly executes a light emitting process for controlling light emission of the light emitting regions included in the light emitting devices 322 based on the behavior information in such a manner that the light emitting regions are individually controlled.

Figure 17:
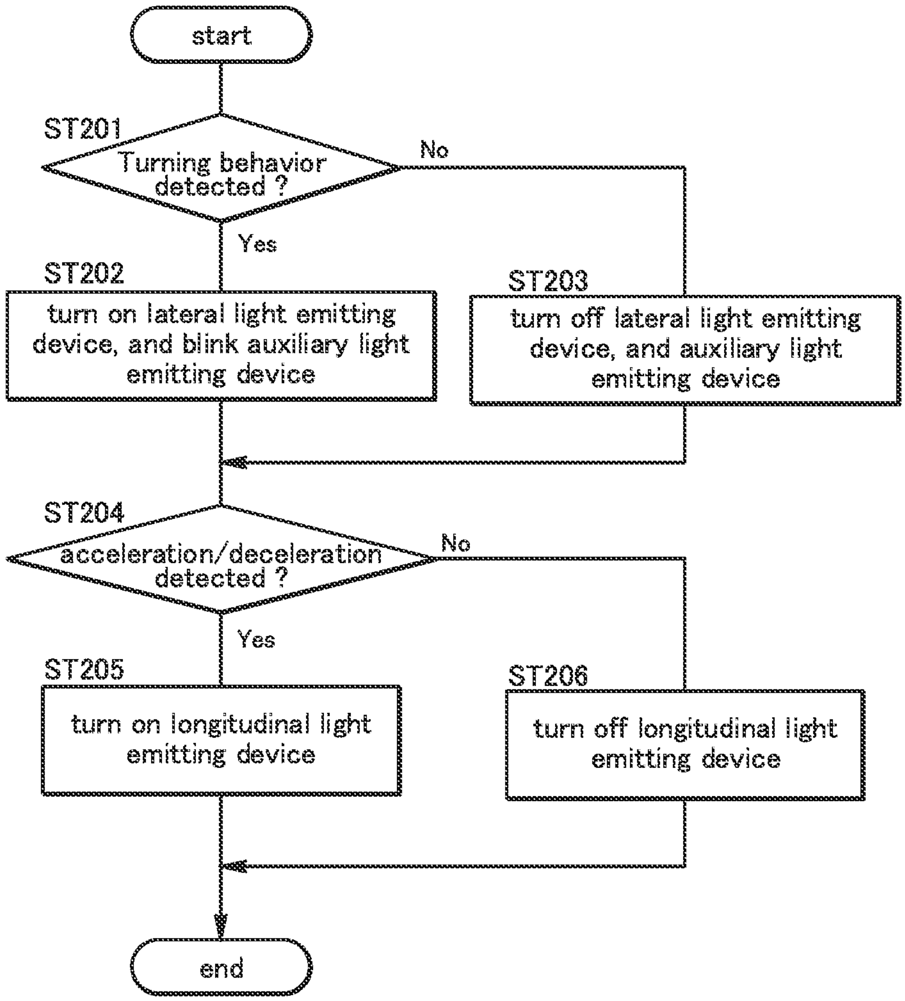
FIG. 17 is a flowchart showing a process of emitting light in the motion sickness preventing system of the sixth embodiment.

The light emitting process executed by the control unit 324 will be described in the following with reference to the flowchart shown in FIG. 17. The light emitting processing routine shown in the flowchart of FIG. 17 is cyclically executed by the control unit 324 at predetermined time intervals.

In the first step ST201 of the light emitting process, the control unit 324 determines if the vehicle 2 is turning, or if a vehicle turning behavior is detected based on the behavior information acquired by the vehicle behavior sensor 321. In the sixth embodiment, the control unit 324 determines a turning behavior when the magnitude of the lateral acceleration is equal to or greater than a predetermined threshold value (hereinafter referred to as lateral threshold value). The control unit 324 executes step ST202 when the magnitude of the lateral acceleration is equal to or greater than the lateral threshold value (when a turning behavior is detected), and otherwise executes step ST203.

The control unit 324 determines the turning direction in step ST202, and controls the lateral light emitting devices 326 to emit light so that the distribution of the illuminated regions dynamically changes in a manner corresponding to the turning behavior. More specifically, when the vehicle 2 is turning left (or the lateral acceleration detected by the vehicle behavior sensor 321 is directed in the leftward direction), the control unit 324 controls the lateral light emitting devices 326 such that the light emitting regions move leftward. When the vehicle 2 is turning right (or the lateral acceleration detected by the vehicle behavior sensor 321 is directed in the rightward direction), the control unit 324 controls the lateral light emitting devices 326 such that the illuminated regions move rightward.

In a certain embodiment, when the vehicle behavior sensor 321 detects leftward acceleration, the control unit 324 controls the light emitting regions of the lateral light emitting devices 326 to blink from left to right.

Figure 18:
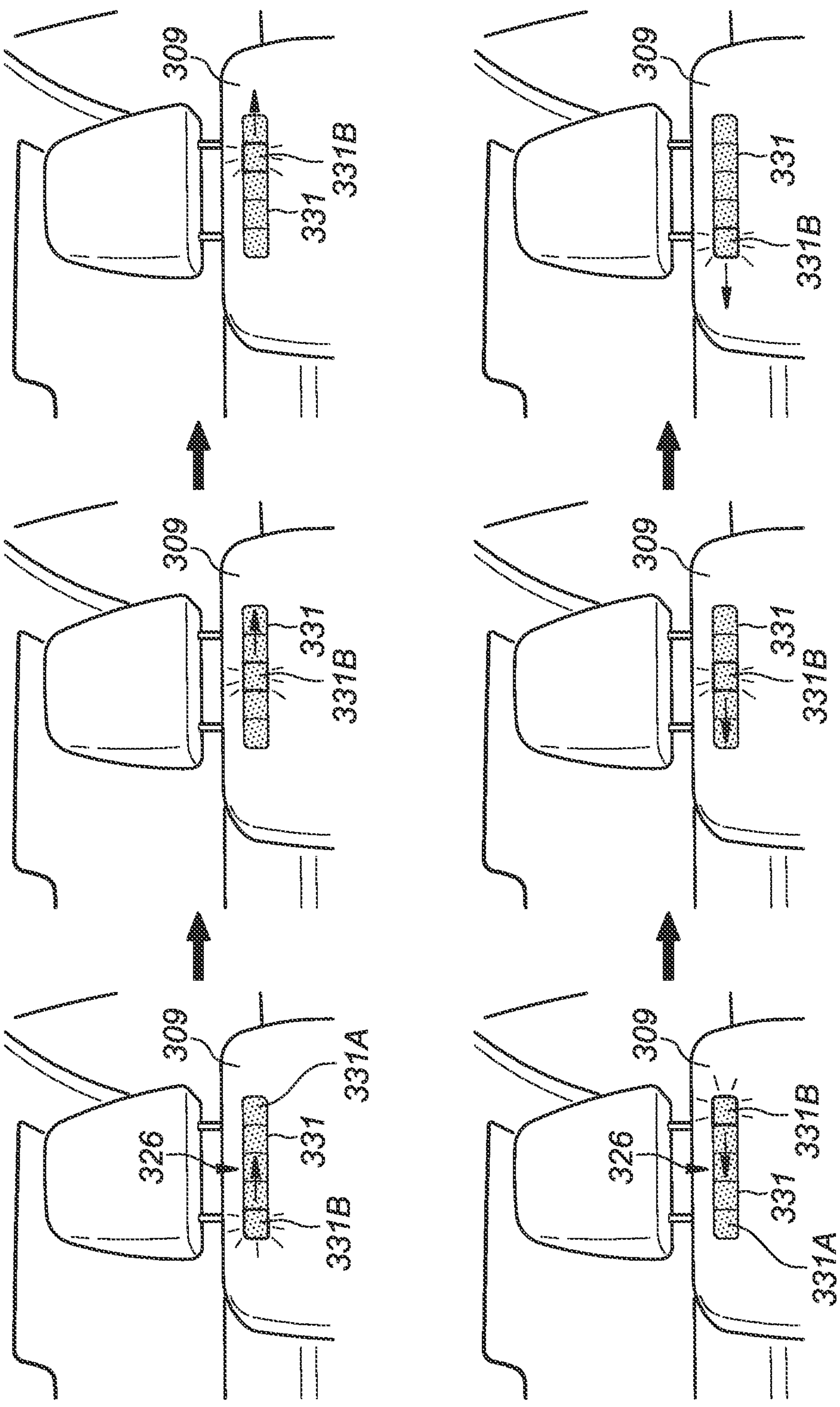
FIG. 18 shows diagrams showing changes in the light emitting regions of a seat back light emitting device (A) when the vehicle is turning left and (B) when the vehicle is turning right.

As a result, when the vehicle 2 is turning left, the light emitting regions of the lateral light emitting devices 326 (the light emitting regions 331A of the seat back light emitting devices 331 in FIG. 18A) sequentially light from left to right. This lighting mode is perceived by the occupant as a dynamic movement of the light emitting regions 331B of the seat back light emitting device 331 from left to right (a flow of the light emitting regions from left to right).

When the vehicle behavior sensor 321 detects rightward acceleration, the control unit 324 controls the light emitting regions of the lateral light emitting devices 326 to blink from right to left.

As a result, when the vehicle 2 is turning right, the light emitting regions of the lateral light emitting devices 326 (the light emitting regions 331A of the seat back light emitting devices 331 in FIG. 18A) sequentially light from right to left. This lighting mode is perceived by the occupant as a dynamic movement of the light emitting regions 331B of the seat back light emitting device 331 from right to left (a flow of the light emitting regions from left to right).

The control unit 324 controls the timing of blinking the light emitting regions of the lateral light emitting devices 326 one after another based on the magnitude of the lateral acceleration acquired by the vehicle behavior sensor 321. More specifically, the control unit 324 shortens the time interval (delay) for the adjacent light emitting regions to emit light one after another as the magnitude of the lateral acceleration increases. Accordingly, as the lateral acceleration of the vehicle 2 increases, the light emitting regions 331B of the lateral light emitting devices 226 move faster.

When the vehicle 2 is turning left (or when the vehicle behavior sensor 321 detects a leftward acceleration), the control unit 324 executes a control action that turns off the right auxiliary light emitting portion 328B and turns on the blinking of the left auxiliary light emitting portion 328A in step ST202. When it is detected that the vehicle 2 is turning right (or when the vehicle behavior sensor 321 detects a rightward acceleration), the control unit 324 executes a control action that turns off the left auxiliary light emitting portion 328A and turns on the blinking of the right auxiliary light emitting portion 328B in step ST202. Following the start of the lighting control of the lateral light emitting devices 326 and the blinking control of the auxiliary light emitting devices 328, the control unit 324 executes step ST204.

In step ST203, the control unit 324 stops the light emission of the lateral light emitting devices 326 and the auxiliary light emitting devices 328. When the stop control is completed, the control unit 324 executes step ST204.

The control unit 324 determines if the vehicle 2 is accelerating or decelerating based on the behavior of the vehicle 2 acquired by the vehicle behavior sensor 321 in step ST204. More specifically, the control unit 324 executes step ST205 when the magnitude of the fore and aft acceleration acquired by the vehicle behavior sensor 321 is equal to or greater than a predetermined threshold value (hereinafter referred to as a longitudinal threshold value), and otherwise executes step ST206.

In step ST205, the control unit 324 controls the longitudinal light emitting devices 327 to emit light so that the distribution of the light emitting regions dynamically may change in a manner corresponding to the acceleration and deceleration of the vehicle 2. More specifically, when the vehicle 2 is accelerating (that is, the fore and aft acceleration detected by the vehicle behavior sensor 321 is in the forward direction), the control unit 324 controls the longitudinal light emitting devices 327 such that the lighted light emitting regions move from the front to the rear.

Figure 19:
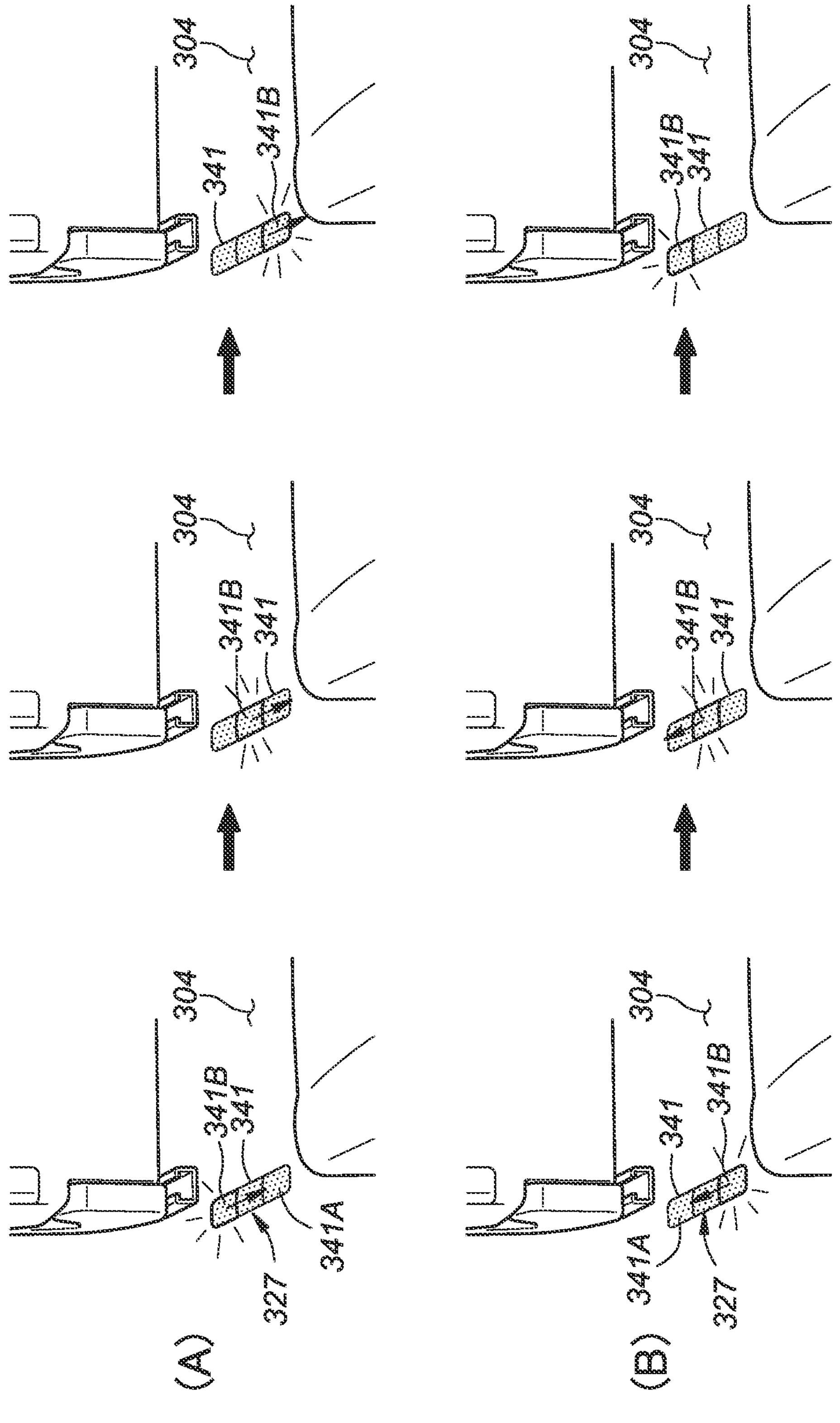
FIG. 19 shows diagrams showing changes in the light emitting region of the seat back light emitting device (A) when the vehicle is accelerating and (B) when the vehicle is decelerating.

As a result, when the vehicle 2 is accelerating, the light emitting regions 341A of the longitudinal light emitting devices 327 (the light emitting regions 341B of the floor light emitting devices 341 in FIG. 19A) sequentially light up from the front to the rear. This lighting mode is perceived by the occupant that the light emitting regions 341B appear to dynamically move from the front to the rear (the light emitting regions 341B to flow from the front to the rear).

When the vehicle 2 is decelerating (or when the fore and aft acceleration detected by the vehicle behavior sensor 321 is in the rearward direction), the control unit 324 controls the longitudinal light emitting devices 327 so that the light emitting regions move from the rear to the front.

As a result, when the vehicle 2 is decelerating, the light emitting regions 341A of the longitudinal light emitting devices 327 (the light emitting devices 341B of the floor light emitting devices 341 in FIG. 19B) sequentially light up from the rear to the front. This lighting mode is perceived by the occupant that the light emitting regions 341B appear to dynamically move from the rear to the front (the light emitting regions 341B appear to flow from the rear to the front).

In step ST206, the control unit 324 performs a control action to stop the light emission of the longitudinal light emitting devices 327, and ends this routine.

Next, the mode of operation of the motion sickness preventing system 1 will be described in the following.

When the vehicle 2 turns left, the control unit 324 controls the lateral light emitting devices 326 to emit light in such a manner that the light emitting regions move leftward along the extending direction of the lateral light emitting devices 326. As a result, as shown in FIG. 18A, the seat back light emitting devices 331 emit light in such a manner that the light emitting regions 331B thereof move leftward along the extending direction of the seat back light emitting devices 331. Similarly to the seat back light emitting devices 331, the dashboard light emitting device 332 also emits light in such a manner that its light emitting regions move leftward along the extending direction of the dashboard light emitting device 332. At this time, the right auxiliary light emitting portion 328B is turned off, and the left auxiliary light emitting portion 328A blinks.

When the vehicle 2 turns right, the control unit 324 controls the lateral light emitting devices 326 to emit light in such a manner that the light emitting regions move rightward along the extending direction of the lateral light emitting devices 326. As a result, as shown in FIG. 18B, the seat back light emitting devices 331 emit light in such a manner that the light emitting regions 331B thereof move rightward along the extending direction of the seat back light emitting devices 331. Similarly to the seat back light emitting devices 331, the dashboard light emitting device 332 also emits light in such a manner that its light emitting regions move rightward along the extending direction of the dashboard light emitting device 332. At this time, the right auxiliary light emitting portion 328A is turned off, and the left auxiliary light emitting portion 328B blinks.

When the vehicle 2 accelerates, the control unit 324 performs a control action that causes the longitudinal light emitting devices 327 to emit light in such a manner that the light emitting regions move from front to back along the extending direction of the longitudinal light emitting devices 327. As a result, as shown in FIG. 19A, each floor light emitting device 341 emits light such that the light emitting regions 341B thereof move rearward along the extending direction of the floor light emitting device 341. The pillar light emitting devices 343 and the door light emitting devices 342 also emit light in such a manner that the light emitting regions move rearward along their extending directions, similarly to the floor light emitting devices 341.

When the vehicle 2 decelerates, the control unit 324 performs a control action that causes the longitudinal light emitting devices 327 to emit light in such a manner that the light emitting regions move from back to front along the extending direction of the longitudinal light emitting devices 327. As a result, as shown in FIG. 19B, each floor light emitting device 341 emits light such that the light emitting regions 341B thereof move forward along the extending direction of the floor light emitting device 341. The pillar light emitting devices 343 and the door light emitting devices 342 also emit light in such a manner that the light emitting regions move forward along their extending directions, similarly to the floor light emitting devices 341.

Next, the effects of the motion sickness preventing system 1 will be discussed in the following. When the vehicle 2 turns and the vehicle behavior sensor 321 detects a lateral acceleration equal to or greater than the lateral threshold value, the lateral light emitting devices 326 emit light so that the illuminated regions move laterally. Therefore, the occupant can recognize the lateral inertial force applied to his or her body and the direction of the inertial force owing to the changes in the illuminated regions of the lateral light emitting devices 326. As a result, the occupant can be prepared in advance for the inertial force, and the discrepancy or incongruity between the semicircular canals and the visual sense of the occupant can be corrected, thereby preventing motion sickness.

Figure 20:
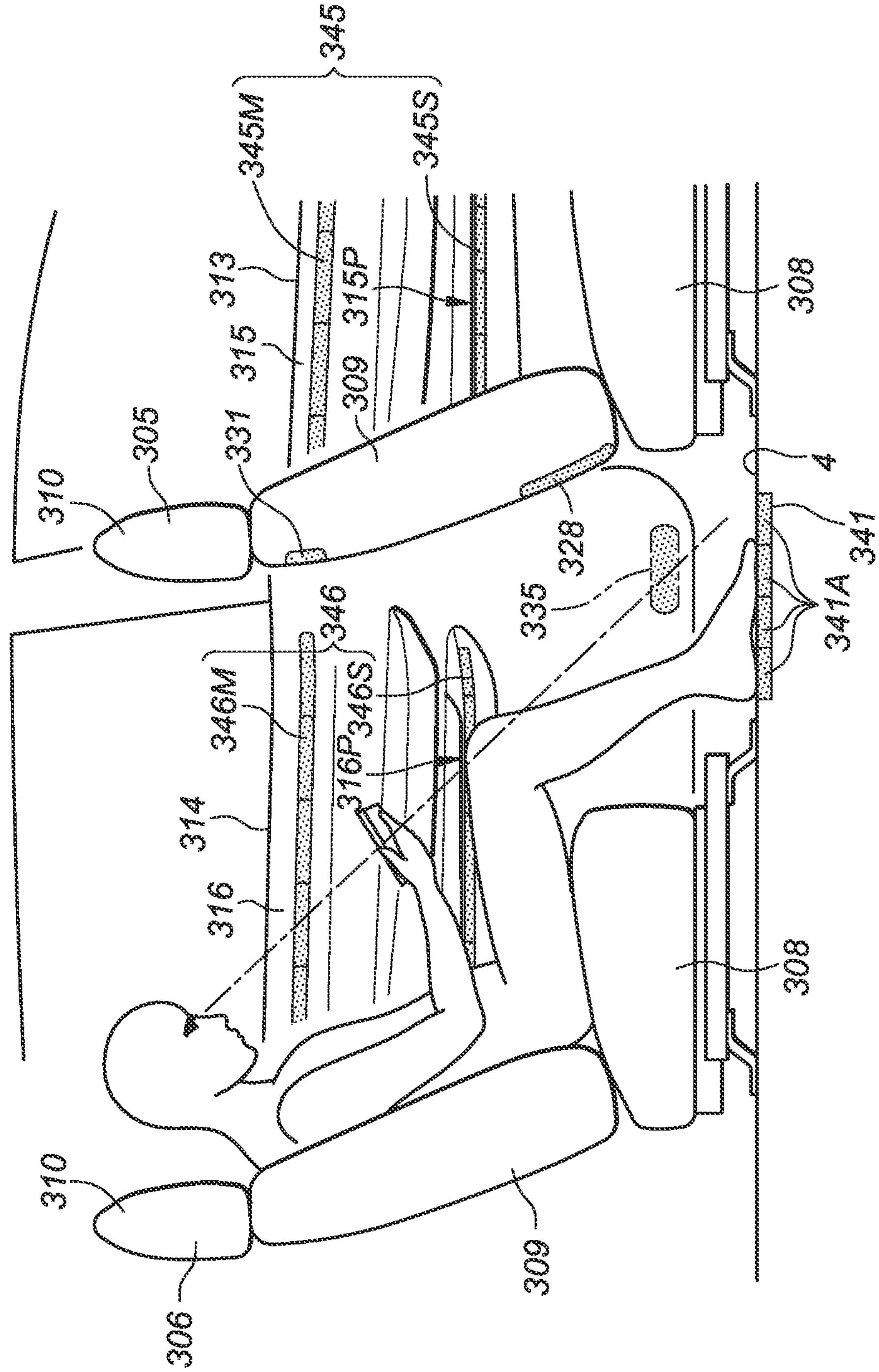
FIG. 20 is a diagram showing the field of view of an occupant seated in a rear seat and operating a smartphone.

The lateral light emitting devices 326 extend in the lateral direction. Therefore, it is possible to change the distribution of the light emitting regions according to the movement of the vehicle 2 in the lateral direction, and the movement mode of the vehicle 2 in the lateral direction can be appropriately conveyed to the occupant. In particular, among the lateral light emitting devices 326, the seat back light emitting devices 331 are positioned at the upper end of the back surfaces of the seat backs 309 of the front seats 305, so that even when the user seated on the rear seat 306 is operating a smartphone or reading a book as shown in FIG. 20, the occupant is enabled to recognize the light emission of the corresponding seat back light emitting device 331 in a reliable manner.

The lateral light emitting devices 326 (the seat back light emitting devices 331 and the dashboard light emitting device 332) each include a plurality of light emitting regions 331A and 332A arranged laterally. The control unit 324 causes the light emitting regions 331A and 332A to blink from left to right when a leftward acceleration is detected by the acceleration sensor 321A, and causes light emitting regions 331A and 332A to blink from right to left when a rightward acceleration is detected. As a result, the illuminated regions move in the lateral direction according to the direction of the lateral acceleration. In this way, the control unit 324 can dynamically change the light emitting regions of the lateral light emitting devices 326 by controlling the light emission timings of the light emitting regions 331A and 332A. Since the movement direction of the lateral light emitting devices 326 enables the occupant to predict the direction of the inertial force applied to the body of the occupant, it is possible to prevent motion sickness.

When the vehicle 2 accelerates or decelerates and the vehicle behavior sensor 321 detects a fore and aft acceleration equal to or greater than the longitudinal threshold value, the longitudinal light emitting devices 327 emit light so that the illuminated regions move forward and backward. More specifically, when the vehicle 2 accelerates and the vehicle behavior sensor 321 detects an acceleration equal to or greater than the longitudinal threshold value, in each of the floor light emitting devices 341, the pillar light emitting devices 343, and the door light emitting devices 342 included in the longitudinal light emitting devices 327, the light emitting regions or illuminated regions are illuminated so as to move from front to back. Conversely, when the vehicle 2 decelerates and the vehicle behavior sensor 321 detects a deceleration equal to or greater than a longitudinal threshold value, the light emitting regions or illuminated regions are illuminated so as to move from back to front.

Therefore, the occupant recognizes that an inertial force in the longitudinal direction is applied to the body of the occupant and knows the direction of the inertial force owing to the change in the illuminated regions of any one of the floor light emitting devices 341, the pillar light emitting devices 343 and the door light emitting devices 342. Thereby, motion sickness can be prevented. Further, as shown in FIG. 20, since the floor light emitting devices 341 and the primary rear door light emitting portions 346M are located so as to be readily visible to an occupant seated in the rear seat 306 even when the occupant is operating a smartphone or the like, the acceleration/deceleration of the vehicle 2 can be notified to the occupant in a reliable manner.

Seventh Embodiment

Figure 3:
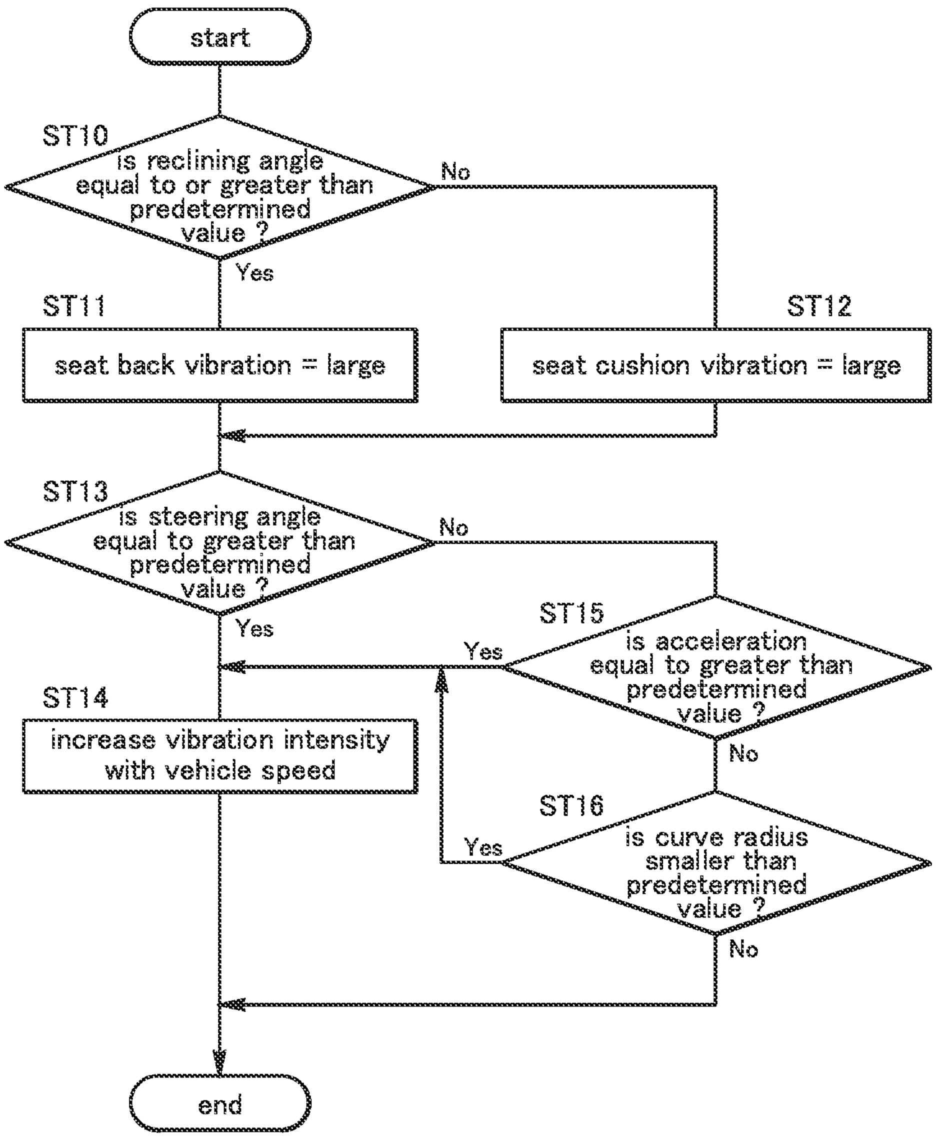
FIG. 3 is a flow chart of the control system of the vehicle seat device of the first embodiment.

The motion sickness preventing system 1 of the seventh embodiment differs from that of the sixth embodiment in being provided with an acquisition device for acquiring behavior information for predicting the occurrent a curve and forwards the behavior information to the control unit 324 in the form of a prediction device 350 (see FIG. 3). This embodiment is otherwise similar to the sixth embodiment, and the parts similar to those of the sixth embodiment may be omitted in the following description.

The prediction device 350 is an output device that acquires behavior information required for predicting if the vehicle 2 is about to make a turn or not, and includes a navigation device 352. The navigation device 352 acquires a route along which the vehicle 2 is expected to travel (hereinafter referred to as a planned travel route) based on an input from the occupant. The navigation device 352 identifies the current location of the vehicle 2 by receiving GPS signals from positioning satellites, and outputs the current location of the vehicle 2 and the planned travel route to the control unit 324. However, the present invention is not limited to this embodiment, and the prediction device 350 may include devices other than the navigation device 352. Further, the prediction device 350 may be configured as a driving assist system that sets a route for the vehicle 2 to follow and autonomously drives the vehicle 2 along the set route.

Figure 21:
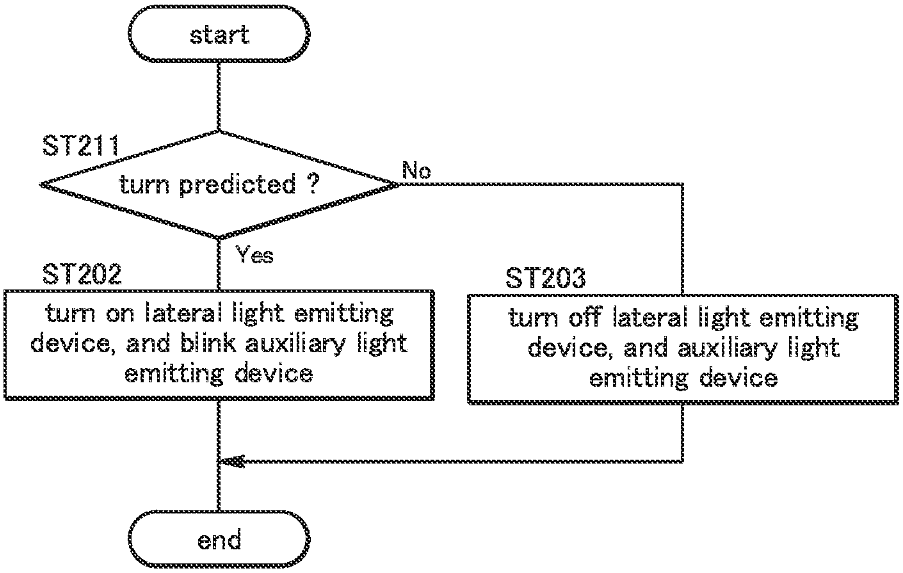
FIG. 21 is a flowchart of a light emitting process in the motion sickness preventing system of a seventh embodiment of the present invention.

The light emitting process of the seventh embodiment differs from that of the sixth embodiment in that the control unit 324 executes step ST211, instead of step ST201, and ends the light emitting process after executing steps ST202 and ST203. The light emitting process of the seventh embodiment will be described in the following with reference to FIG. 21.

In step ST211, the control unit 324 acquires information for predicting if the vehicle 2 will make a turn from the prediction device 350, and predicts if the vehicle 2 will turn after a predetermined period of time. The control unit 324 acquires the current location of the vehicle 2 and the planned travel route from the navigation device 352, and determines that the vehicle is about to make a turn if the route contains a right or left turn within a predetermined distance from the current location of the planned travel route, or there is a curved section on the part of the route ahead of the current location. The predetermined distance in this case should be selected so as not to contain both a leftward and a rightward curve, or two intersections. When a turning of a vehicle is predicted, the control unit 324 executes step ST202, and otherwise executes step ST203.

Next, the mode of operation and effects of the motion sickness preventing system 1 configured in this way will be discussed in the following. The control unit 324 predicts if the vehicle 2 will make a turn in step ST11. When a turn is predicted, the control unit 324 causes the lateral light emitting devices 326 (seat back light emitting devices 331 and the dashboard light emitting device 332) to emit light in a way that corresponds to the turning direction. More specifically, when the vehicle 2 is about to turn left, the lateral light emitting devices 326 emit light in such a manner that the illuminated regions move from left to right, and when the vehicle 2 is about to turn right, the lateral light emitting devices 326 are caused to emit light in such a manner that the illuminated regions move from right to left.

Therefore, the occurrence of a turning behavior of the vehicle 2 can be recognized in advance by the light emission of the lateral light emitting devices 326 before a left or right acceleration is applied to the occupant. Also, when a turning behavior is predicted, the occupant can recognize the turning direction from the moving direction of the light emitting regions of the lateral light emitting devices 326. In other words, the occupant can predict in advance the inertial force applied to be applied to the body of the occupant the vehicle 2 actually makes a turn so that motion sickness can be prevented.

Eighth Embodiment

The motion sickness preventing system 1 according to an eighth embodiment of the present invention differs from the previous embodiment in that the moving speed of the illuminated regions can be individually selected for each of the longitudinal light emitting devices 327. Since the present invention is otherwise similar to the previous embodiment, the description of such parts will be omitted in the following description.

When the vehicle behavior sensor 321 detects a fore and aft acceleration, the control unit 324 causes the light emitting devices 327 (floor light emitting devices 341, pillar light emitting devices 343 and door light emitting devices 342) so that the light emitting regions move in a direction opposite to that of the fore and aft acceleration detected by the vehicle behavior sensor 321, similarly to in the previous embodiment.

However, when the magnitude of the fore and aft acceleration acquired by the vehicle behavior sensor 321 is equal to or less than a predetermined threshold (hereinafter referred to as an auxiliary longitudinal threshold value) that is larger than the longitudinal threshold value, the control unit 324 controls all of the longitudinal light emitting devices 327 such that the illuminated regions move at a same speed which is proportional to the acquired fore and aft acceleration.

When the fore and aft acceleration acquired by the vehicle behavior sensor 321 is greater than the auxiliary longitudinal threshold value, the control unit 324 controls the longitudinal light emitting devices 327 such that the moving speed of the illuminated regions of the longitudinal light emitting devices 327 located on a side of the rear seat 306 is proportional to the fore and aft acceleration, similarly as the case where the fore and aft acceleration is equal to or smaller than the auxiliary longitudinal threshold value, but the moving speed of the illuminated regions of the longitudinal light emitting devices 327 located in front of and on a side of the front seat 305 (driver's seat) is set to be somewhat higher than that of the illuminated regions on a side of the rear seat 306.

More specifically, when the fore and aft acceleration acquired by the vehicle behavior sensor 321 is greater than the auxiliary longitudinal threshold value, the control unit 324 sets the moving speeds of the light emitting regions of the rear door light emitting device 346 and the floor light emitting device 341 to be equal to each other and proportional to the fore and aft acceleration, and the moving speeds of the light emitting regions of the pillar light emitting devices 343 and the front door light emitting devices 345 to be higher than the moving speed of the light emitting regions of the rear door light emitting devices 346 (or the floor light emitting devices 341).

Next, the effect of the motion sickness preventing system 1 configured in this way will be discussed in the following. The front door light emitting device 345 corresponds to the front door light emitting device provided on the door trim 315 located on a side of a front row seat (front seat 305) on the floor 4, and is located on the side of the driver's seat. One of the pillar light emitting devices 343 is also located in front of the driver's seat. These two light emitting devices are easily visible to the driver.

When the fore and aft acceleration of the vehicle 2 is greater than the auxiliary longitudinal threshold value, the moving speed of the light emitting regions of the pillar light emitting devices 343 and the front door light emitting devices 345 next to the front seat 305 is higher than those located next to the rear seats 306. As a result, when the vehicle 2 is accelerated at a fore and aft acceleration equal to or greater than the auxiliary longitudinal threshold value, the driver perceives the fore and aft acceleration to be greater than the actual fore and aft acceleration, and is thereby discouraged from overly accelerating the vehicle 2 so that the safety of the vehicle 2 can be enhanced. On the other hand, the moving speed of the light emitting regions of the rear door light emitting devices 46 located next to the occupant seated on the rear seats 306 and the floor light emitting devices 341 located in front of the front seat 305 serving as the assistant's seat and the rear seats 306 is determined simply in dependence on the fore and aft acceleration. Therefore, the occupants seated in the rear seats are enabled to accurately perceive the fore and aft acceleration, and are therefore prevented from getting motion sickness.

In the above-described embodiment, the light emitting regions of the lateral light emitting devices 326 and the longitudinal light emitting devices 327 are configured to move according to the behavior of the vehicle 2, but the present invention is not limited to this embodiment, and the distribution and the moving speed of the light emitting regions may be changed depending on other behaviors of the vehicle 2.

Figure 22:
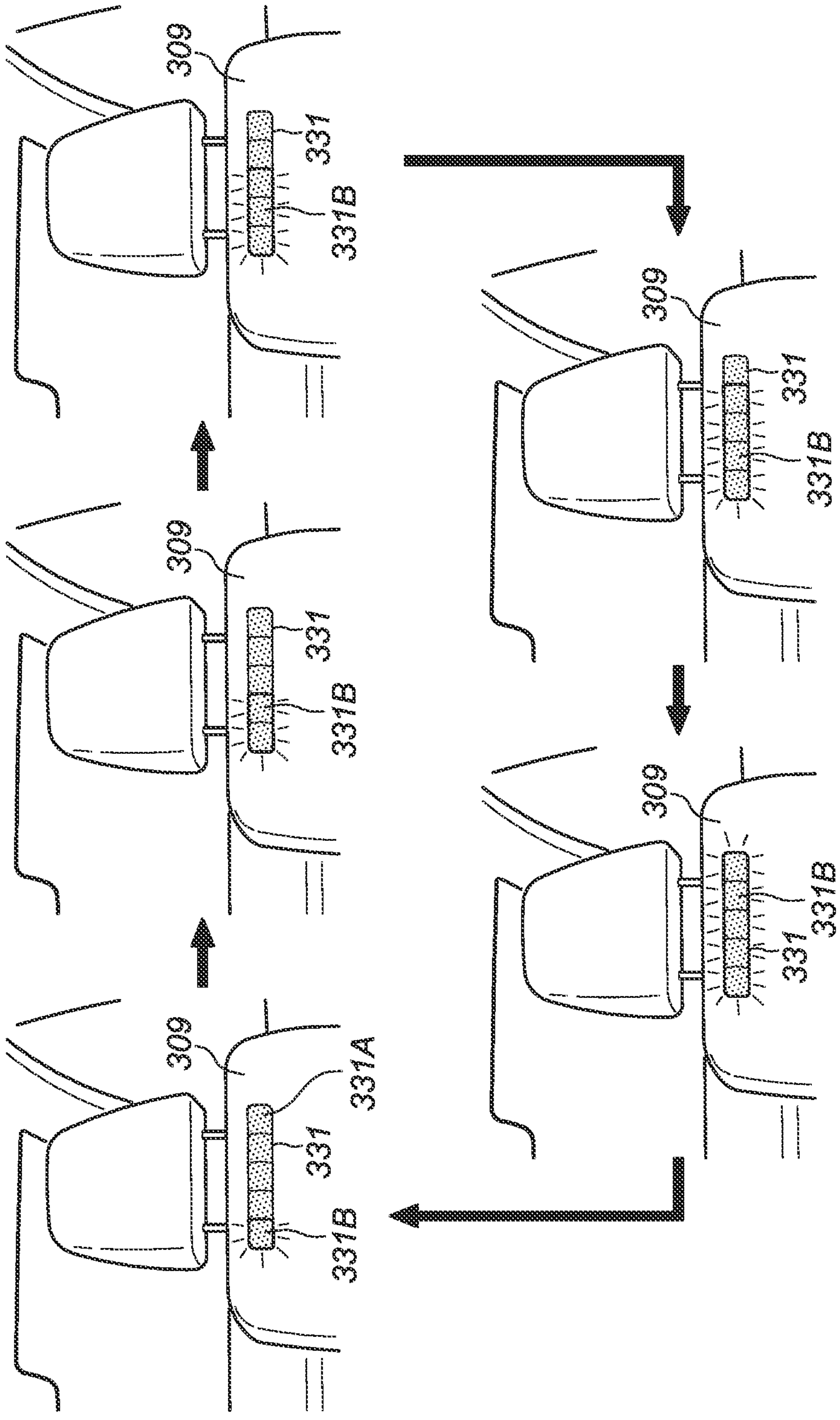
FIG. 22 is a diagram illustrating a light emitting mode of a lateral light emitting device of a motion sickness preventing system according to an eighth embodiment of the present invention.

The light emitting devices 322 may include an array of multicolor LEDs extending in the prescribed direction. In this case, the control unit 324 may be configured to change the color of the light emitted from the light emitting devices 322 according to the acceleration direction of the vehicle 2. As shown in FIG. 22, the control unit 324 may control the light emitting devices 322 such that the light emitting regions 331A emit light from one side to another, and after all the light emitting regions 331A have emitted light, all of the light emitting devices are turned off before the light emitting device 322 starts emitting light sequentially from one side to another once again.

In the foregoing third embodiment, the moving speed of the light emitting regions was set for each of the longitudinal light emitting devices 327, but this is not restrictive, and the dynamic changing speed of the distribution of the light emitting regions of the light emitting devices 322 may set for each of the longitudinal light emitting devices 327.

Although the prediction device 350 consisted of the navigation device 352 or the advanced driving assist system in the previous embodiment, the present invention is not limited to this aspect. The prediction device 350 may be any device as long as it predicts the behavior of the vehicle 2, and may include, for example, a road surface sensor that detects unevenness of the road surface in the traveling direction. Based on the unevenness detected by the road surface sensor, the control unit 324 may predict the vertical acceleration of the vehicle 2, and notify the occupant of the predicted vertical acceleration by turning on the vertically extending light emitting devices 322 (more specifically, the pillar light emitting devices 343).

In the sixth to eighth embodiments of the present invention, the cabin contained two rows of seats or the front seats 305 and the rear seats 306, but the present invention is not limited to this aspect. Three or more rows of seats may be arranged in the vehicle cabin. For example, when the cabin contains front seats 305, middle seats, and rear seats 306, the front seats 305 will be front row seats located ahead of the middle seats, the middle seats will be front row seats located ahead of the rear seats, and the rear seats will be rear row seats located behind the middle seats.

Seat back light emitting devices 331 and auxiliary light emitting devices 328 are provided on the back surfaces of the front seats 305 and the middle seats, respectively, that may be considered as forming the front row seats. In addition, floor light emitting devices 341 may be provided on parts of the floor 4 located between the front row seats and the rear row seats, or between the front seats 305 and the middle seats, between the middle seats and the rear seats 306, and in front of the front seat serving as the assistant's seat. In addition, when three rows of seats are provided in the vehicle interior, and door lighting devices 342 are provided so as to extend in the fore and aft direction on the sides of the front seats 305, the middle seats, and the rear seats 306, the control unit 324 may cause the moving speed of the light emitting regions of the door light emitting device 342 located on a side of the front seat 305 (the driver's seat) to be higher than being simply in proportion to the acceleration, and to be slightly higher than that of the door light emitting devices 342 on the sides of the middle seats and the rear seats 306.

The locations where the lateral light emitting devices 326 and the longitudinal light emitting devices 327 are positioned are not limited to those in the sixth to eighth embodiments. For example, the lateral light emitting devices 326 may include front light emitting devices 329 (see FIGS. 15 and 16) positioned on the parts of the ceiling 5 above the windshield 17 so as to extend in the lateral direction along the upper edge of the windshield 17. The longitudinal light emitting devices 327 may include roof lighting devices 333 (see FIG. 12) that extend in the fore and aft direction along the lateral edges of the ceiling 5 defining the upper edges of the cabin 3. At this time, the front light emitting devices 203 and the roof light emitting devices 204 may also function as a lighting for illuminating the cabin 3. In addition, the longitudinal light emitting devices 327 may include trim lower edge light emitting device 335 (see FIG. 20) located at the lower edges of the door trims 15 and 16. They may also function as courtesy lamps to illuminate the feet when an occupant boards or unboards the vehicle.

In the sixth to the eighth embodiments of the present invention, the floor light emitting device 341 was also provided on the front side of the front seat 305 serving as the assistant's seat, but the present invention is not limited by these embodiments, and the floor light emitting devices 341 may also be provided only in the parts of the floor located between the front seats 305 and the rear seats 306. Also, the floor light emitting devices 341 may be provided on the front side of all of the front seats 305. In the eighth embodiment, the floor light emitting device 341 may be provided in front of the front seat 305 serving as the driver's seat, and the control unit 324 may control the moving speed of the light emitting regions of the floor light emitting device 341 to be greater than that of the longitudinal light emitting devices 327 located on either side the rear seats 306 when the fore and aft acceleration is greater than the auxiliary longitudinal threshold.

In the foregoing sixth embodiment, it was configured such that the control unit 324 causes the light emitting regions of the lateral light emitting devices 326 including the seat back light emitting devices 331 to blink or emit light from left to right when a leftward acceleration is detected by the acceleration sensor 321A and right to left when a rightward acceleration is detected by the acceleration sensor 321A. However, the mode of blinking and the order of lighting the lateral light emitting devices 326 are not limited by this example, and may take other forms as long as the occupant is enabled to recognize at least one of the direction of the acceleration and the direction of the inertial force.

More specifically, the control unit 324 may control the light emitting regions 331A of the seat back light emitting devices 331 and/or the light emitting regions 332A of the dashboard light emitting device 332 so as to blink (or light) from right to left when a leftward acceleration is detected by the acceleration sensor 321A (for example, when the vehicle 2 is turning left), and so as to blink (or light) from left to right when a rightward acceleration is detected by the acceleration sensor 321A (for example, when the vehicle 2 is turning right). As a result, the occupant is enabled to recognize the direction of the acceleration from the change in the illuminated regions of at least one of the seat back light emitting devices 331 and the dashboard light emitting device 332, and prepare for the inertial force due to the acceleration in advance so that motion sickness can be prevented.

Similarly, in the seventh embodiment, the control unit 324 controlled the lateral light emitting devices 326 so that the illuminated regions move from left to right when the leftward turn of the vehicle 2 is predicted from the route acquired by the navigation device 352, and the illuminated regions move from right to left when the rightward turn of the vehicle 2 is predicted from the route acquired by the navigation device 352. However, the moving direction of the illuminated regions is not limited by this example. More specifically, the control unit 324 may control the lateral light emitting devices 326 so that the illuminated regions move from right to left when the leftward turn of the vehicle 2 is predicted from the route acquired by the navigation device 352, and the illuminated regions move from left to right when the rightward turn of the vehicle 2 is predicted from the route acquired by the navigation device 352.

Further, in the above embodiment, the control unit 324 causes the light emitting regions of the longitudinal light emitting devices 327 to blink or emit light from front to back when the acceleration sensor 321A detects a forward acceleration, and causes the light emitting regions of the longitudinal light emitting devices 327 to blink or emit light from back to front when the acceleration sensor 321A detects a rearward acceleration. However, the order in which the light emitting regions of the longitudinal light emitting devices 327 to blink or emit light may be freely selected as long as the occupant is enabled to recognize at least one of the direction of acceleration and the direction of inertial force.

Specifically, the control unit 324 may control at least one of the light emitting regions 341A of the floor light emitting devices 341, the light emitting regions 342A of the door light emitting devices 342, and the light emitting regions 343A of the pillar light emitting devices 343 so as to blink or emit light from back to front when a forward acceleration is detected by the acceleration sensor 321A, and to blink or emit light from front to back when a rearward acceleration is detected by the acceleration sensor 321A. As a result, the occupant can recognize the direction of the acceleration from the change in the illuminated regions of the longitudinal light emitting devices 327, and can prepare for the inertial force due to the acceleration in advance. Therefore, motion sickness can be prevented.

Ninth Embodiment

Figure 23:
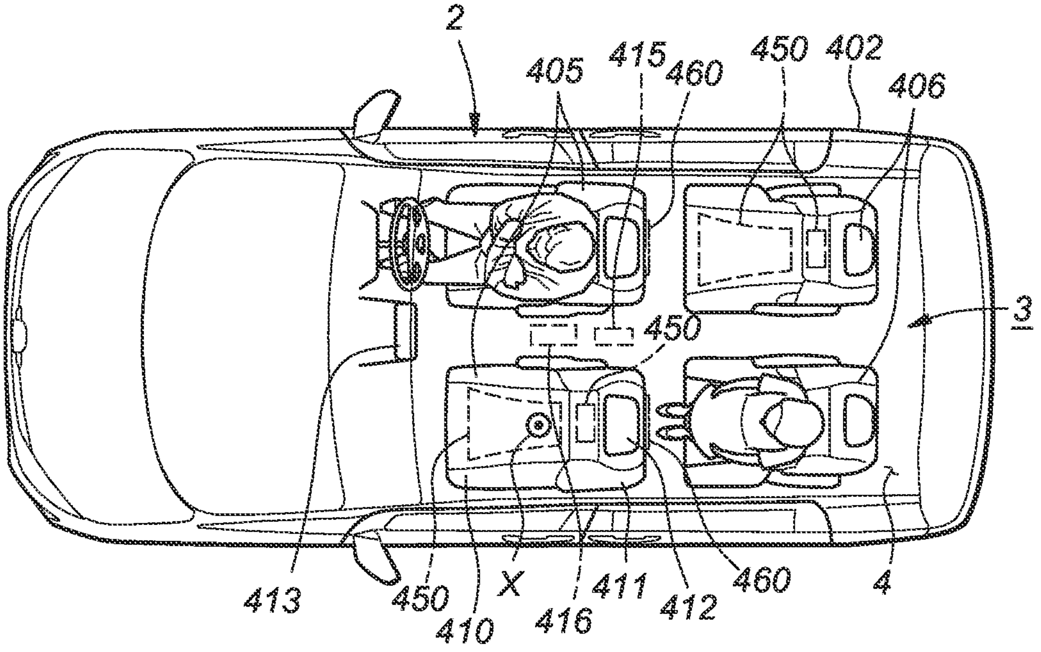
FIG. 23 is a diagram showing a cabin of a vehicle equipped with a motion sickness preventing system according to a ninth embodiment of the present invention (A) when a front seat is facing forward, and (B) when the front seat is turned around, and facing rearward.
Figure 23:
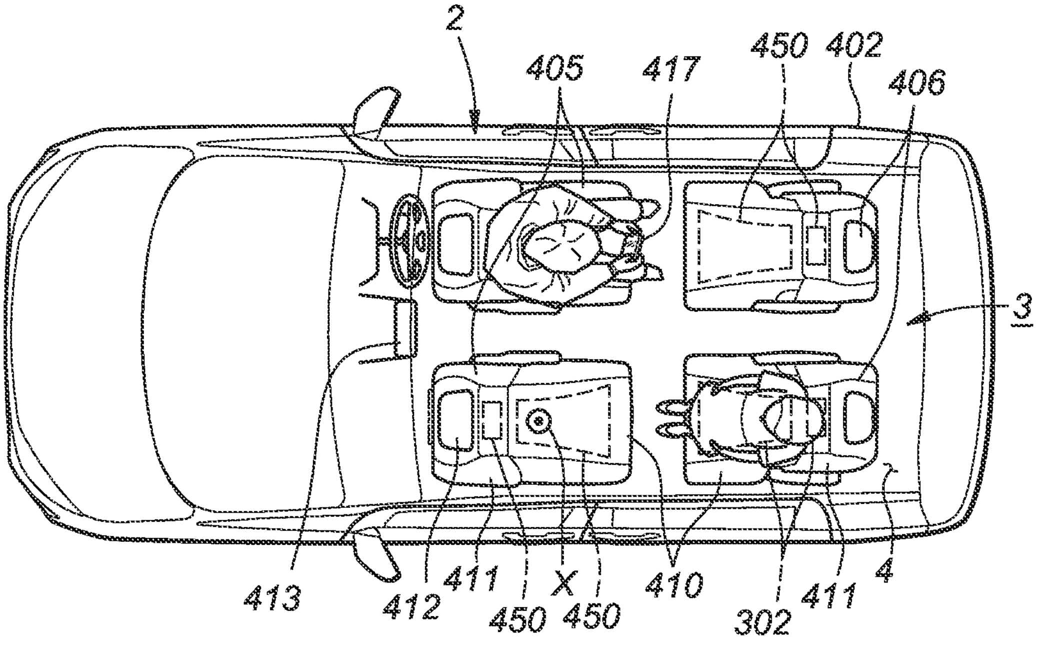

As shown in FIG. 23, a motion sickness preventing system 400 (see FIG. 24) is provided in a vehicle 2 consisting of a four-wheel automobile.

The vehicle 2 is provided with a vehicle cabin 3 which contains a pair of front seats and a pair of rear seats 406 positioned behind the front seats 405. One of the front seats 405 constitutes a driver's seat, and the other constitutes an assistant's seat.

The bottom of the cabin 3 is defined by a floor 4. The front seats 405 and the rear seat 406*s* each include a seat cushion 410 placed on the floor 4, a seat back 411 connected to a rear part of the seat cushion 410, and a headrest 412 provided in an upper part of the seat back 411.

In this embodiment, the vehicle 2 is provided with a navigation device 413 that acquires the current location of the vehicle 2, receives an input of a destination from an occupant, and sets a route from the current location to the destination.

In this embodiment, the vehicle 2 can be switched between a manual driving mode in which the driver has the operation authority and an autonomous driving mode in which the vehicle 2 has the operation authority. During the autonomous driving mode, the vehicle 2 autonomously travels along the route set by the navigation device 413. However, the vehicle 2 is not limited to one that can be switched between the manual driving mode and the autonomous driving mode.

As shown in FIGS. 23A and 23B, the front seats 405 and the rear seats 406 are each configured to be rotatable about an axis X extending vertically through the floor 4. Accordingly, for example, by rotating the front seats 405 (see FIG. 23B), the occupant can arrange the front seats 405 and the rear seats 406 so as to face each other.

Next, the motion sickness preventing system 400 will be described in the following. The motion sickness preventing system 400 is a system intended to prevent the occupants from getting motion sickness, and to reduce the severity of motion sickness even if the occupant should get motion sickness. In this disclosure, reducing the severity of motion sickness may be simply referred to as preventing motion sickness.

Figure 24:
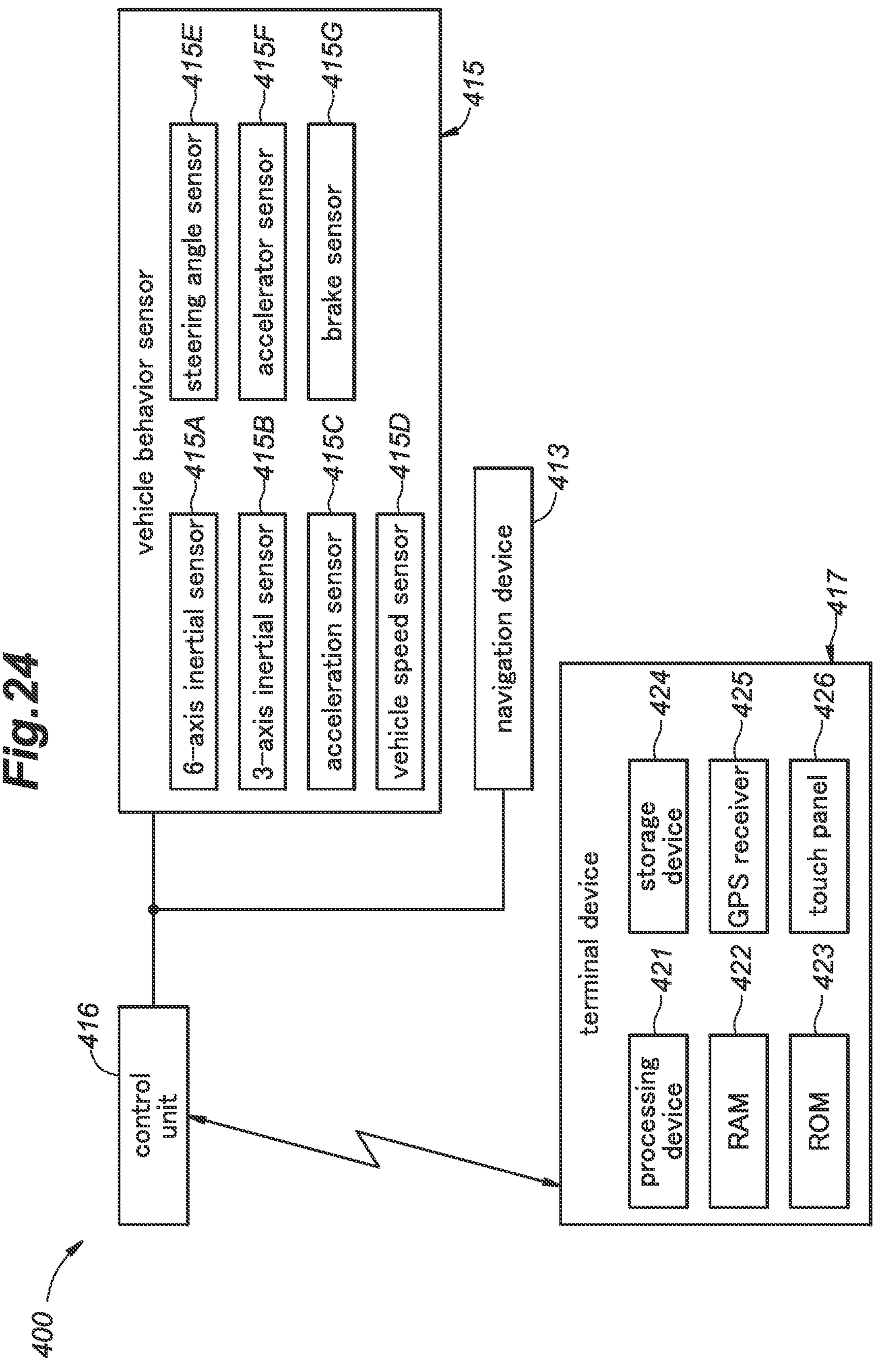
FIG. 24 is a block diagram showing the structure of the motion sickness preventing system of the ninth embodiment.

As shown in FIG. 24, the motion sickness preventing system 400 includes a vehicle behavior sensor 415 provided in the vehicle 2, a control unit 416 that acquire the output of the vehicle behavior sensor 415, and a terminal device 417 (which may be referred to as a mobile terminal device when it is portable).

The vehicle behavior sensor 415 is a device (acquisition device) that acquires behavior information regarding the behavior of the vehicle 2 on which the occupant rides. The behavior information acquired by the vehicle behavior sensor 415 includes, for example, a fore and aft acceleration, a lateral acceleration, a vertical acceleration, a roll rate, a pitch rate, a yaw rate, and a vehicle speed.

In this embodiment, the vehicle behavior sensor 415 is composed of a 6-axis inertial sensor 415A that acquires the longitudinal, lateral, and vertical accelerations and the angular velocities (roll rate, pitch rate, and yaw rate) of the vehicle 2 as behavior information. However, the vehicle behavior sensor 415 is not limited to this example, and may include, for example, a three-axis inertial sensor 415B, a single-axis or multi-axis acceleration sensor 415C, a vehicle speed sensor 415D, and the like. The vehicle behavior sensor 415 may include, for example, a steering angle sensor 415E that detects the steering angle, an accelerator sensor 415F that detects the depression of the accelerator pedal, and a brake sensor 415G that detects the depression of the brake pedal.

The control unit 416 comprises a computer with a central processing unit (CPU), RAM, ROM, and a storage device. The control unit 416 is connected to various onboard devices including the vehicle behavior sensor 415 and the navigation device 413, and controls the vehicle 2 based on the input from the vehicle behavior sensor 415, the route set by the navigation device 413, and the like, and may travel autonomously along the route set by the navigation device 413.

The control unit 416 is configured to communicate with a terminal device 417 in the vehicle cabin 3 via wireless LAN, infrared communication, Bluetooth (registered trademarking), or the like. The control unit 416 acquires the behavior information of the vehicle 2 detected by the vehicle behavior sensor 415 and transmits it to the terminal device 417 as required. In this embodiment, the control unit 416 acquires the lateral acceleration and the fore and aft acceleration of the vehicle 2 from the 6-axis inertial sensor 415A and transmits the acquired lateral acceleration and fore and aft acceleration to the terminal device 417.

The terminal device 417 may be a smartphone equipped with a central processing unit (CPU, hereinafter referred to as a processing device 421), RAM 422, ROM 423, a storage device 424, a GPS receiver 425, a touch panel 426, and the like. The touch panel 426 has a screen 427 for displaying information to the occupant, and functions as a display unit for displaying information to the occupant. The touch panel 426 also functions as an input unit that receives input from the occupant. The occupants in the cabin 3 may each hold such a terminal device 417.

Figure 25:
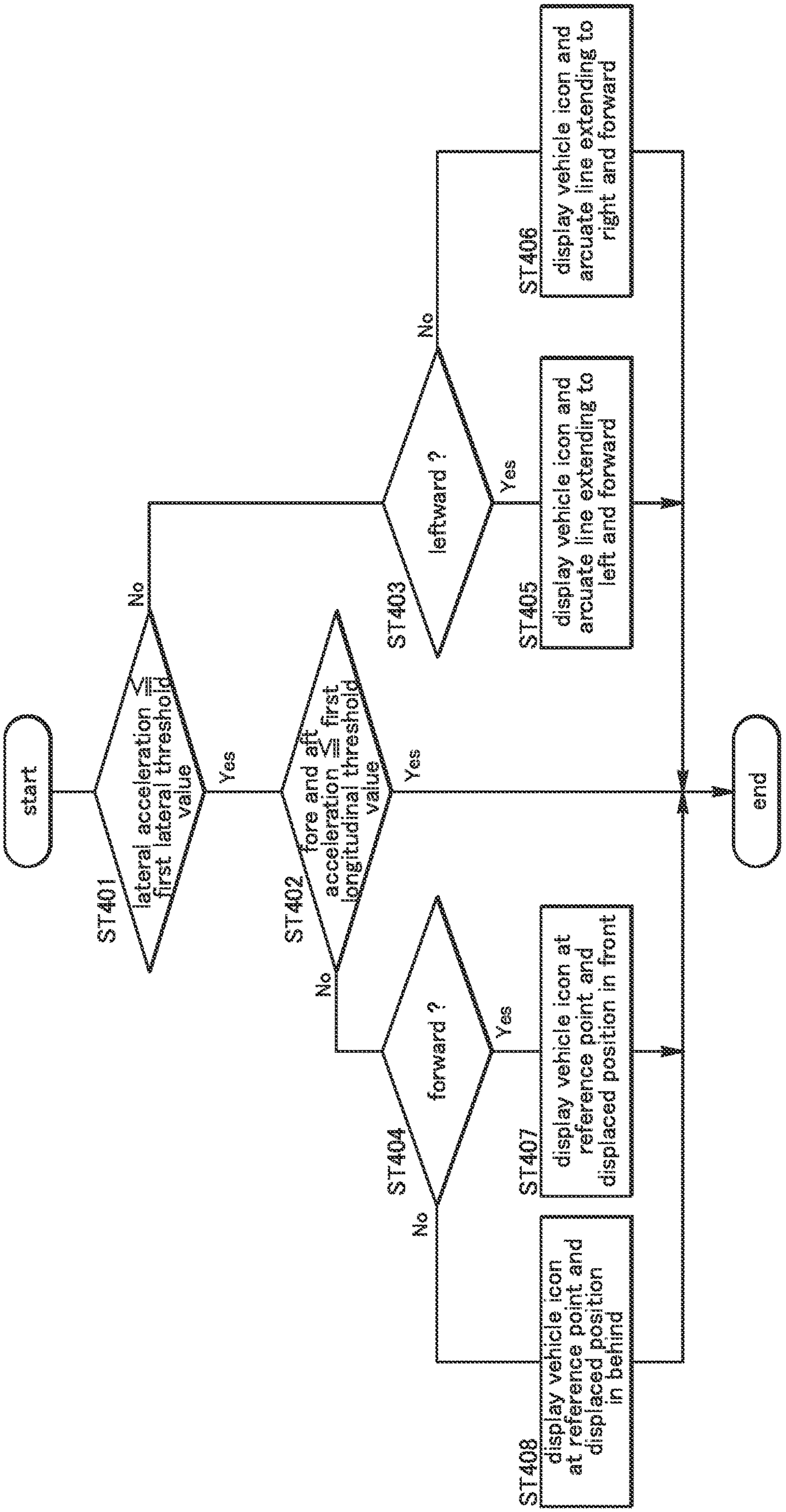
FIG. 25 is a flowchart showing a displaying process of the motion sickness preventing system of the ninth embodiment.

Based on the behavior information of the vehicle 2 transmitted from the control unit 416, the processing device 421 executes a display process for displaying information on the screen of the touch panel 426. Details of the display process will be described in the following with reference to FIG. 25 which shows a flowchart of the display process.

In the first step ST401 of the display process, the processing device 421 determines if the magnitude of the lateral acceleration acquired by the vehicle behavior sensor 415 is equal to or less than a predetermined threshold (hereinafter referred to as first lateral threshold value). When the magnitude of the lateral acceleration is equal to or less than the first lateral threshold value, the processing device 421 executes step ST402, and when the magnitude of the lateral acceleration is greater than the first lateral threshold value, the processing device 421 executes step ST403.

In step ST402, the processing device 421 determines if the magnitude of the fore and aft acceleration is equal to or less than a predetermined threshold (first longitudinal threshold value). If the magnitude of the fore and aft acceleration is equal to or less than the first longitudinal threshold value, the processing device 421 ends the display process. If the magnitude of the fore and aft acceleration is greater than the predetermined threshold value, the processing device 421 executes step ST404.

In step ST403, the processing device 421 determines if the direction of the lateral acceleration is leftward. When the direction of the lateral acceleration is leftward, the processing device 421 executes step ST405, and when it is not leftward (that is, rightward), the processing device 421 executes step ST406.

In step ST404, the processing device 421 determines if the direction of fore and aft acceleration is forward. If the fore and aft acceleration is forward, the processing device 421 executes step ST407, and otherwise (that is, if the direction of the fore and aft acceleration is backward), the processing device 421 executes step ST408.

Figure 26:
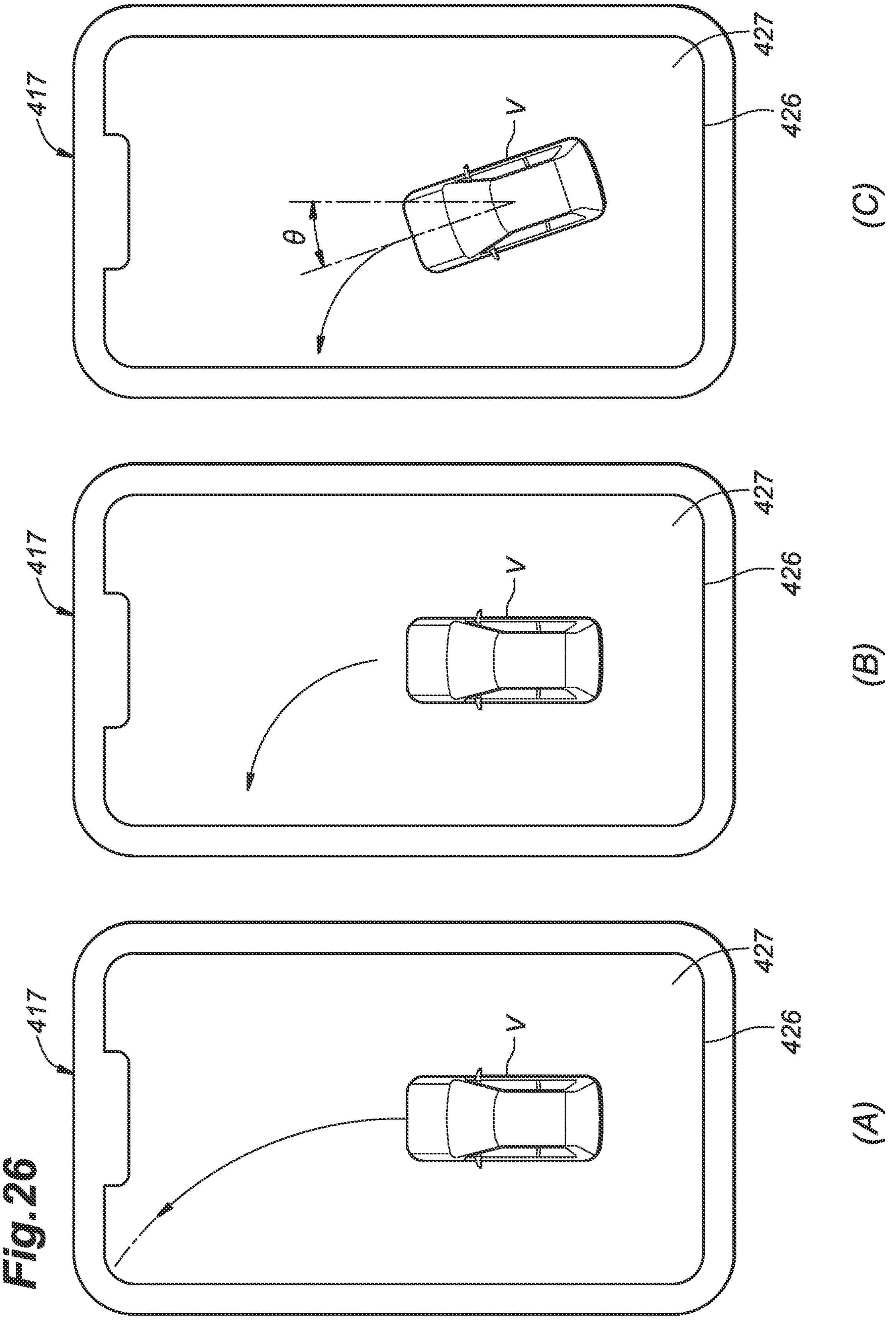
FIG. 26 is (A) a diagram showing a display screen when a vehicle behavior sensor has detected a leftward lateral acceleration greater than a first lateral acceleration threshold value but is equal to or smaller than a second lateral acceleration threshold value, (B) a diagram showing a display screen when the vehicle behavior sensor has detected a leftward lateral acceleration greater than the second lateral acceleration threshold value, and (C) a diagram showing a display screen according to a modified embodiment.

In step ST405, as shown in FIG. 26, the processing device 421 displays a vehicle icon V representing the vehicle 2 and an arcuate arrow (with an arrowhead attached to the end of an arcuate line) extending left and forward from the vehicle icon V) on the screen 427 of the touch panel 426. At this time, the processing device 421 displays the vehicle icon V at a reference position in a lower central part of the screen 427.

As shown in FIG. 26A, the arcuate line extends forward left from the vehicle icon V. The arcuate line indicates the trajectory of the vehicle icon V turning left, and the arrow of the arcuate line indicates that the vehicle icon V is about to turn left. The arcuate arrow indicates the moving direction of the vehicle icon V and corresponds to the predicted turning direction of the vehicle 2. The processing device 421 makes the radius of the arcuate line (radius of a circle of which the arcuate line is a part) smaller when the lateral acceleration is greater than a second lateral threshold value which is greater than the first lateral threshold value (see FIG. 26A) than when the lateral acceleration is equal to or smaller than the second lateral threshold (see FIG. 26B). Also, as shown in FIG. 26C, the processing device 421 may display the vehicle icon V on the screen 427 tilted to the left with respect to the vertical direction. At this time, the processing device 421 may set the tilt angle θ (see FIG. 26C) of the vehicle icon V to increase with an increase in the magnitude of the lateral acceleration (more specifically, in proportion). When the display is completed, the processing device 421 ends the display process.

In step ST406, the processing device 421 displays a vehicle icon V representing the vehicle 2 and an arcuate arrow extending forward right from the vehicle icon V on the screen 427 of the touch panel 426. In this embodiment, at this time, the processing device 421 controls the display such that the radius of curvature of the arcuate line is made smaller when the lateral acceleration is greater than the second lateral threshold (see FIG. 27A) than when the lateral acceleration is equal to or smaller than the second lateral threshold (see FIG. 27B). Also, as shown in FIG. 27C, the processing device 421 may display the vehicle icon V on the screen 427 tilted to the right with respect to the vertical direction. At this time, the processing device 421 may set the tilt angle δ (see FIG. 26C) of the vehicle icon V to increase with an increase in the magnitude of the lateral acceleration (more specifically, in proportion). When the display is completed, the processing device 421 ends the display process.

In step ST407, the processing device 421 displays the vehicle icon V which graphically symbolizes the vehicle 2 at a reference position (see the solid lines in FIGS. 28A and 28B) on the screen 427 and at a displaced position ahead of the reference position. (See broken lines in FIGS. 28A and 28B). The processing device 421 determines the distance between the reference position and the displaced position based on the magnitude of the fore and aft acceleration acquired by the vehicle behavior sensor 415 (see FIGS. 28A and 28B). More specifically, the processing device 421 increases the distance between the reference position and the displaced position as the fore and aft acceleration acquired by the vehicle behavior sensor 415 increases. As a result, when the fore and aft acceleration is large (see FIG. 28A), the two vehicle icons V are separated vertically on the screen 427 of the terminal device 417 compared to when the fore and aft acceleration is small (see FIG. 28B). In addition, the processing device 421 further displays an arrow pointing forward from the vehicle icon V at the reference position to the vehicle icon V at the displaced position on the screen 427 to indicate the direction from the reference position to the displaced position. When the display is completed, the processing device 421 ends the display process.

In step ST408, the processing device 421 displays the vehicle icon V which graphically symbolizes the vehicle 2 at the reference position on the screen 427 and at a displaced position behind the vehicle icon V at the reference position (see FIG. 28C). The processing device 421 determines the distance between the reference position and the displaced position based on the magnitude of the fore and aft acceleration acquired by the vehicle behavior sensor 415. More specifically, the processing device 421 sets a larger distance between the reference position and the displaced position as the fore and aft acceleration acquired by the vehicle behavior sensor 415 increases. As a result, when the fore and aft acceleration is large, the two vehicle icons V are displayed vertically apart from each other on the screen 427 of the terminal device 417 compared to when the fore and aft acceleration is small. In addition, the processing device 421 further displays on the screen 427 an arrow pointing backward from the vehicle icon V at the reference position to the vehicle icon V at the displaced position, indicating that the vehicle icon V is moving from the reference position to the displaced position. When the display is completed, the processing device 421 ends the display process.

Next, the effect of the motion sickness preventing system 400 configured in this way will be discussed in the following. In motion sickness preventing system 400, when an acceleration equal to or greater than the first lateral threshold is applied to the vehicle 2 in the lateral direction (No in ST401), or when an acceleration equal to or greater than the first longitudinal threshold is applied in the longitudinal direction (No in ST402), the terminal device 417 displays the behavior of the vehicle 2.

More specifically, when the vehicle 2 turns to the left and the vehicle behavior sensor 415 detects a leftward acceleration greater than the first lateral threshold value, the screen 427 of the terminal device 417 displays a vehicle icon V and an arcuate arrow extending forward left from the vehicle icon V as shown in FIGS. 26A and 26B. When the vehicle 2 turns to the right and the vehicle behavior sensor 415 detects an acceleration in the right direction greater than the first lateral threshold value, the screen 427 of the terminal device 417 displays a vehicle icon V and an arcuate arrow extending forward right from the vehicle icon V as shown in FIGS. 27A and 27B Further, when the vehicle 2 accelerates forward and the vehicle behavior sensor 415 detects a forward acceleration greater than the first longitudinal threshold value, the screen 427 of the terminal device 417 displays the vehicle icon V at the reference position and the displaced position, and an arrow to signify a movement from the reference position to the displaced position as shown in FIGS. 28A, 28B and 28C.

In this manner, the terminal device 417 displays the arrow directed in the fore and aft direction or the arcuate arrow on the screen 427 to indicate the moving direction of the vehicle icon V based on the behavior information acquired by the vehicle behavior sensor 415. As a result, the occupant operating the terminal device 417 can easily visually understand the behavior of the vehicle 2. Therefore, the occupant can understand that the inertial force is about to be applied and which direction the inertial force will be directed, and can prepare for the inertial force in advance. This is effective in preventing the occupant from getting motion sickness, thereby preventing motion sickness.

In particular, when the vehicle 2 is autonomously driven, the direction and arrangement of the seats 405 and 406 in the cabin 3 can be freely arranged. Therefore, as can be seen from FIGS. 23A and 23B, the orientation of the occupant can be changed by the arrangement of the seats 405,406. In such a case, if only an arrow indicating the turning direction of the vehicle 2 is displayed on the screen 427 of the terminal device 417, the occupant may misunderstand the direction of the own movement, and incorrectly estimate the direction of the inertial force that is about to be applied.

Figure 27:
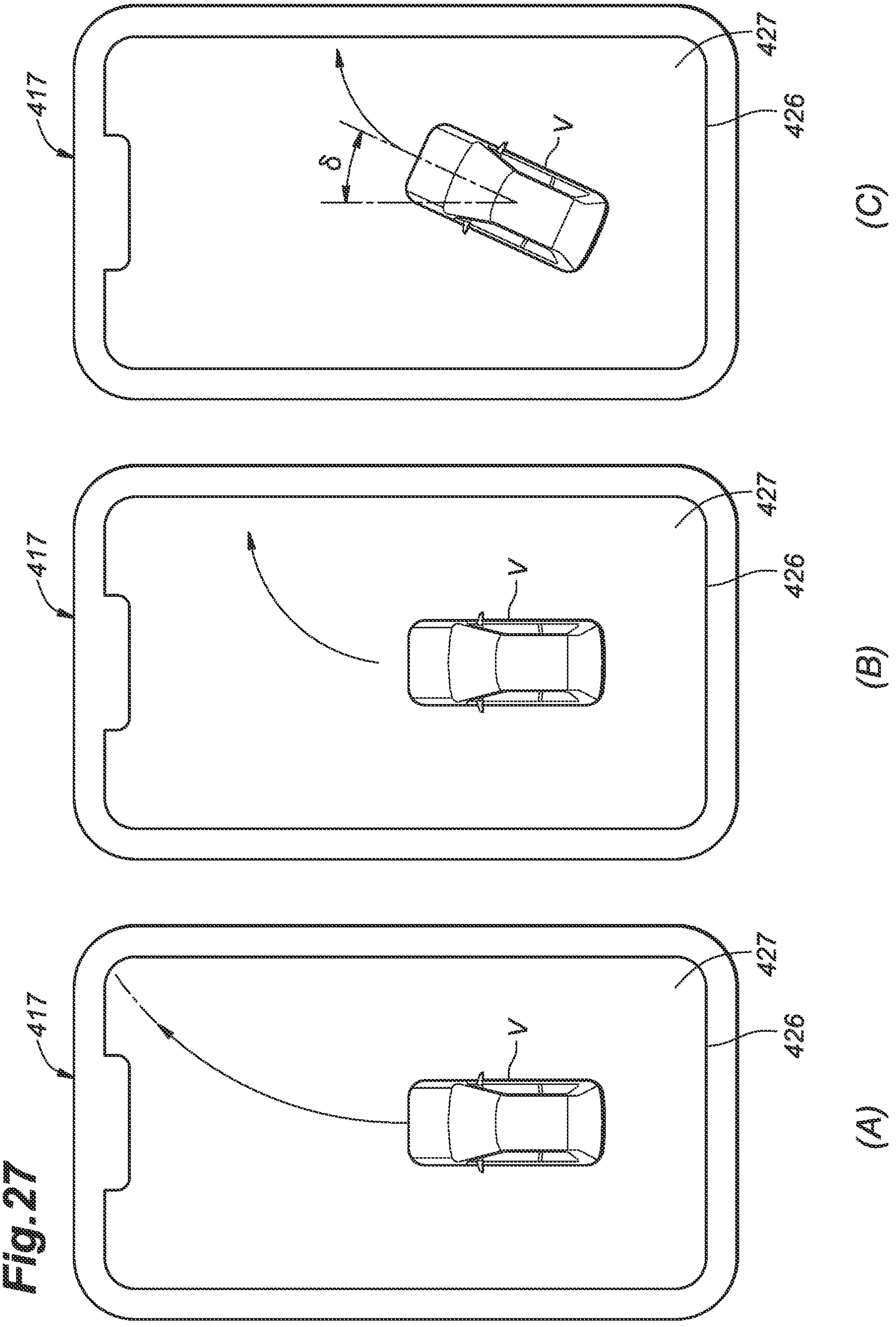
FIG. 27 is (A) a diagram showing a display screen when a vehicle behavior sensor has detected a rightward lateral acceleration greater than the first lateral acceleration threshold value but is equal to or smaller than the second lateral acceleration threshold value, (B) a diagram showing a display screen when the vehicle behavior sensor has detected a rightward lateral acceleration greater than the second lateral acceleration threshold value, and (C) a diagram showing a display screen according to a modified embodiment.

As shown in FIGS. 26 and 27, a vehicle icon V and an arrow indicating the turning direction of the vehicle icon V are displayed on the screen 427 of the terminal device 417. Accordingly, the occupant can easily recognize that the direction indicated by the arrow indicates the turning direction of the vehicle 2 regardless of the seating position or posture. Therefore, the occupant can more accurately estimate the direction of the inertial force applied to his or her body, thereby preventing motion sickness.

Figure 28:
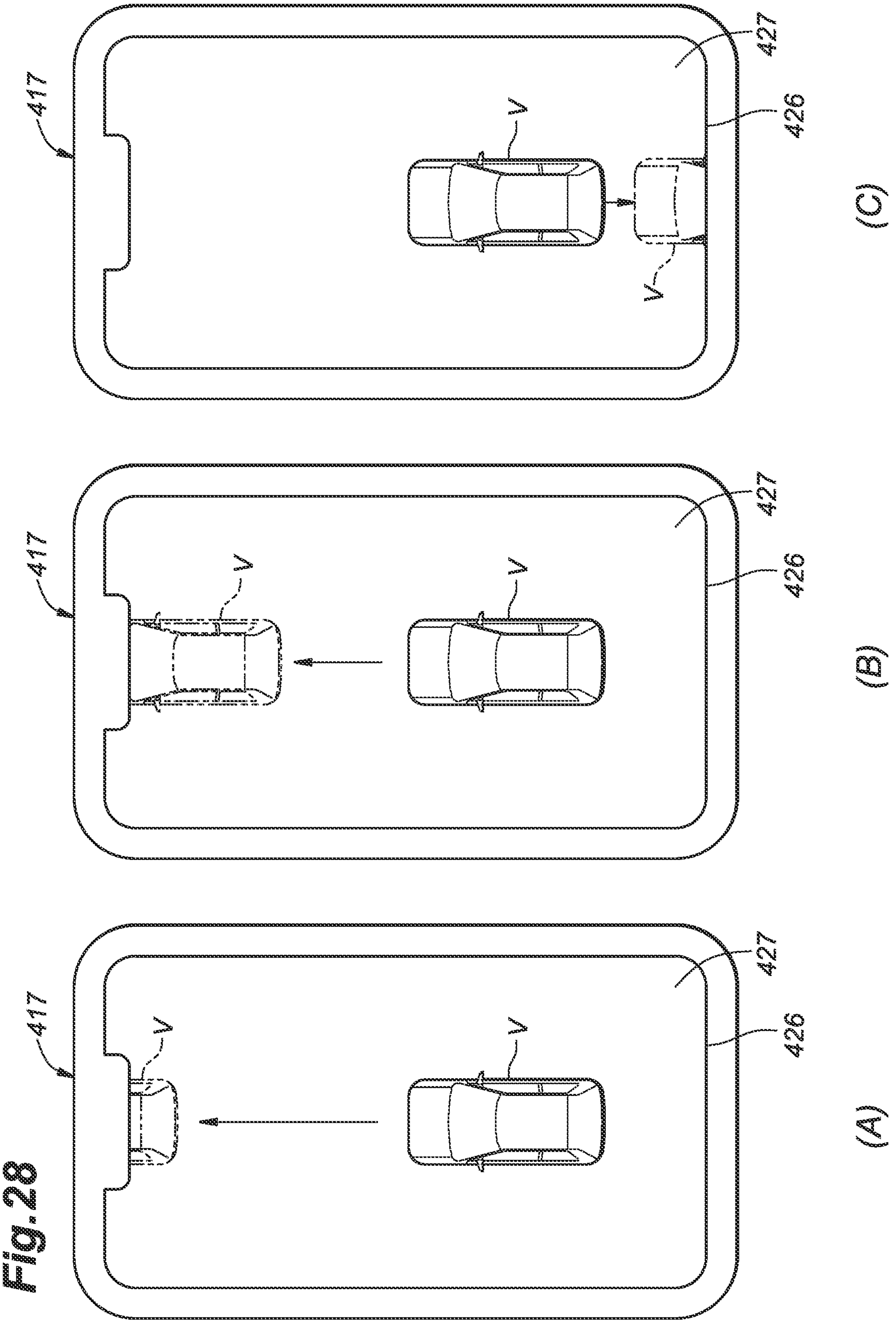
FIG. 28 is a view of a display screen (A) when a forward fore and aft acceleration is detected by a vehicle behavior sensor, (B) when a smaller fore and aft acceleration than that of (A) is detected by the vehicle behavior sensor, and (C) when a rearward fore and aft acceleration is detected by the vehicle behavior sensor.

Furthermore, as shown in FIG. 28, when the vehicle 2 accelerates forward with an acceleration greater than the first longitudinal threshold value, the vehicle icon V is displayed on the screen 427 at the reference position and the displaced position. As the magnitude of the acceleration increases, the processing device 421 increases the distance between the reference position and the displaced position. Therefore, the occupant can recognize the magnitude of the acceleration from the distance between the two vehicle icons V. This allows the occupant to estimate the magnitude of the inertial force about to be applied, and prepare for the inertial force in advance.

When the vehicle 2 turns in either direction, and the lateral acceleration is greater than the second lateral threshold value, the processing device 421 causes the radius of the displayed arcuate arrow superimposed on the vehicle 2 to be larger when the lateral acceleration is greater than the second lateral threshold value than when the lateral acceleration is greater than the first threshold value and equal to or smaller than the second lateral threshold value. Therefore, the occupant can easily recognize the magnitude of the lateral acceleration applied to the vehicle 2 from the shape of the arcuate arrow. The occupant is thus enabled to estimate the magnitude of the inertial force applied to his or her body, and prepare for the inertial force in advance.

Tenth Embodiment

Figure 29:
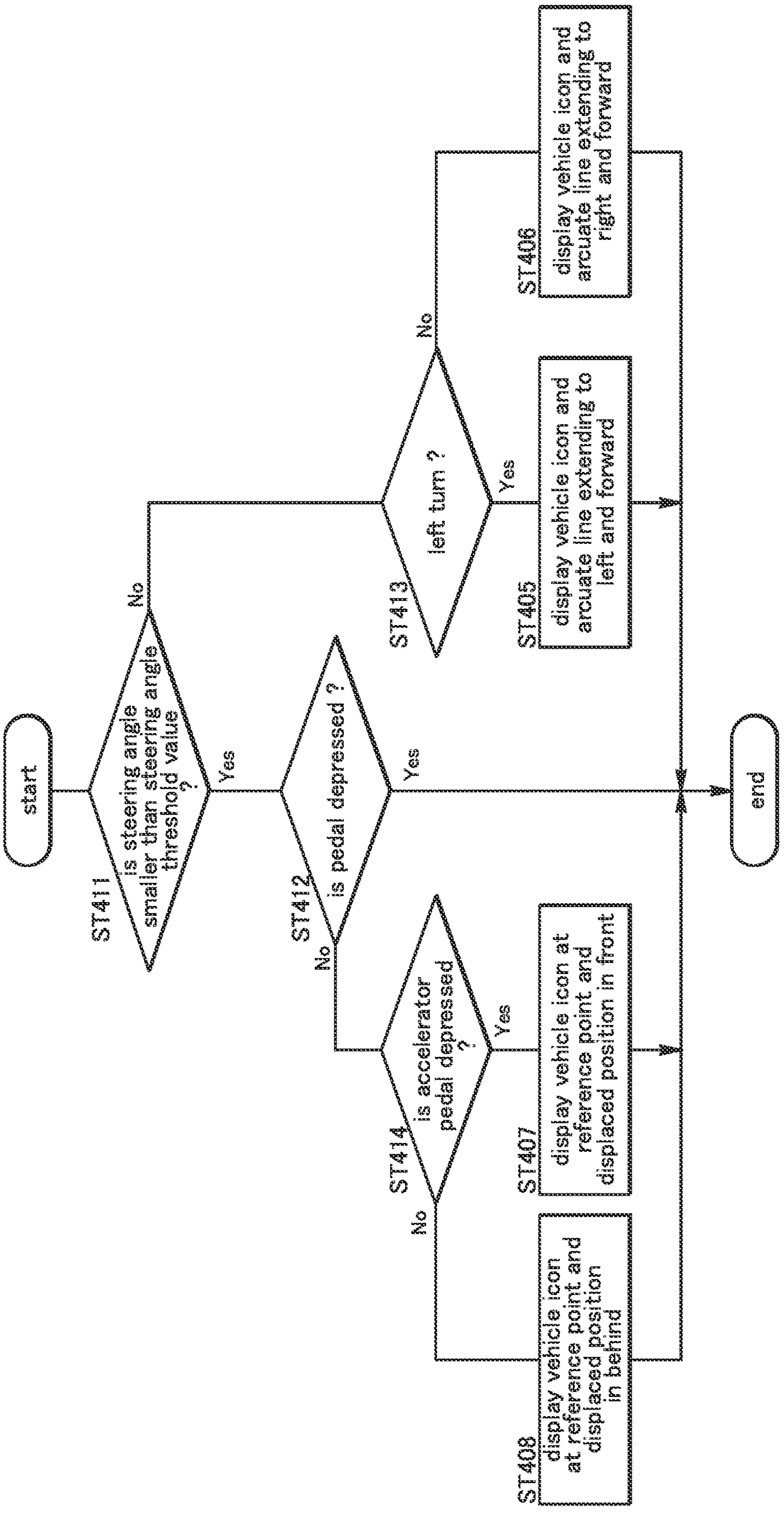
FIG. 29 is a flowchart of a display process in a motion sickness preventing system according to a tenth embodiment of the present invention.

A motion sickness preventing system 400 according to a tenth embodiment of the present invention differs from that of the ninth embodiment in that the control unit 416 transmits the steering angle acquired by the steering angle sensor 415E, the depression of the accelerator pedal acquired by the accelerator sensor 415F, and the depression of the brake pedal acquired by the brake sensor 415G to the terminal device 417. Furthermore, as shown in FIG. 29, another different point is that the processing device 421 executes ST411 to ST414 instead of steps ST401 to ST404 of the display process. This embodiment is otherwise similar to the ninth embodiment, and other configurations are omitted from the following disclosure.

In step ST411, the processing device 421 determines if the magnitude of the steering angle acquired by the steering angle sensor 415E is equal to or greater than a predetermined threshold value (hereinafter referred to as steering angle threshold value). The processing device 421 executes step ST412 when the magnitude of the steering angle is less than the steering angle threshold value, and executes step ST413 when the magnitude of the steering angle is equal to or greater than the steering angle threshold.

The processing device 421 determines in step ST412 if the accelerator pedal or the brake pedal is depressed. More specifically, the processing device 421 determines that the accelerator pedal or the brake pedal is depressed when either the depression of the accelerator pedal or the depression of the brake pedal is equal to or greater than a predetermined threshold value. The processing device 421 executes step ST414 if the accelerator pedal or the brake pedal is depressed, and ends the display process if the accelerator pedal or the brake pedal is not depressed.

In step ST413, the processing device 421 determines if the vehicle 2 is turning left based on the steering angle acquired by the steering angle sensor 415E, and executes step ST405 when the vehicle is turning left and executes step ST406 when the vehicle is not turning left (or turning right).

In step ST414, the processing device 421 determines if the accelerator pedal is depressed. More specifically, in step ST414, the processing device 421 determines that the accelerator pedal has been depressed when the depression of the accelerator pedal is equal to or greater than a predetermined threshold value. When the processing device 421 has determined that the accelerator pedal is depressed, step ST407 is executed, and when it has determined that the accelerator pedal is not depressed (that is, when the brake pedal is depressed), step ST408 is executed.

Figure 30:
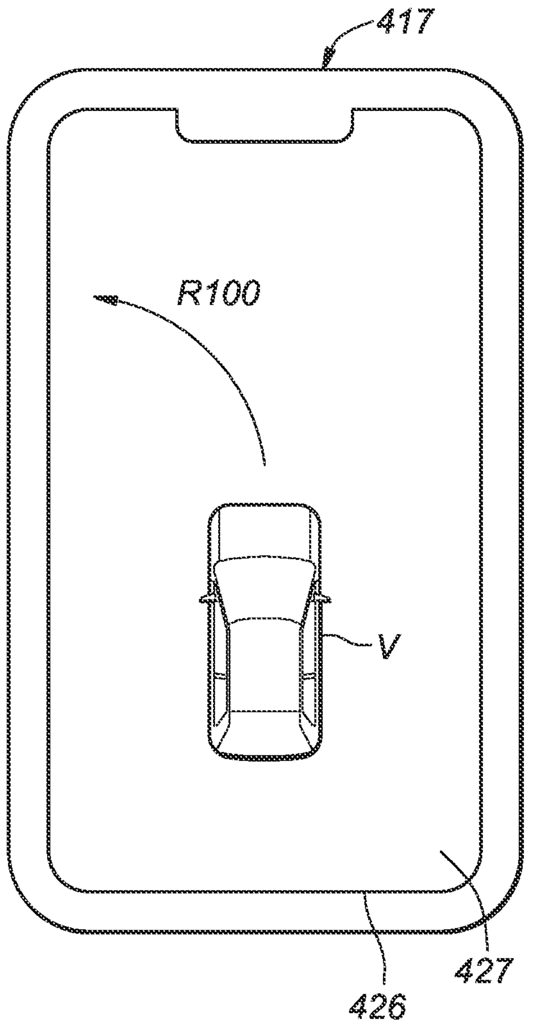
FIG. 30 is a diagram showing a display screen on a terminal device when a leftward steering action is taken, and the steering angle is equal to or greater than a steering angle threshold value.

In steps ST405 and ST406, the processing device 421 acquires the turning radius based on the steering angle acquired by the steering angle sensor 415E. The storage device 424 stores a table indicating the relationship between the steering angle and the turning radius, and the processing device 421 acquires the turning radius from the acquired steering angle by using the table. Thereafter, as shown in FIG. 30, the processing device 421 draws an arcuate arrow according to the obtained turning radius, and simultaneously displays the turning radius (for example, "R300" by characters) and the arcuate arrow.

Next, the mode of operation and effects of the motion sickness preventing system 400 configured in this manner will be described in the following. For example, when the steering angle becomes equal to or greater than the steering angle threshold value owing to the leftward steering by the driver (Yes in ST411, Yes in ST413), a vehicle icon V is displayed on the screen 427 of the touch panel 426 as shown in FIG. 8. Then, an arcuate arrow extending forward left from the vehicle icon V is displayed. When the steering angle becomes equal to or greater than the steering angle threshold value owing to the driver steering to the right (Yes in ST411, No in ST413), the screen 427 of the touch panel 426 displays the vehicle icon V and an arcuate arrow extending rightward from the vehicle icon V. This allows the occupant to easily recognize the turning direction of the vehicle 2, as in the first embodiment. Therefore, the occupant can estimate the direction of the inertial force, thereby preventing motion sickness.

In the tenth embodiment, when the accelerator pedal is depressed (Yes in ST12, Yes in ST14) without lateral steering, an arrow pointing forward is displayed and when the brake pedal is depressed (Yes in ST12, No in ST14), an arrow pointing backward is displayed. This allows the occupant to estimate the direction of the inertial force, thereby preventing motion sickness.

Eleventh Embodiment

In the motion sickness preventing system 400 according to an eleventh embodiment of the present invention, the navigation device 413 outputs a route to the terminal device 417 and the display process executed by the processing device 421 of the terminal device 417 is somewhat different from the first embodiment. However, this embodiment is otherwise similar to the ninth embodiment so that the other structures thereof are omitted from the following disclosure.

Figure 31:
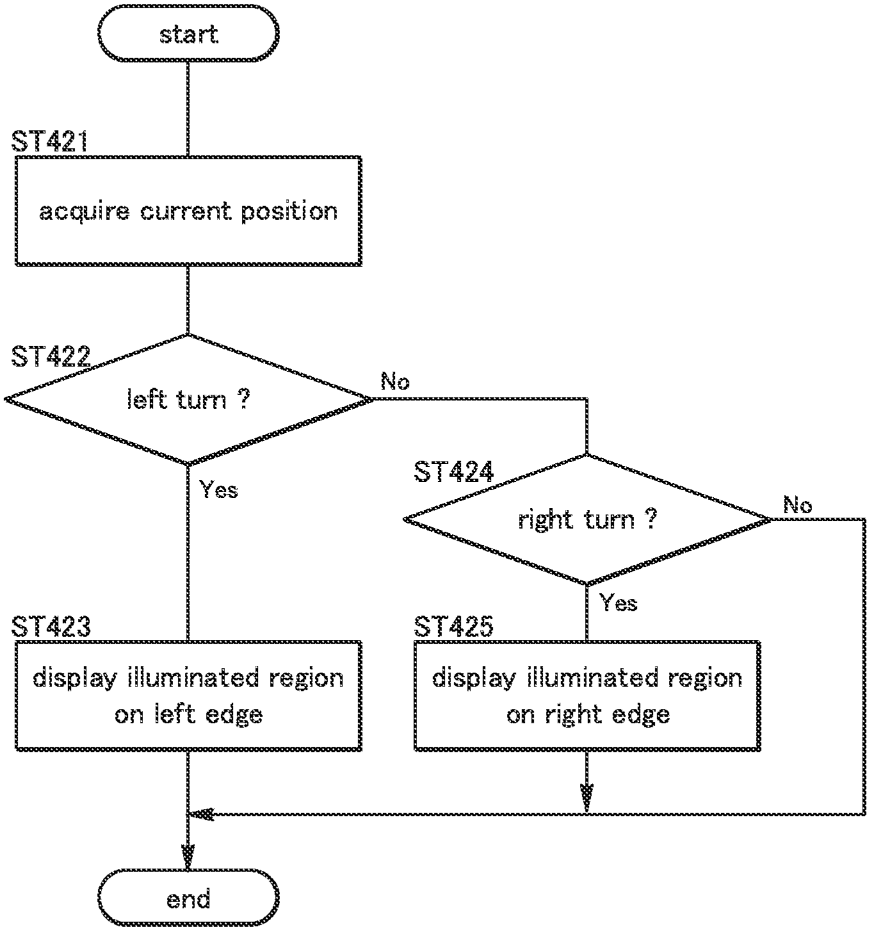
FIG. 31 is a flowchart of a display process in a motion sickness preventing system according to an eleventh embodiment of the present invention.
Figure 32:
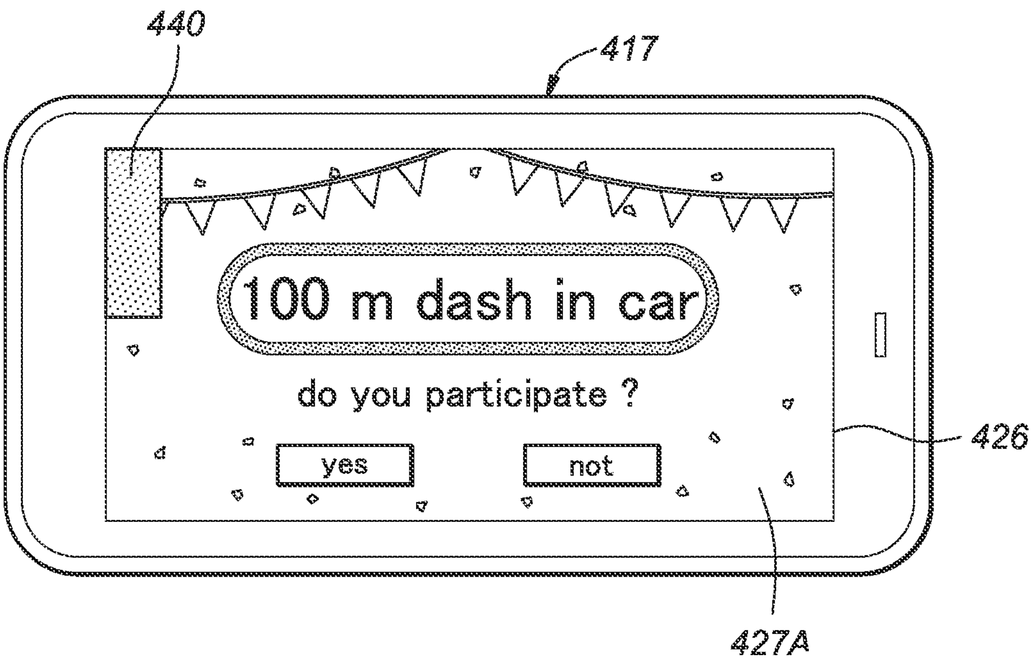
FIG. 32 is a view showing a display screen on a terminal display (A) during a leftward turn and (B) during a rightward turn.
Figure 32:
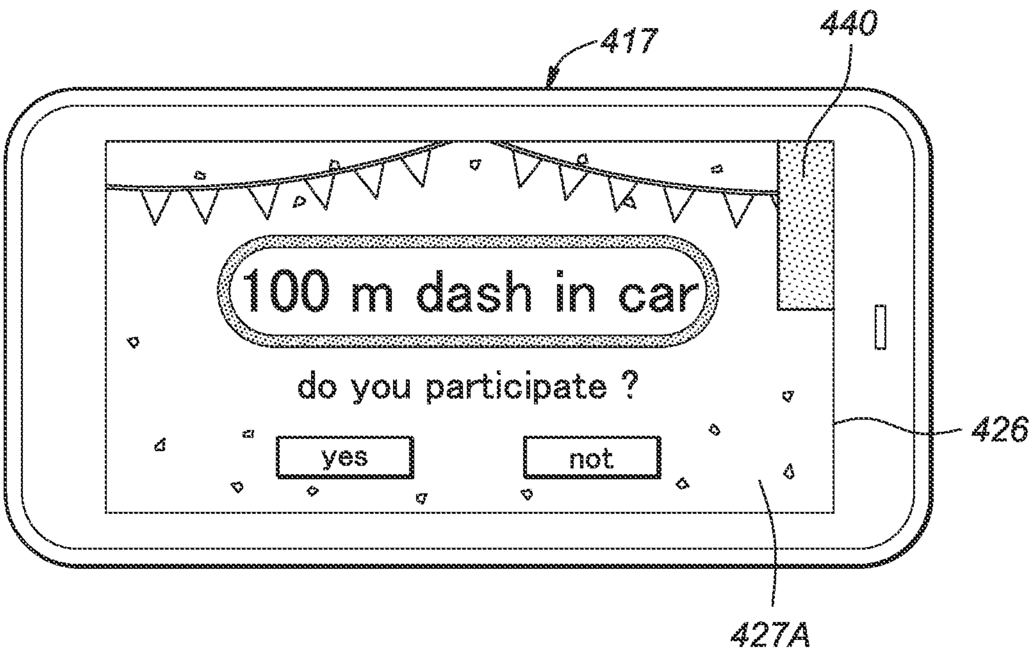

In the eleventh embodiment, the processing device 421 executes a display process while the occupant running an application to enjoy a game. The screen 427 of the touch panel 426 displayed when the application is being executed will be referred to as an application execution screen 427A (see FIG. 32), and the display process executed by the processing device 421 will be described in the following with reference to FIG. 31.

The processing device 421 acquires the current location of the vehicle 2 based on the GPS signals received by the GPS receiver 425 in the first step ST421 of the display process. When acquisition of the current location is completed, the processing device 421 executes step ST422.

In step ST422, the processing device 421 determines if the vehicle 2 is going to turn left after a predetermined time based on the current location acquired in step ST421 and the route set by the navigation device 413. More specifically, the processing device 421 determines that the vehicle 2 is scheduled to turn left when it is detected that the part of the route immediately ahead of the current location of the vehicle 2 (for example, the part of the route a predetermined distance ahead of the vehicle) includes a curved road bending to the left, or a left turn at an intersection. The predetermined distance in this case may be selected such that this distance range does not include both a left turn curve and a right turn curve at the same time, and is sufficiently short not to include two intersections. When the processing device 421 determines that the vehicle is going to turn left, step ST423 is executed. Otherwise, step ST424 is executed.

In step ST423, the processing device 421 displays an illuminated area 440 overlaid on the upper left edge of the application execution screen 427A, as shown in FIG. 32A. The illuminated area 440 may be in any form that can be recognized by the occupant concentrating on the game, and may be defined as, for example, a rectangular area painted white. When the display is completed, the processing device 421 ends the display process.

In step ST424, the processing device 421 estimates the turning direction of the vehicle 2 based on the own position acquired in step ST421 and the route set by the navigation device 413, and determines if the vehicle 2 is going to turn right. More specifically, the processing device 421 determines that the vehicle 2 is going to turn right when the part of the route immediately ahead of the current position of the vehicle 2 includes a curve bent to right, or a right turn at an intersection. Upon determining that the vehicle is going to turn right, the processing device 421 executes step ST425. Otherwise, the display process is terminated. In step ST425, the processing device 421 displays the illuminated area 440 overlaid on the upper right edge of the application execution screen 427A of the touch panel 426, as shown in FIG. 32B. When the display is completed, the processing device 421 ends the display process.

Next, the effect of the motion sickness preventing system 400 configured in this way will be discussed in the following. When the vehicle 2 is predicted to turn left based on the route set by the navigation device 413, the illuminated area 440 is displayed at the upper left edge of the application execution screen 427A (FIG. 10A). On the other hand, when the vehicle is predicted to turn right, the illuminated area 440 is displayed at the upper right edge of the application execution screen 427A (see FIG. 10B).

In this manner, the illuminated area 440 is superimposed on the application execution screen 427A. At this time, the illuminated area 440 is displayed at the edge of the application execution screen 427A in the turning direction of the vehicle 2 (that is, the left edge when turning left and the right edge when turning right). As a result, the occupant can acquire the turning direction of the vehicle 2, so that the occupant can predict the direction of the inertial force that will be applied to the occupant in advance. Therefore, the occupant can be prepared in advance for the inertial force, thereby preventing motion sickness of the occupant.

The processing device 421 can predict the turning behavior such as a left turn and a right turn of the vehicle 2 by identifying the part of the route immediately ahead of the vehicle according to the current position identified by the GPS receiver 425 and the planned route set by the navigation device 413. By thus using the navigation device 413 as an acquisition device for predicting and acquiring behavior information about the behavior of the vehicle 2, the turning behavior of the vehicle 2 can be easily acquired in advance and the occupant can be informed of the behavior of the vehicle 2 so that the turning direction can be notified to the occupant in advance.

Twelfth Embodiment

The motion sickness preventing system 400 according to a twelfth embodiment of the present invention differs from that of the tenth embodiment in that biosensors 450 (see FIGS. 23A and 23B) are provided in the front seats 405 and the rear seats 406 respectively, and the display process that is executed is different from that of the tenth embodiment, but is otherwise similar to that of the tenth embodiment. Therefore, other parts of the tenth embodiment are omitted from the following disclosure.

The biosensors 450 are provided on the surfaces of the seat backs 411 and the seat cushions 410 of the front seats 405 and the rear seats 406 to acquire biosignals such as heart rate data and a perspiration level of the seated occupants. In this embodiment, the biosensors 450 acquire heartbeat data. The biosensors 450 each output the acquired bioelectrical signal to the control unit 416, and the control unit 416 appropriately transmits the acquired bioelectrical signal to the terminal device 417 together with information indicating the acquired position (position in the seat) of the biosensor 450.

Figure 33:
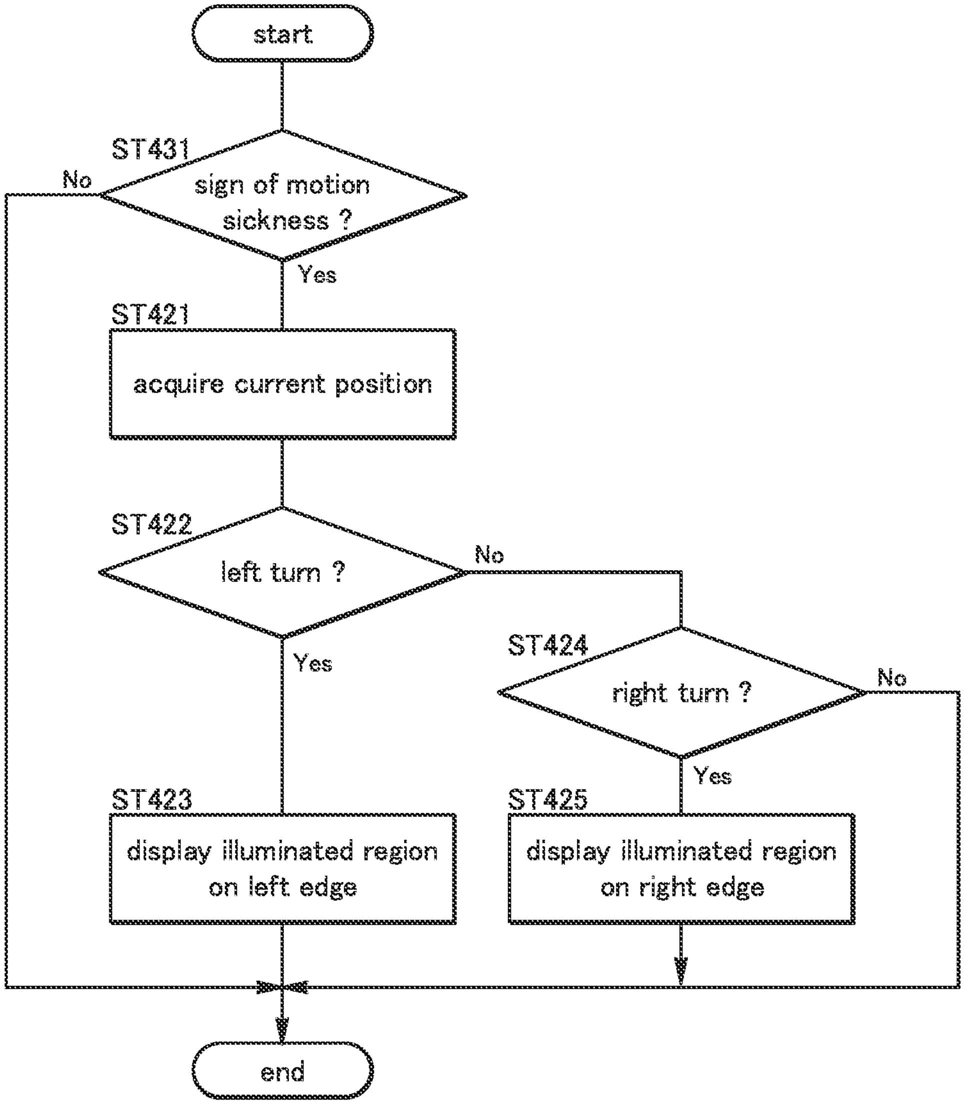
FIG. 33 is a flowchart of a display process in a motion sickness preventing system according to a twelfth embodiment of the present invention.

As shown in FIG. 33, the display process according to the twelfth embodiment differs from the display process of the tenth embodiment in that step ST431 is executed before step ST421, but is otherwise the same so that the description of steps other than step ST431 will be omitted in the following disclosure.

The processing device 421 acquires the own position in the vehicle cabin 3 by communicating with the control unit 416 within the vehicle cabin 3 in step ST431. After that, the processing devices 421 each extract the corresponding occupant's heartbeat data from the bioelectrical signal received from the control unit 416 based on the acquired own position. After that, the processing device 421 determines if there is a sign of motion sickness based on fluctuations in the heartbeat data, the power spectrum of heartbeat, and the like. In the twelfth embodiment, when an increase in high frequency components of the power spectrum of heartbeat indicative of a cardiac parasympathetic nerve activity is observed, the processing device 421 determines that there is a symptom or a sign of motion sickness. Upon determining that there is a sign of motion sickness, the processing device 421 proceeds to step ST421. Otherwise, the display process ends.

Next, the effect of the motion sickness preventing system 400 configured in this way will be discussed in the following. In step ST431, the processing device 421 determines if the occupant has a sign of motion sickness using the biosensor 450. When there is a sign, and an acceleration is applied to the left, right, or forward, an illuminated area 440 is displayed on the application execution screen 427A of the touch panel 426. On the other hand, when the occupant has no sign of motion sickness, the illuminated area 440 is not displayed on the application execution screen 427A of the terminal device 417 even if an acceleration is applied to the left, right, or forward. In other words, when the processing device 421 determines that there is no sign of motion sickness in the occupant (No in ST431), the display of a behavior of the vehicle 2 on the screen 427 is stopped. As a result, the display of the application execution screen 427A is not obstructed by the illuminated area 440, the vehicle icon V, the arcuate arrow or the like on the terminal device 417 so that the occupant can enjoy a video or a game.

The terminal device 417 is held by each occupant and is a portable smart phone in the foregoing disclosure, but the present invention is not limited to this aspect. The terminal device 417 may be, for example, a tablet terminal device 460 (see FIG. 23A) supported on the back of the seat back 411, or a non-portable terminal device 417 (which may be fixed on the seat back 411 of the front seat 405). Moreover, the terminal device 417 may be detachably held by a door trim provided on the door, or may be fixed to the door trim.

Although the vehicle 2 was a four-wheel automobile in the foregoing disclosure, the present invention is not limited to this aspect. The vehicle 2 may be a bus, truck, railcar, or the like. Also, the motion sickness preventing system 1 may be applied to any vehicle including watercraft, aircraft, and the like.

Figure 34:
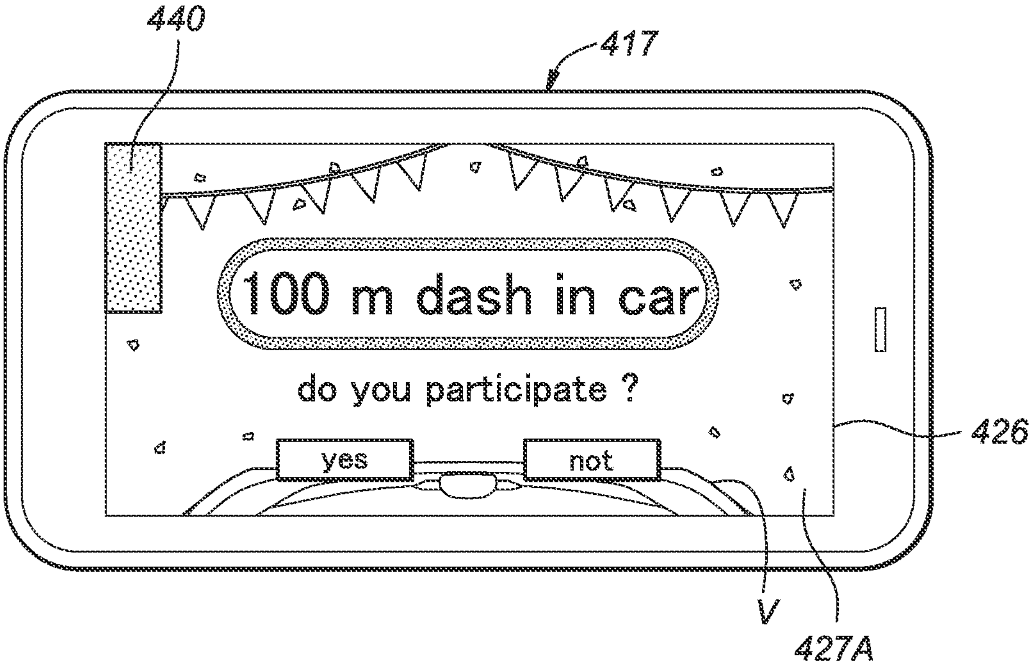
FIG. 34 is a view showing a display screen on a terminal display (A) during a leftward turn and (B) during a rightward turn in the twelfth embodiment.
Figure 34:
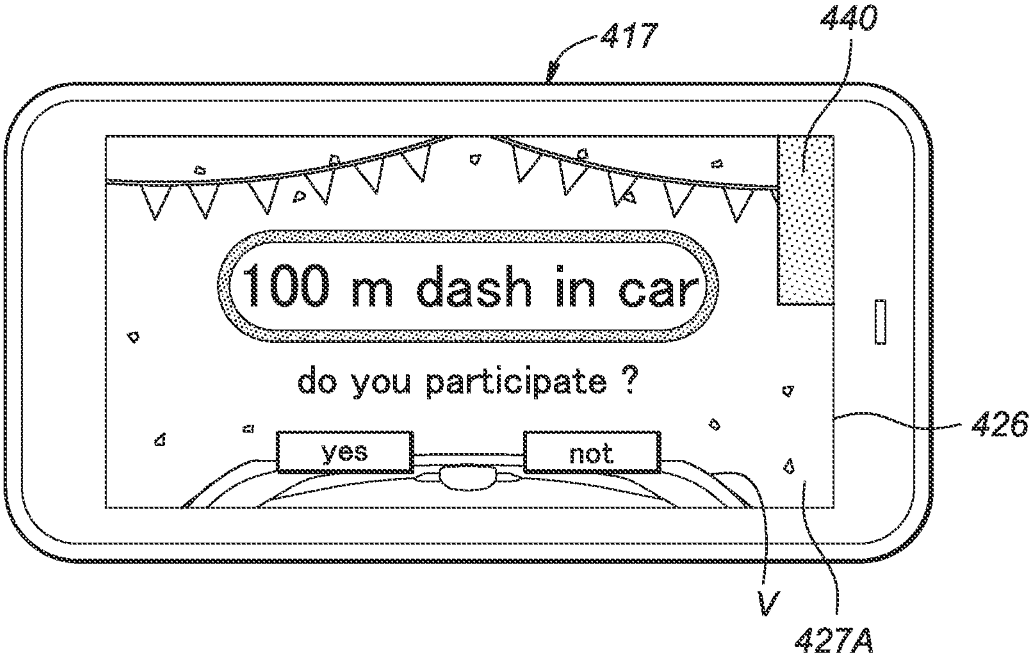

In the eleventh embodiment, the illuminated area 440 is superimposed on the application execution screen 427A, but the present invention is not limited to this aspect. For example, as shown in FIGS. 34A and 34B, the vehicle icon V may be displayed together with the illuminated area 440 on the application execution screen 427A of the terminal device 417. As a result, the occupant can recognize the direction of the inertial force with respect to the vehicle 2 regardless of the posture of the occupant.

Figure 35:
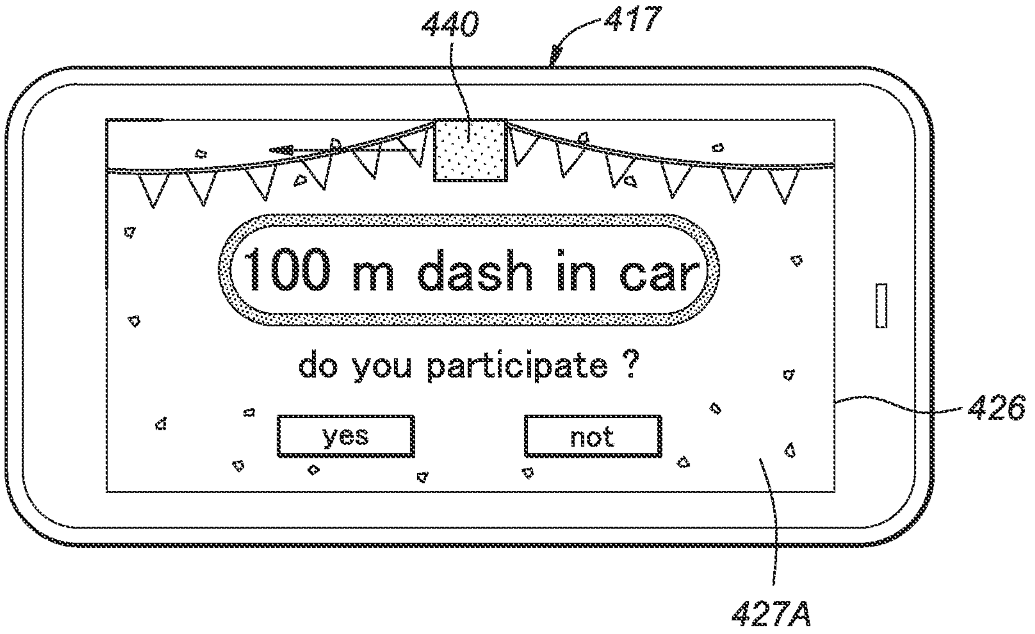
FIG. 35 shows a display screen (A) during a leftward turn in a thirteenth embodiment of the present invention, and (B) according to a modified embodiment.
Figure 35:
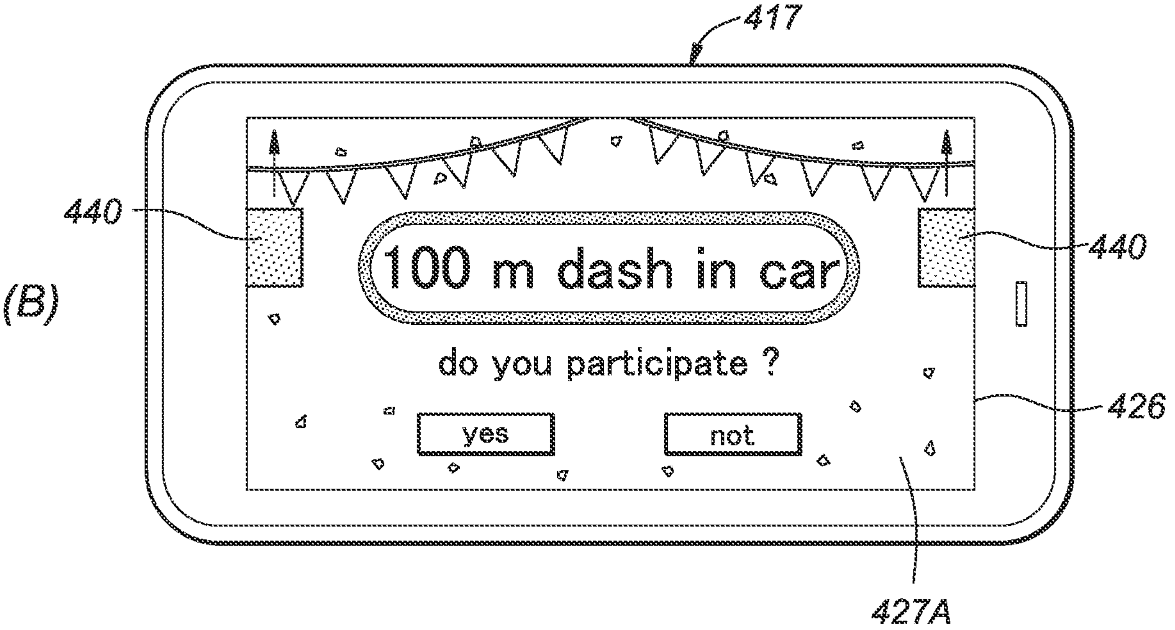

Further, in the tenth embodiment, when the application is being executed, the processing device 421 may display the illuminated area 440 superimposed on the application execution screen 427A, and move or deform the illuminated area 440 so as to match the behavior of the vehicle 2. The processing device 421 moves the illuminated area 440 in a direction that corresponds to the turning direction. More specifically, for example, when the vehicle 2 turns left, the processing device 421 moves the illuminated area 440 leftward as shown in FIG. 35A. When the vehicle 2 turns right, the illuminated area 440 moves to the right. Further, when the vehicle 2 accelerates without turning, the processing device 421 may move the illuminated area 440 forward as shown in FIG. 35B, and when the vehicle 2 decelerates without turning, the illuminated area 440 may move backward.

Figure 36:
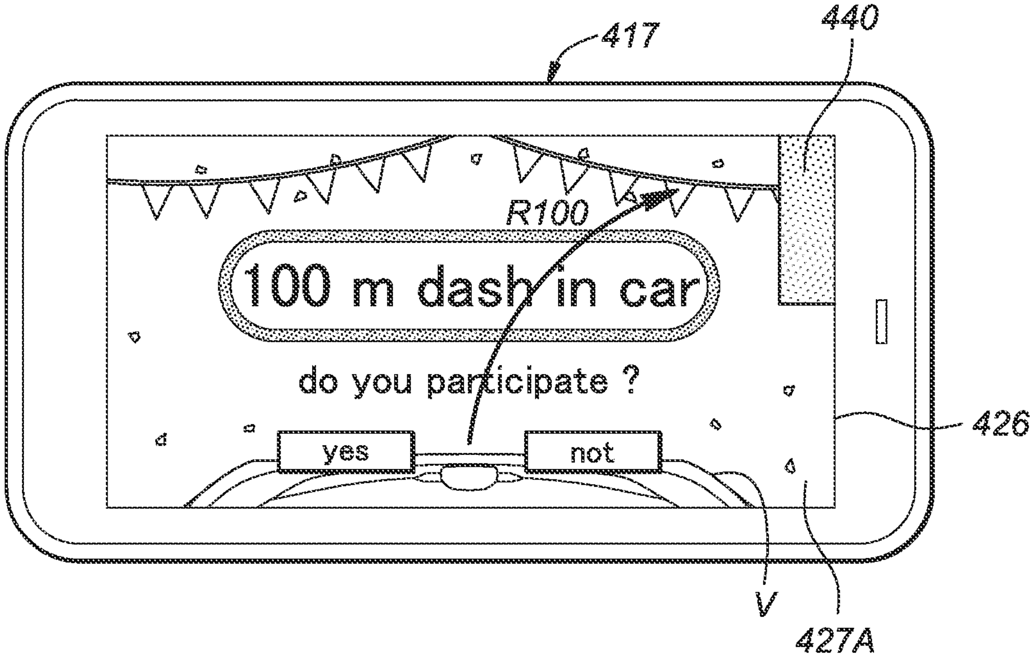
FIG. 36 is a view of the display screen according to a modification of the embodiment shown in FIG. 34(B)

Further, when the vehicle 2 turns left or right, the processing device 421 may acquire the turning radius (more specifically, the curvature of the road on the travel route, etc.) according to the travel route set by the navigation device 413 for the vehicle 2 to travel, and may superimpose the obtained turning radius on the application execution screen 427A as shown in FIG. 36.

Also, the size and moving speed of the illuminated area 440 may be selected based on the behavior information of the vehicle 2. For example, the control unit 416 may acquire the vehicle speed from the vehicle speed sensor 415D, the turning direction of the vehicle 2 from the steering angle sensor 415E, and the fore and aft acceleration of the vehicle 2 from the 6-axis inertial sensor 415A, and transmit them to the processing device 421. When the processing device 421 displays the illuminated area 440 on the application execution screen 427A, the processing device 421 may set the moving speed of the illuminated area 440 according to the vehicle speed. More specifically, the processing device 421 preferably increases the moving speed of the illuminated area 440 as the vehicle speed increases. Also, the processing device 421 may set one of the brightness and the size of the illuminated area 440 according to the magnitude of the fore and aft acceleration. More specifically, the processing device 421 preferably increases the brightness of the illuminated area 440 or increases the size of the illuminated area 440 as the magnitude of acceleration/deceleration increases.

Thus, the occupant is enabled to recognize the turning direction, speed, and acceleration/deceleration of the vehicle 2 from the behavior, such as the movement and deformation thereof, of the illuminated area 440 superimposed and displayed on the application execution screen 427A. Therefore, the occupant can predict the direction and magnitude of the inertial force and prepare in advance, thereby preventing motion sickness. In addition, motion sickness can be prevented by moving the occupant's line of sight and controlling the occupant's posture by moving the illuminated area 440.

In the twelfth embodiment, the biosensors 450 were provided on the front seats 405 and the rear seats 406, but the present invention is not limited to this aspect. The biosensors 450 may include, for example, a camera provided in the terminal device 417, and the processing device 421 may determine if there is a sign of motion sickness based on the direction of the line of sight of the occupant acquired by the camera. However, by providing the biosensors 450 in the seats 405 and 406 on which the occupants are seated, as in the twelfth embodiment, the biosensors 450 can be positioned closer to the occupants. Thereby, the biometric information of the occupants can be acquired more accurately by the biosensors 450.

In the twelfth embodiment, the processing device 421 displayed the behavior of the vehicle on the screen 427 when a symptom of motion sickness is detected, and did not display the behavior of the vehicle 2 when it is determined that there is no symptom. However, the present invention is not limited to this aspect. The processing device 421 may be configured to receive an input from the occupant regarding the choice of display/non-display of the behavior on the touch panel 426 (receiving unit), and switch the display of the behavior based on the input.

Specifically, the processing device 421 displays a button on the screen 427 for accepting an input from the occupant regarding if the behavior of the vehicle 2 is desired to be displayed. When the touch panel 426 detects an input corresponding to a desire to display the behavior, the processing device 421 executes step ST21. Further, when an input corresponding to a desire not to display the behavior of the vehicle 2 is detected on the touch panel 426, the processing device 421 ends the display process. As a result, the behavior of the vehicle 2 is displayed on the screen 427 when there is an input corresponding to a desire to display on the touch panel 426, and the behavior of the vehicle 2 is not displayed on the screen 427 when there is an input corresponding to the desire not to display (that is, the display of the behavior on the screen 427 is stopped). Thereby, the occupant can select display/non-display of the behavior at will.

In the ninth to eleventh embodiments, the turning direction and acceleration/deceleration of the vehicle 2 were displayed on the screen 427 by the vehicle icon V and the arrow, and the illuminated area 440, but such behavior information may be displayed by characters (such as a high, medium or low acceleration, a severe, medium or light curve, etc.). However, in the above-described embodiment, arrows and light emitting regions 440 were displayed on the screen 427 instead of characters, so the occupant can more intuitively understand the turning direction of the vehicle 2.

Figure 37:
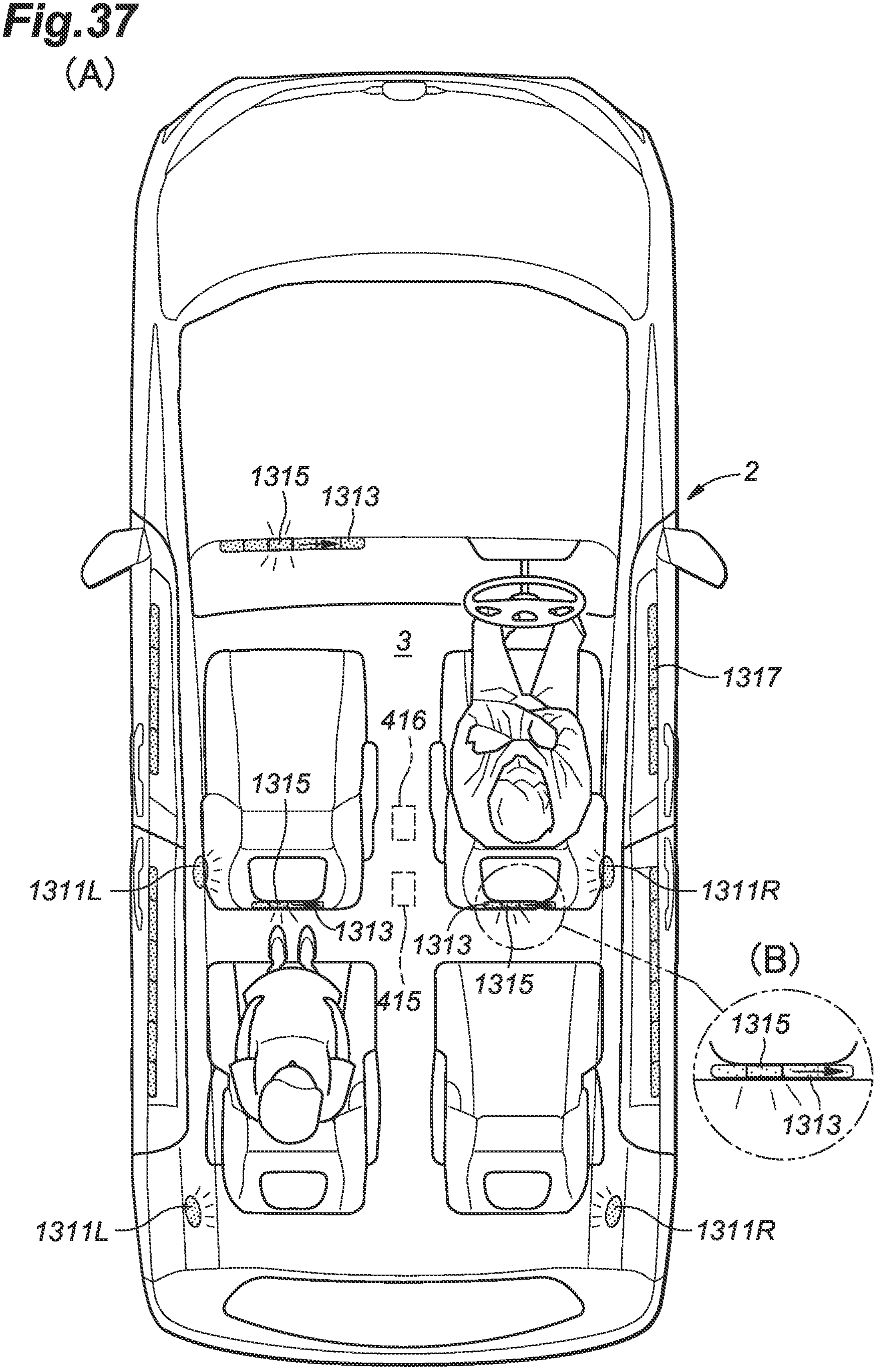
FIG. 37 shows (A) a diagram showing the state of illumination when a left light emitting device, a right light emitting device and a lateral light emitting device are provided in a cabin, and the vehicle is making a left turn, and (B) an enlarged view of a part surrounded by a dotted line in FIG. 37(A)

Further, as shown in FIG. 37A, the vehicle 2 is provided with left light emitting devices 1311L for illuminating a left side part of the vehicle cabin 3 and a right light emitting devices 1311R for illuminating a right side part of the vehicle cabin 3. The control unit 416 may be configured to control light emission of both the left and right light emitting devices 1311L and 1311R based on the behavior information of the vehicle 2. For example, when the vehicle 2 turns leftward (specifically, when the vehicle behavior sensor 415 detects acceleration in the leftward direction, or when the travel route acquired by the navigation device 413 indicates a leftward turn), the left light emitting devices 1311L are turned on. Conversely, when the vehicle 2 turns rightward (specifically, when the vehicle behavior sensor 415 detects acceleration in the rightward direction, or when the travel route acquired by the navigation device 413 indicates a rightward turn), the light emitting devices 1311R are turned on.

In addition, the control unit 416 may be connected to lateral light emitting devices 1313 each provided with a plurality of light emitting regions 1315 arranged in the lateral direction and configured to be individually lighted so that the selected regions of the lateral light emitting devices 1313 may be lighted and the distribution of the lighted regions may be varied depending on the behavior information. More specifically, the control unit 416 may control the lateral light emitting devices 1313 such that the light emitting regions 1315 are lighted so as to move from left to right when the vehicle 2 is about to make a left turn (or when the vehicle behavior sensor 415 has detected leftward acceleration, or when the travel route acquired by the navigation device 413 indicates a leftward turn) as shown in FIG. 37B, and to move from right to left when the vehicle 2 is about to make a right turn (or when the vehicle behavior sensor 415 has detected rightward acceleration, or when the travel route acquired by the navigation device 413 indicates a rightward turn).

Furthermore, the control unit 416 may be connected to longitudinal light emitting devices 1317 that each include a plurality of light emitting regions 1315 arranged in the fore and aft direction and configured to be individually lighted so that the selected regions of the longitudinal light emitting devices 1317 may be lighted and the distribution of the lighted regions may be varied depending on the behavior information. More specifically, the control unit 416 may control the light emitting regions of the longitudinal light emitting devices 1317 such that the light emitting regions may be lighted so as to move from front to rear when a forward acceleration is detected by the behavior sensor 415 (or when the vehicle behavior sensor 415 indicates an acceleration), and such that the light emitting regions may be lighted so as to move from rear to front when a rearward acceleration is detected by the behavior sensor 415 (or when the vehicle behavior sensor 415 indicates a deceleration).

As a result, the display on the screen 427 of the terminal device 417 is synchronized with the light emission by the left light emitting devices 1311L, the right light emitting devices 1311R, the lateral light emitting devices 1313, and the longitudinal light emitting devices 1317 of the vehicle 2, so that the occupant can reliably determine the turning direction, and motion sickness can be prevented in a highly effective manner. The left light emitting devices 1311L and the right light emitting devices 1311R are preferably provided on the ceiling of the cabin 3. Also, the lateral light emitting devices 1313 may be provided on the back surfaces of the seat backs 411 of the front seats 405, and the longitudinal light emitting devices 1317 may be provided on the upper edges of the door trims.

Thirteenth Embodiment

Figure 38:
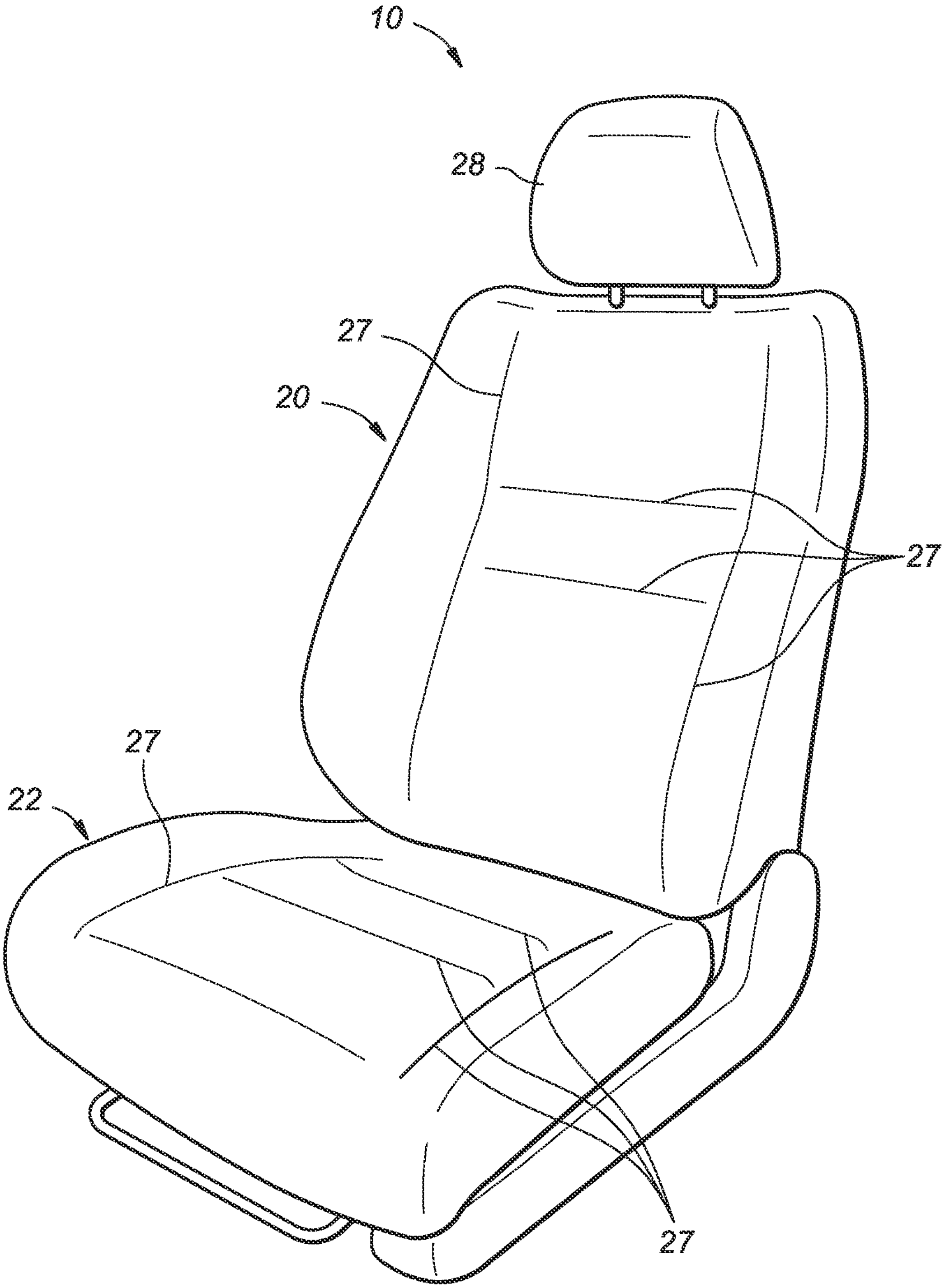
FIG. 38 is a perspective view of a vehicle seat according to a thirteenth embodiment of the present invention.

FIG. 38 is a perspective view of a vehicle seat device 10 according to a thirteenth embodiment of the present invention. The vehicle seat device 10 includes a seat cushion 22 supported by a vehicle body, a seat back 26 connected to the seat cushion 22, and a headrest 28 connected to the seat back 26. Each of the seat cushion 22, the seat back 26, and the headrest 28 includes a pad 625 (see FIG. 39) made of foamed resin such as urethane foam, and a skin member 626 (see FIG. 39) covering the seating surface side of the pad 625. A plurality of linearly recessed listing portions 627 are formed in the longitudinal and lateral directions on the surfaces of the seat cushion 22 and the seat back 26 on the seating surface side by pulling the skin member 626 into the pad 625.

Figure 39:
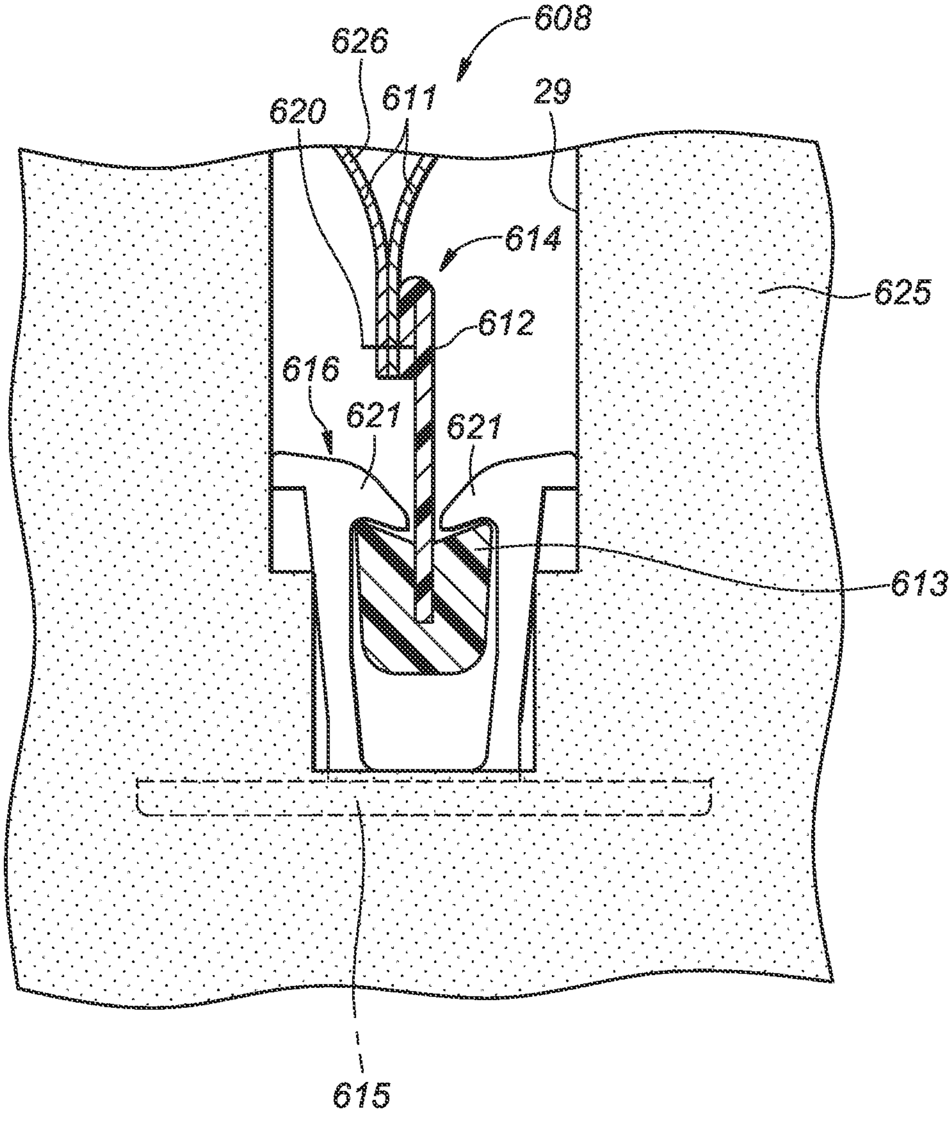
FIG. 39 is a sectional view of a listing structure in the thirteenth embodiment.

FIG. 39 shows a listing structure for the vehicle seat device 10 of the thirteenth embodiment. The listing structure includes a pad 625 having listing grooves 629 formed therein, a plurality of engaging members 616 provided in the bottom parts of the listing grooves 629 arranged along the length of the listing grooves 629 (longitudinally) in a mutually spaced apart relationship, and fixedly attached to the pad 625, and listing members 614 extending in the listing grooves 629 along the length of the listing grooves 629.

The skin member 626 covering the surface of the pad 625 includes listing edges 611 each extending in the corresponding listing groove 29 along the length of the listing groove 29, and each listing edge portion 611 is connected to the engaging members 616 via the corresponding listing member 614. Each listing member 614 includes a first edge portion 612 connected to the listing edge portion 611 and a second edge portion 613 (engaged portion) fixed to the free end edge of the first edge portion 612 and engaged by the engaging members 616.

The pad 625 is made of foamed resin such as urethane foam. The listing grooves 29 are open toward the seating surface, and extend in the longitudinal direction (the fore and aft direction in the case of the seat cushion 22 and the vertical direction in the case of the seat back 26) and the lateral direction. The bottom surface of the listing grooves 29 extends substantially at a same thickness-wise position and on a substantially common plane.

The engaging members 616 each consist of a clip including a substrate 615 embedded in the pad 625 at the bottom of the listing groove 29 and a pair of locking claws 621 extending from the substrate 615 into the listing groove 29. The substrate 615 of the engaging member 616 consisting of a clip is embedded in the pad 625 during the foaming of the pad 625.

Figure 40:
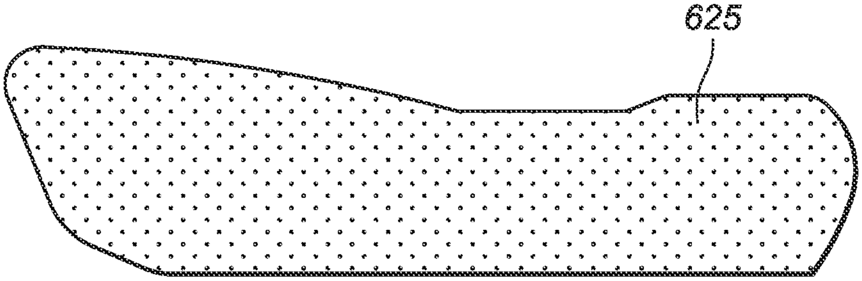
FIG. 40 is a sectional view taken along a line extending laterally through the pad of the seat cushion in the thirteenth embodiment (A: laterally central part, B: laterally side part adjacent to a listing portion that extends in a fore and aft direction)
Figure 40:
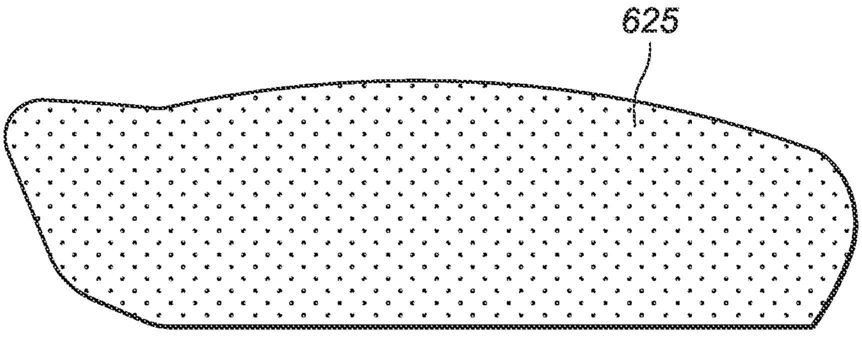

The listing edge portion 611 of the skin member 626 is formed by bringing two edge parts of the skin member 626 into contact with each other in a mutually aligned relationship, and connecting them by sewing or the like. Alternatively, the listing edge portion 611 may be formed by folding the skin member 626 so as to form a trough having an open side facing upward, and connecting the mutually abutting portions thereof by sewing or the like. The pad 625 is provided with an uneven surface, as shown in FIG. 40. Since the bottom surface of the listing groove 29 extends at a constant position in the thickness-wise direction of the pad 625, the free edge of the listing edge portion 611 may have a convex or concave contour.

As shown in FIG. 39, each listing member 614 includes a first edge portion 612 which is made of a cloth-like member such as nonwoven fabric, extends along the length of the listing groove 29, and is connected to the corresponding listing edge portion 611 by a sewing line 620 or the like, and a second edge portion 613 which is made of resin or the like, extends along the length of the corresponding listing groove 29 and connected to the free edge of the first edge portion 612 on the side of the listing groove 29.

Each listing member 614 extends linearly when no force is applied, but is capable of bending deformation. The second edge portion 613 bulges in the thickness direction on both sides of the first edge portion 612, and has an adequate rigidity so as to be engaged by the locking claws 621 of the engaging member 616. The second edge portion 613 has a higher bending stiffness than the first edge portion 612. In other words, the first edge portion 612 is capable of bending more readily than the second edge portion 613. The second edge portion 613 is formed by injection molding, and the first edge portion 612 is connected to the second edge portion 613 by being placed in a molding cavity during the molding of the second edge portion 613. If the first edge portion 612 and the second edge portion 613 are to be made of a same resin, the listing member 614 may be formed by extrusion molding. The first edge portion 612 is folded back along the connecting portion with the listing edge portion 611.

The second edge portion 613 consisting of a resin member bulging in the thickness-wise direction may be substituted by a combination of a first wire retained by the first edge portion 612 and hog rings engaged by the first wire, and the engaging members 616 in the form of clips may be substituted by a second wire which is configured to engage the hog rings (although not shown in the drawings).

The first edge portion 612 is provided with a readily deformable portion 617 as shown in FIG. 41A. The listing member 614 is easier to bend and deform at the readily deformable portion 617 than at other portions. The readily deformable portion 617 is formed by a notch cut out from the edge on the side of the first edge portion 612 connected to the skin member 626. The notch forming the readily deformable portion 617 has a predetermined length on the free edge side of the first edge portion 612. The readily deformable portion 617 may be configured by a portion thinner than the remaining portions of the first edge portion 612 instead of the notch. The illustrated readily deformable portion 617 has a rectangular shape when viewed from the direction perpendicular to the surface of the cloth-like first edge portion 612, but may have other shapes such as triangular, circular and semicircular shapes. It is preferable that the first edge portion 612 is more readily deformable than the second edge portion 613 even in a portion displaced from the readily deformable portion 617 in the longitudinal direction of the listing groove 29.

Figure 43:
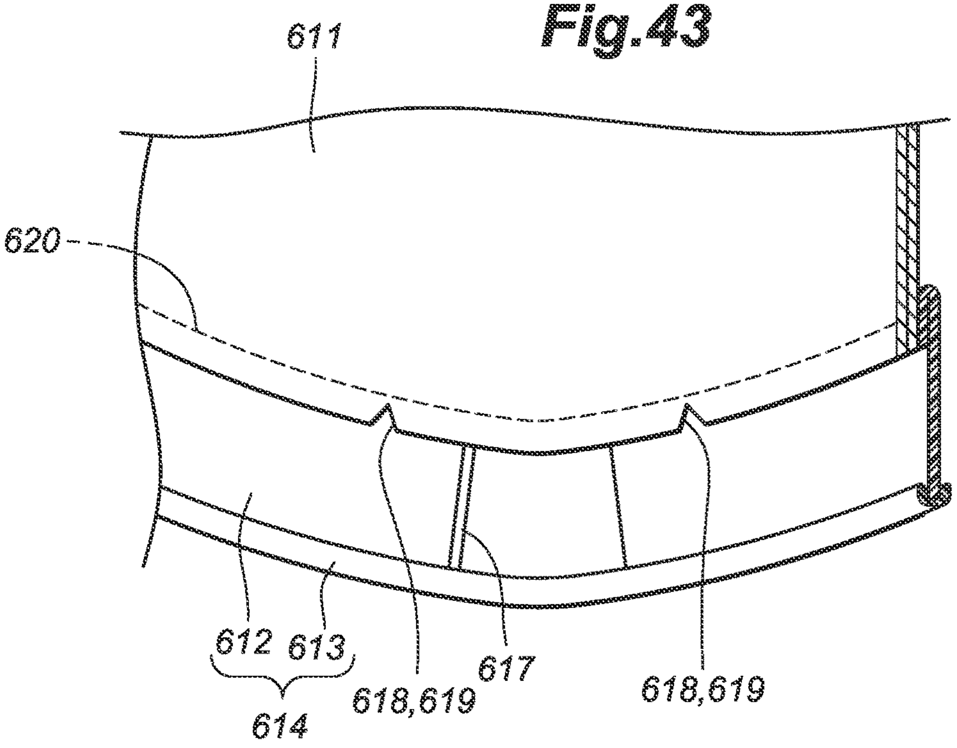
FIG. 43 is a diagram showing the listing process of the listing structure in the thirteenth embodiment (upper diagram: the skin member which is folded over a sewing line, lower diagram: listing groove in the pad)
Figure 43:
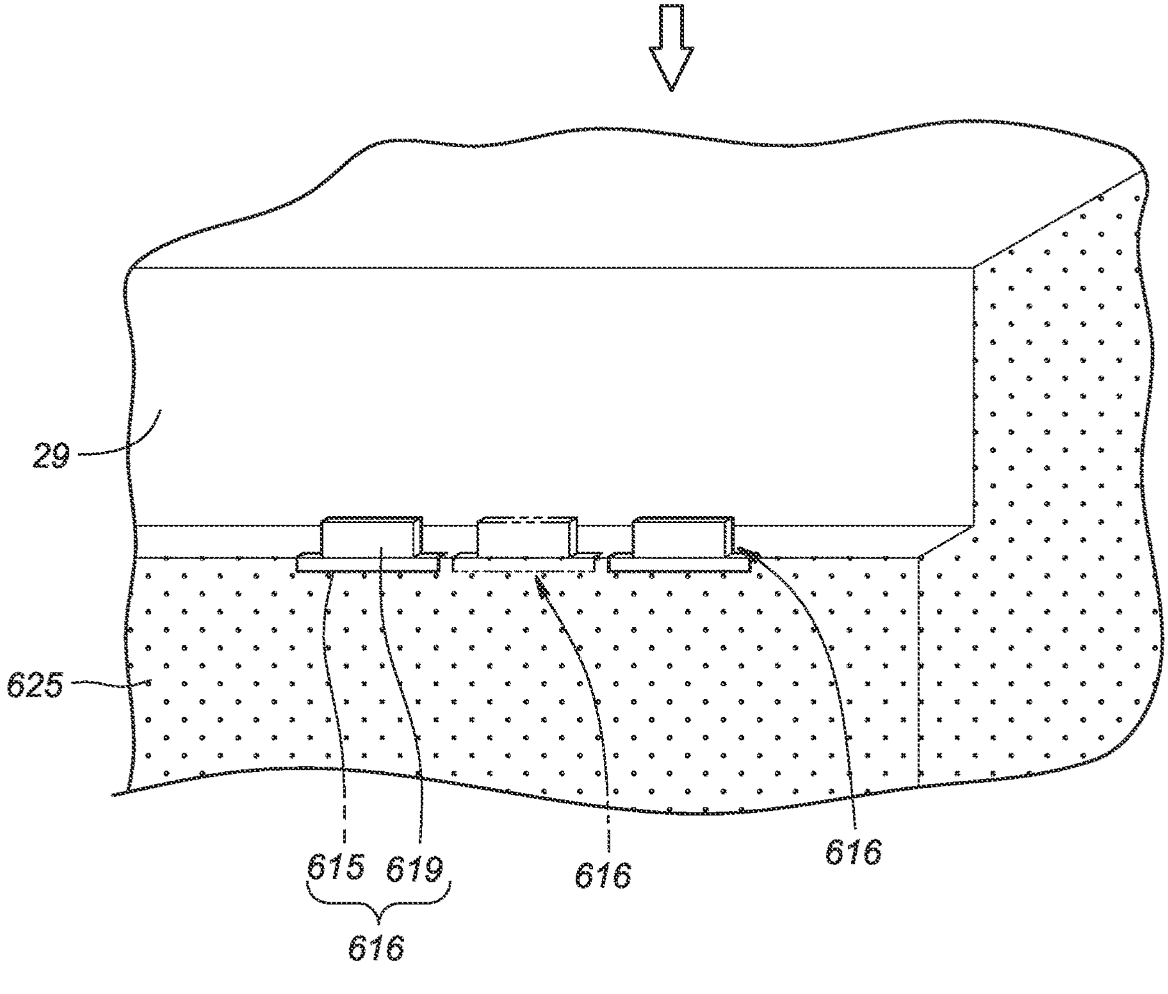

As shown in FIG. 43, the engaging members 616 are preferably provided at positions shifted from the readily deformable portion 617 in the longitudinal direction of the listing groove 29. However, the engaging member 616 may be provided at a position aligning with the readily deformable portion 617, as indicated by a two-dot chain line in FIG. 43. The readily deformable portion 617 is provided at a part of the listing edge portion 611 which is curved in a convex or concave shape.

As shown in FIG. 43, the edge of the first edge portion 612 remote from the second edge portion 613 is provided with a plurality of markings 618. At least a pair of marking 618 are provided on either side of the readily deformable portion 617. Also, the listing edge portion 611 of the skin member 626 is provided with markings 619 at positions thereof corresponding the markings 618 of the first edge portion 612. The markings 618 and 619 are preferably notches having shapes that match each other, but may also be markings made with a pen or the like, which can be erased after the listing edge portion 611 and the first edge portion 612 are connected to each other. At least a part of the markings 618 and 619 may be provided at positions aligning with the engaging members 616.

An assembling method associated with the listing structure will be described in the following with reference to FIGS. 41 to 43.

Figure 41:
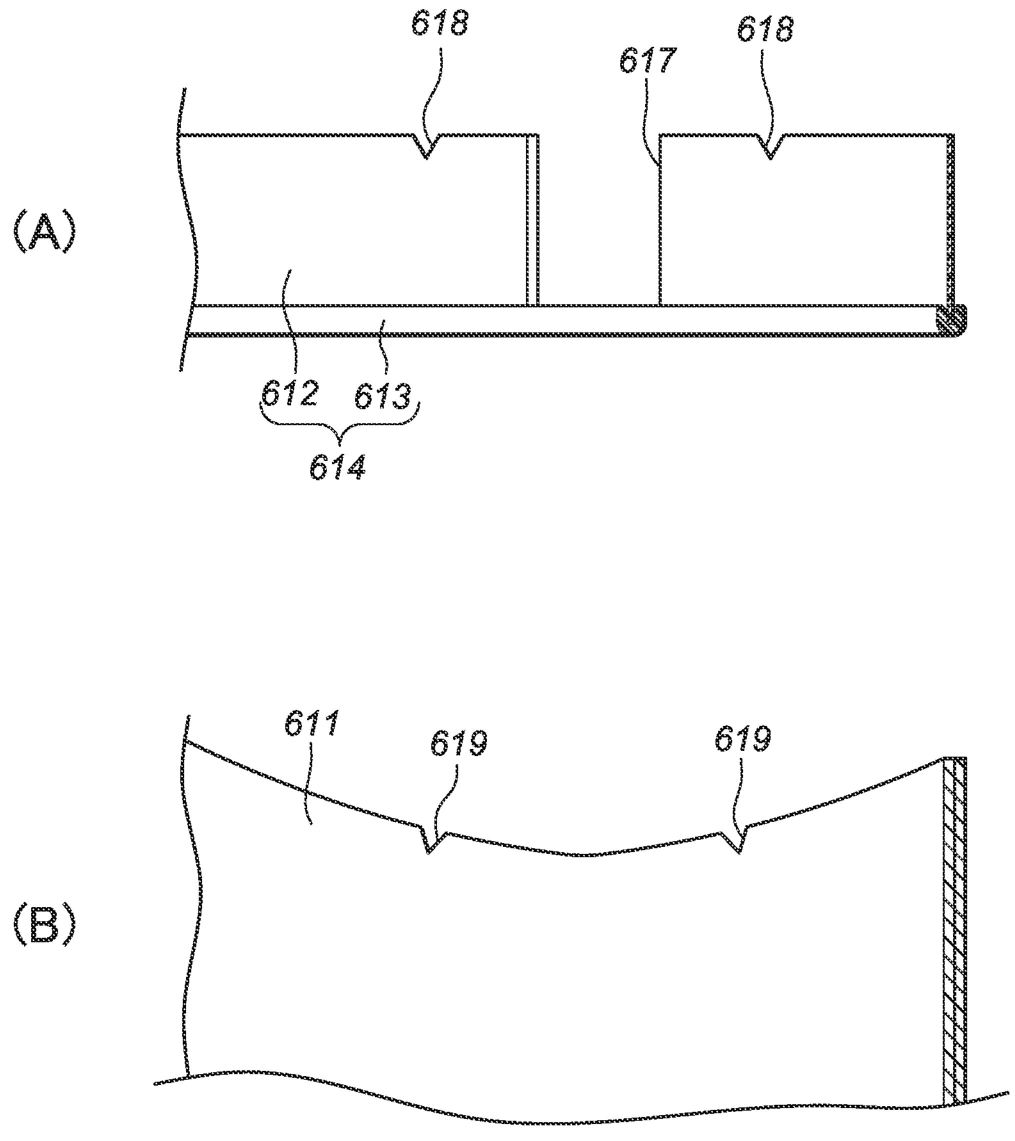
FIG. 41 is a diagram showing the listing process of the listing structure in the thirteenth embodiment (A: skin member, B: listing member)
Figure 42:
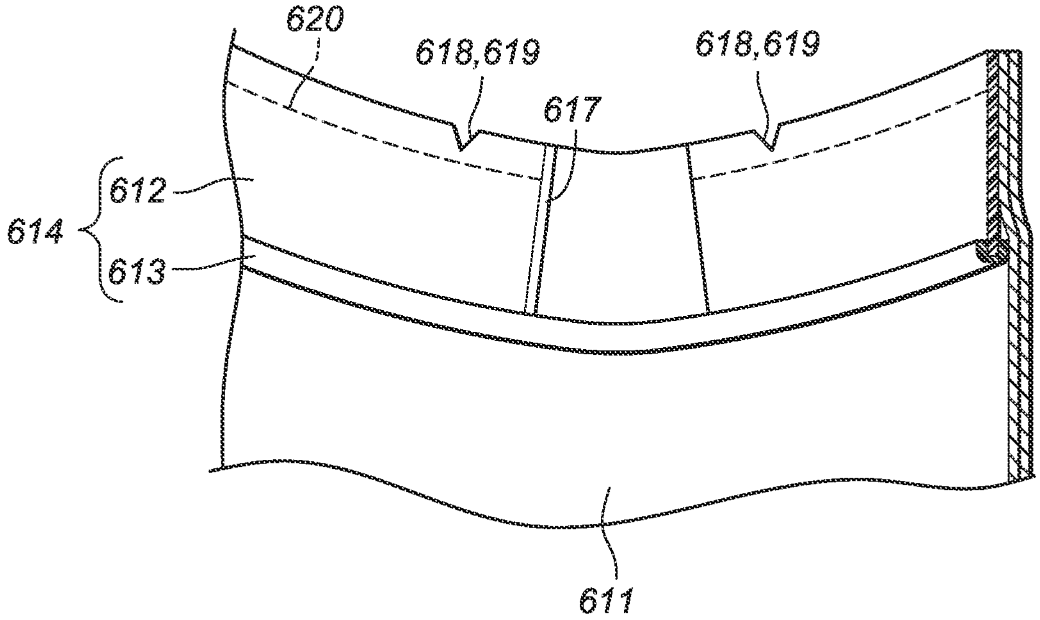
FIG. 42 is a diagram showing the listing process of the listing structure in the thirteenth embodiment (with the listing member overlapping with the skin member and sewn thereto)

First, as shown in FIG. 41, the worker cuts out the first edge portion 612 to provide the readily deformable portion 617, and provide markings 618 on the edge of the first edge portion 612 of the listing member 614 remote from the edge to which the second edge portion 613 is attached. The readily deformable portion 617 is provided in a part of the listing edge portion 611 which is curved in a concave or convex shape. The worker then makes markings 619 on the parts of the listing edge portion 611 of the skin member 626 corresponding to the markings 618.

The worker then aligns the markings 619 of the listing edge portion 611 with the markings 618 of the first edge portion 612, and aligns the edge of the listing edge portion 611 with the edge of the first edge portion 612 remote from the second edge portion 613. Then, the listing member 614 is folded onto the skin member 626 along the listing edge portion 611. The worker sews together the first edge portion 612 of the listing member 614 and the listing edge portion 611 of the skin member 626 which are in a mutually overlapping relationship. A dashed line in FIG. 42 indicates the sewing line 620. The sewing line 620 is provided so as to avoid the markings 618 and 619 formed by the notches. The connection between the first edge portion 612 and the listing edge portion 611 may also be performed by means other than sewing such as adhesion.

The worker then folds the first edge portion 612 along the sewing line 620 such that the skin member 626 is positioned remotely from the second edge portion 613 with respect to the first edge portion 612. The worker inserts the second edge portion 613 into the listing groove 29 and causes the second edge portion 613 to be engaged by the engaging member 616.

The effect of the foregoing embodiment will be discussed in the following. Since the readily deformable portion 617 is provided, the listing member 614 can be easily maintained in the bent state along the listing edge portion 611, and the connection of the listing member 614 to the listing edge portion 611 having an edge curving in a convex or concave shape is facilitated. Since the markings 618 and 619 are provided on either side of the readily deformable portion 617, the connection between the listing member 614 and the listing edge portion 611 having a convex or concave shaped edge is facilitated. Since the listing member 614 is connected to the listing edge portion 611 having an edge curved in a convex or concave shape, the curved shape of the seating surface of the vehicle seat device 10 can be easily reproduced as designed.

Since the first edge portion 612 is easier to bend and deform than the second edge portion 613, the connection work such as sewing between the listing edge portion 11 and the first edge portion 612 is facilitated.

When the listing edge portion 611 and the first edge portion 612 are connected to each other by sewing, the listing edge portion 611 and the first edge portion 612 are sewn together in a mutually overlapped state such that the edges thereof are aligned. Therefore, it is easier to align the markings 618 and 619 with the listing member 614 in the curved state as compared to the case where the listing edge portion 611 and the first edge portion 612 are connected in such a manner that the edges thereof abut each other.

At least a part of the markings 618 and 619 are provided at positions aligning with the engaging members 616, so that the listing edge portion 611 can be inserted into the proper position of the listing groove 29. Since the sewing line 620 is provided at a position avoiding the markings 618 and 619 formed by notches, the strength of the connection between the listing edge portion 611 and the first edge portion 612 is not impaired.

The second edge portion 613 deforms so as to bend the most at a position aligning with the readily deformable portion 617. When the engaging members are provided only at positions avoiding the readily deformable portion 617 in the longitudinal direction of the listing groove 29, since the second edge portion 613 is engaged by the engaging members 616 at positions avoiding the most deformed portion, engaging the second edge portion 613 with the engaging members 616 is facilitated. Therefore, when an engaging member 616 is provided at a position aligning with the readily deformable portion 617, since the most severely curved portion of the listing edge portion 611 engages the engaging member 616 via the listing member 614, the unevenness of the seating surface of the vehicle seat device 10 is favorably reproduced as designed.

Even if the edge of the listing edge portion 611 has unevenness, a long single-piece listing member can be used without dividing the listing member into multiple pieces, and an increase in the number of parts can be avoided.

It should be noted that the present invention can be applied not only to road vehicle seats, but also to other vehicle seats and seats for use in houses and the like, as long as the seat includes a pad and a skin member.

Fourteenth Embodiment

A clip and a vehicle seat according to a fourteenth embodiment of the present invention will be described in the following with reference to FIGS. 44 to 50.

Figure 44:
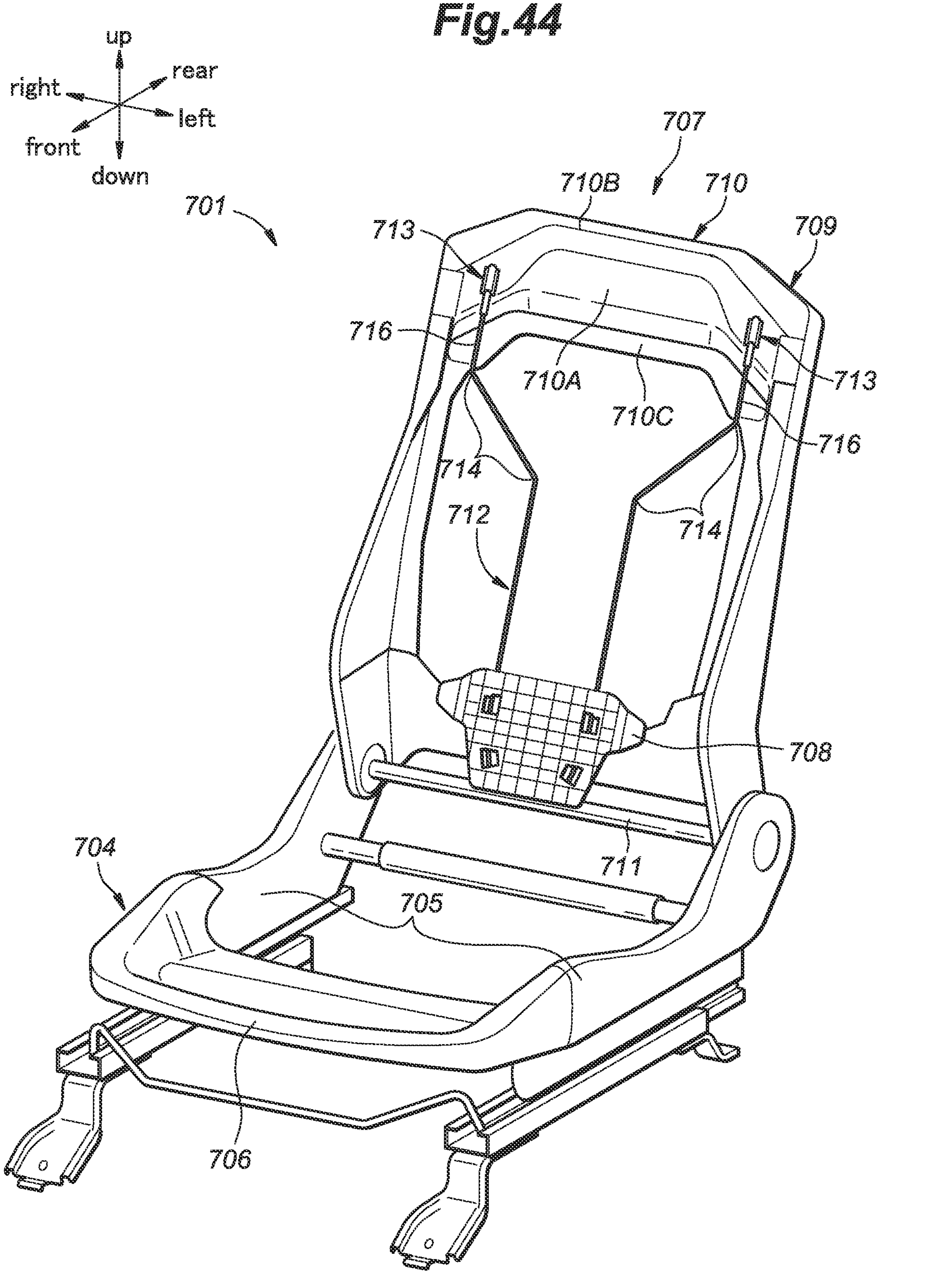
FIG. 44 is a perspective view of a frame of a seat to which a clip according to a fourteenth embodiment of the present invention is applied.
Figure 45:
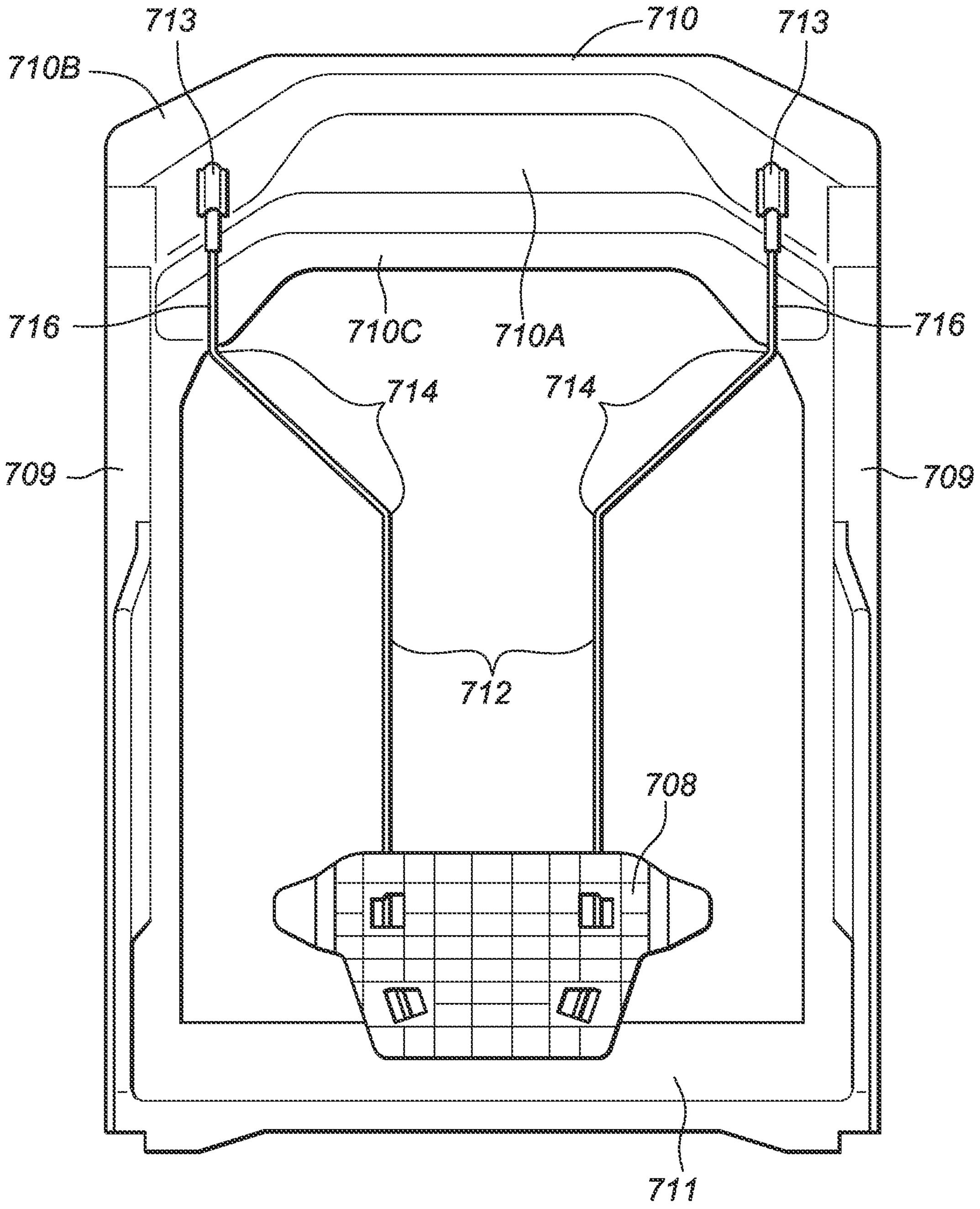
FIG. 45 is a front view of a seat back to which the clip of the fourteenth embodiment is applied.

As shown in FIGS. 44 and 45, the vehicle seat 701 has a seat cushion frame 704 that forms the structural framework of the seat cushion. A pad (not shown in the drawings) is attached to the seat cushion frame 704. The outer surface of the pad is covered with a skin member (not shown in the drawings).

The seat cushion frame 704 has a pair of cushion side members 705 extending in the fore and aft direction on either side, and a front member 706 extending laterally between the front ends of the left and right cushion side members 705. The rear ends of the left and right cushion side members 705 extend obliquely upward.

The vehicle seat 701 is further provided with a seat back frame 707 forming a structural framework of the seat back and a pressure receiving member 708 (lumbar support) supported by the seat back frame 707. A pad (not shown in the drawings) is attached to the seat back frame 707 and the pressure receiving member 708. The outer surface of the pad is covered with a skin member (not shown in the drawings).

The seat back frame 707 includes a pair of back side members 709 extending vertically on either side of the seat back frame 707, an upper member 710 extending laterally between the upper ends of the left and right back side members 709, and a lower member 711 extending laterally between the lower ends of the back side members 709. The upper member 710 is made of sheet metal, in particular a channel member having an open side facing rearward. The upper member 710 includes a front wall portion 710A facing front and back, an upper wall portion 710B extending rearward from the upper edge of the front wall portion 710A, and a lower wall portion 710C extending rearward from the lower edge of the front wall portion 710A. The lower ends of the back side members 709 are connected to the rear ends of the corresponding left and right cushion side members 705 via a reclining mechanism.

A plurality of wires 712 extend between the upper member 710 and the lower member 711. The wires 712 in this embodiment extend vertically in the seat back frame 707 in a symmetric manner. The wires 712 are made of metal. The lower end of each wire 712 is connected to the lower member 711, and the upper end of the wire 712 is connected to the upper member 710 via a clip 713. The lower ends of the wires 712 may be connected to each other.

The wires 712 support the pressure receiving member 708 at a position between the upper member 710 and the lower member 711. The wires 712 each include a first rod part 715 and a second rod part 716 connected to each other via a bend 714 in an upper part thereof. Each first rod part 715 is positioned above the bend 714 and extends linearly and vertically. The second rod part 716 is tilted with respect to the first rod part 715 with a tilt angle $\alpha$ (see FIGS. 46 and 47), and extends downward and rearward from the bend 714. The tilt angle $\alpha$ is an obtuse angle equal to or greater than 90 degrees and equal to or smaller than 180 degrees.

The pressure receiving member 708 is a plate-like member that supports the back of the seat occupant. The pressure receiving member 708 is engaged by the upper member 710 and lower member 711 via the wires 712. The pressure receiving member 708 is preferably flexible and made of a resin material or the like. The pressure receiving member 708 is positioned in front of and in a lower part of the seat back frame 707. The pressure receiving member 708 extends in the seat back frame 707 both laterally and vertically. A part of the pressure receiving member 708 may overlap with a front side of the lower member 711.

Figure 46:
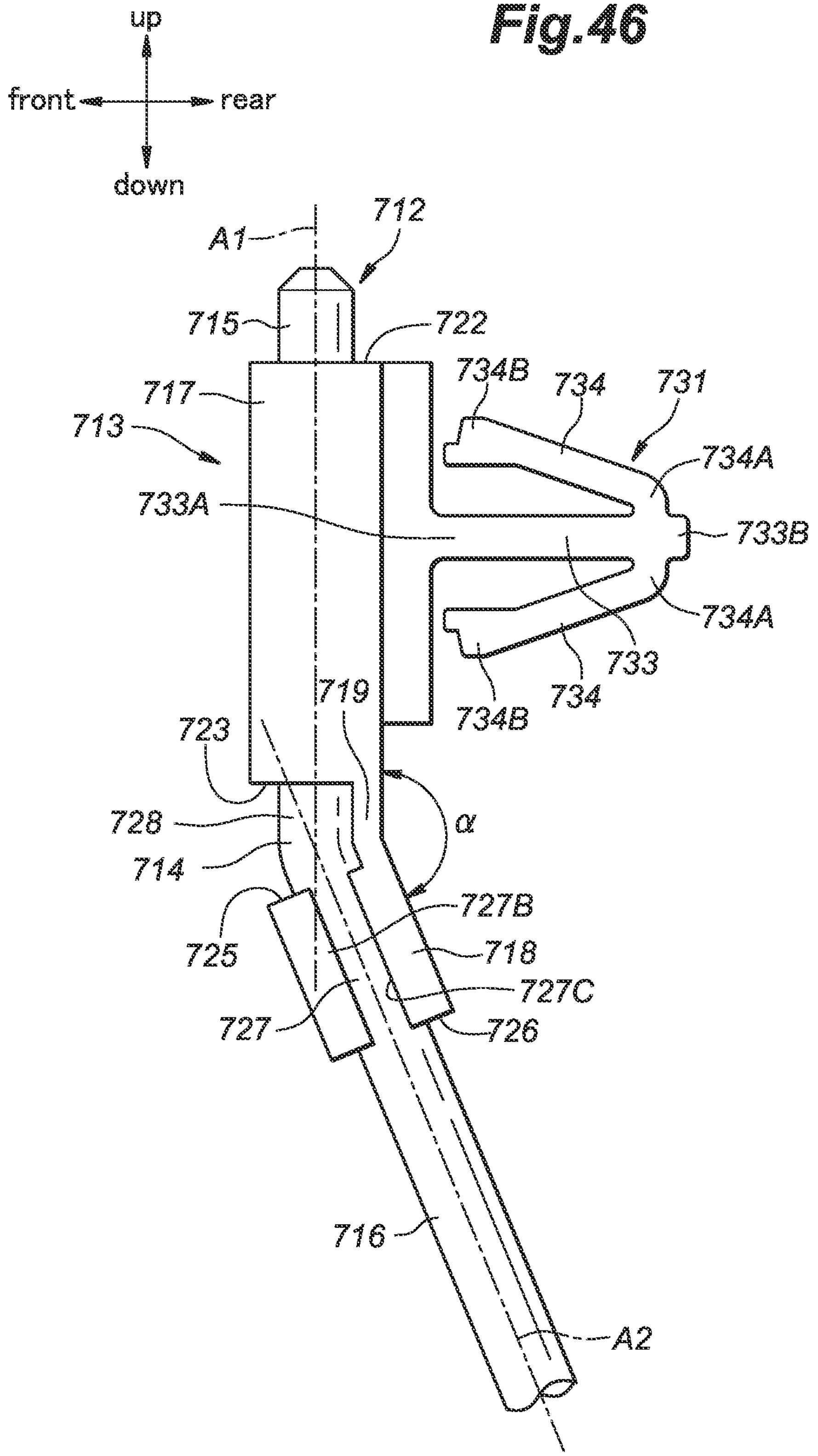
FIG. 46 is right side view of the clip of the fourteenth embodiment.
Figure 47:
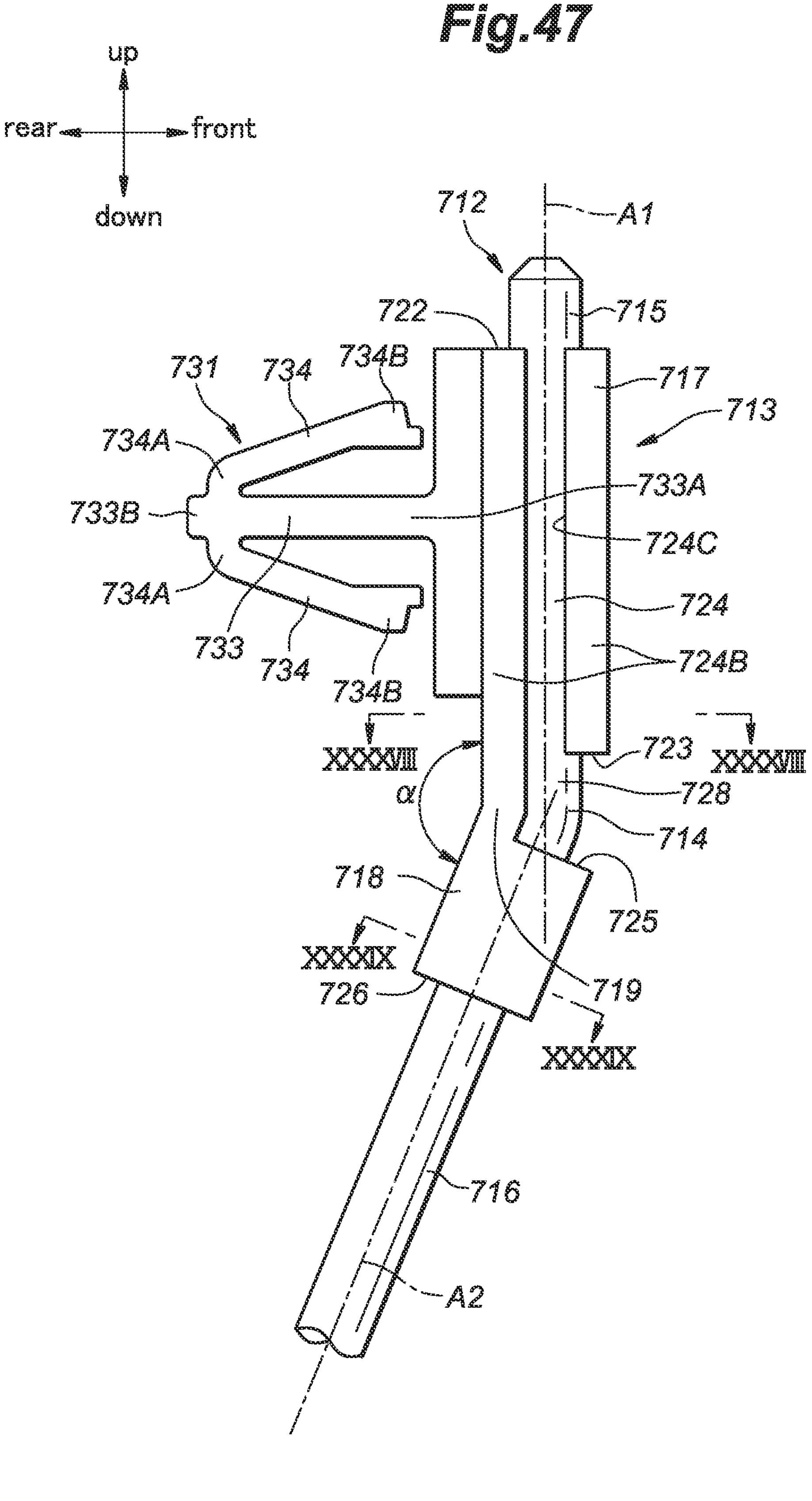
FIG. 47 is left side view of the clip of the fourteenth embodiment.

The upper end of each wire 712 (first member) is connected to the upper member 710 (second member) via a clip 713. The clip 713 is flexible and made of resin, for example. As shown in FIGS. 46 and 47, the clip 713 has a first portion 717, a second portion 718 and a connecting portion 719 as shown in FIGS. 46 and 47. The connecting portion 719 connects the first portion 717 and the second portion 718 to each other. The first portion 717 has a first axis A1 (see FIGS. 46 and 47), and the second portion 718 has a second axis A2 (see FIGS. 46 and 47) inclined with respect to the first axis A1. The first portion 717 and the second portion 718 may have a rectangular parallelepiped or cylindrical outer profile. In this embodiment, the first portion 717 is formed as a rectangular parallelepiped extending along the first axis A1, and the second portion 718 is formed as a rectangular parallelepiped extending along the second axis A2. The length of the first portion 717 along the first axis A1 is longer than the length of the second portion 718 along the second axis A2. The angle between the first axis A1 and the second axis A2 is preferably set equal to the tilt angle $\alpha$ between the first rod part 715 and the second rod part 716.

Figure 48:
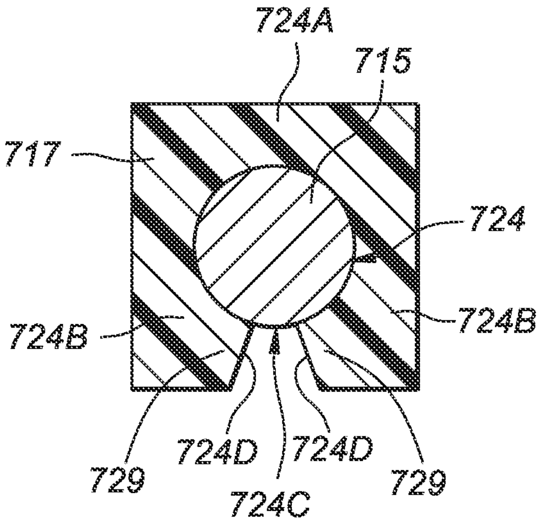
FIG. 48 is a sectional view taken along line XXXXVIII-XXXXVIII of FIG. 47.

The first portion 717 has a first end surface 722 at one end in the direction along the first axis A1 and a second end surface 723 at the other end. The first portion 717 has a first groove 724 formed along the first axis A1. The first groove 724, as shown in FIG. 48, is defined by a bottom portion 724A and a pair of side walls 724B projecting from opposite side edges of the bottom portion 724A over the bottom portion 724A. In other words, the first groove 724 has a slotted opening 724C that extends along the first axis A1 and reaches the first end surface 722 and the second end surface 723.

Figure 49:
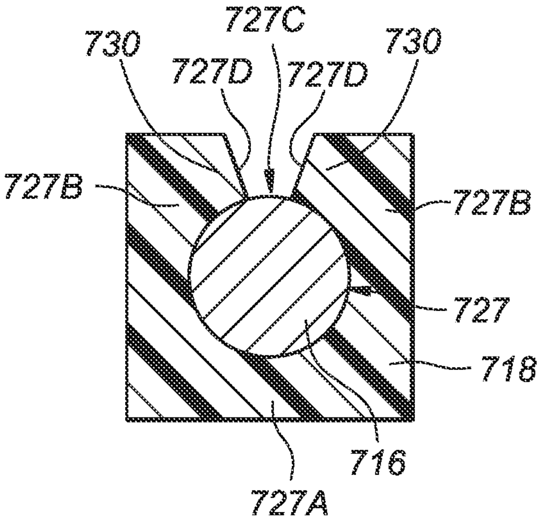
FIG. 49 is a sectional view taken along line XXXXIX-XXXXIX of FIG. 47.

The second portion 718 has a third end surface 725 at one end in the direction along the second axis A2 and a fourth end surface 726 at the other end. The second portion 718 has a second groove 727 formed along the second axis A2. The second groove 727, as shown in FIG. 49, is defined by a bottom portion 727A and a pair of side walls 727B projecting from opposite side edge of the bottom portion 727A over the bottom portion 727A. In other words, the second groove 727 has a slotted opening 727C extending along the second axis A2 and reaching the third end surface 725 and the fourth end surface 726.

A connecting portion 719 extends between the second end surface 723 and the third end surface 725. The connecting portion 719 is formed in a plate shape and connects the side wall 724B of first portion 717 on one side and the side wall 727B of second portion 718 on the other side to each other. A third groove 728 is defined by the connecting portion 719, the second end surface 723 and the third end surface 725. The third groove 728 extends in a direction orthogonal to each of the first axis A1 and the second axis A2. The third groove 728 is connected to the end of the first groove 724 on the side of the second end surface 723, and is connected to the end of the second groove 727 on the side of the third end surface 725. The opening direction of the first groove 724 matches one end of the third groove 728 in the extending directions thereof, and the opening direction of the second groove 727 matches the other end of the third groove 728 in the extending direction thereof. In other words, the first groove 724 and the second groove 727 are open in opposite directions.

The first groove 724 receives at least a part of the first rod part 715. A pair of first projecting portions 729 project toward each other from the respective side walls 724B defining the first groove 724 on the side of the slotted opening 724C. The width of the first groove 724 at the open end is set smaller than the diameter of the first rod part 715 by the first projecting portions 729 as shown in FIG. 48. The side surfaces 724D forming the slotted opening 724C of the first groove 724 are inclined so as to come closer to each other toward the bottom portion 724A of the first groove 724. More specifically, the surfaces of the first projecting portions 729 on the opening end side are inclined so as to come closer to each other toward the bottom portion 724A of the first groove 724.

The second groove 727 receives at least a part of the second rod part 716. A pair of second projecting portions 730 project toward each other from the respective side walls 727B defining the second groove 727 on the side of the slotted opening 727C. The width of the second groove 727 at the open end is set smaller than the diameter of the second rod part 716 by the second projecting portions 730 as shown in FIG. 49. The side surfaces 727D forming the slotted opening 727C of the second groove 727 are inclined so as to come closer to each other toward the bottom portion 727A of the second groove 727. More specifically, the surfaces of the second projecting portions are inclined so as to come closer to each other toward the bottom portion 727A of the second groove 727.

Figure 50:
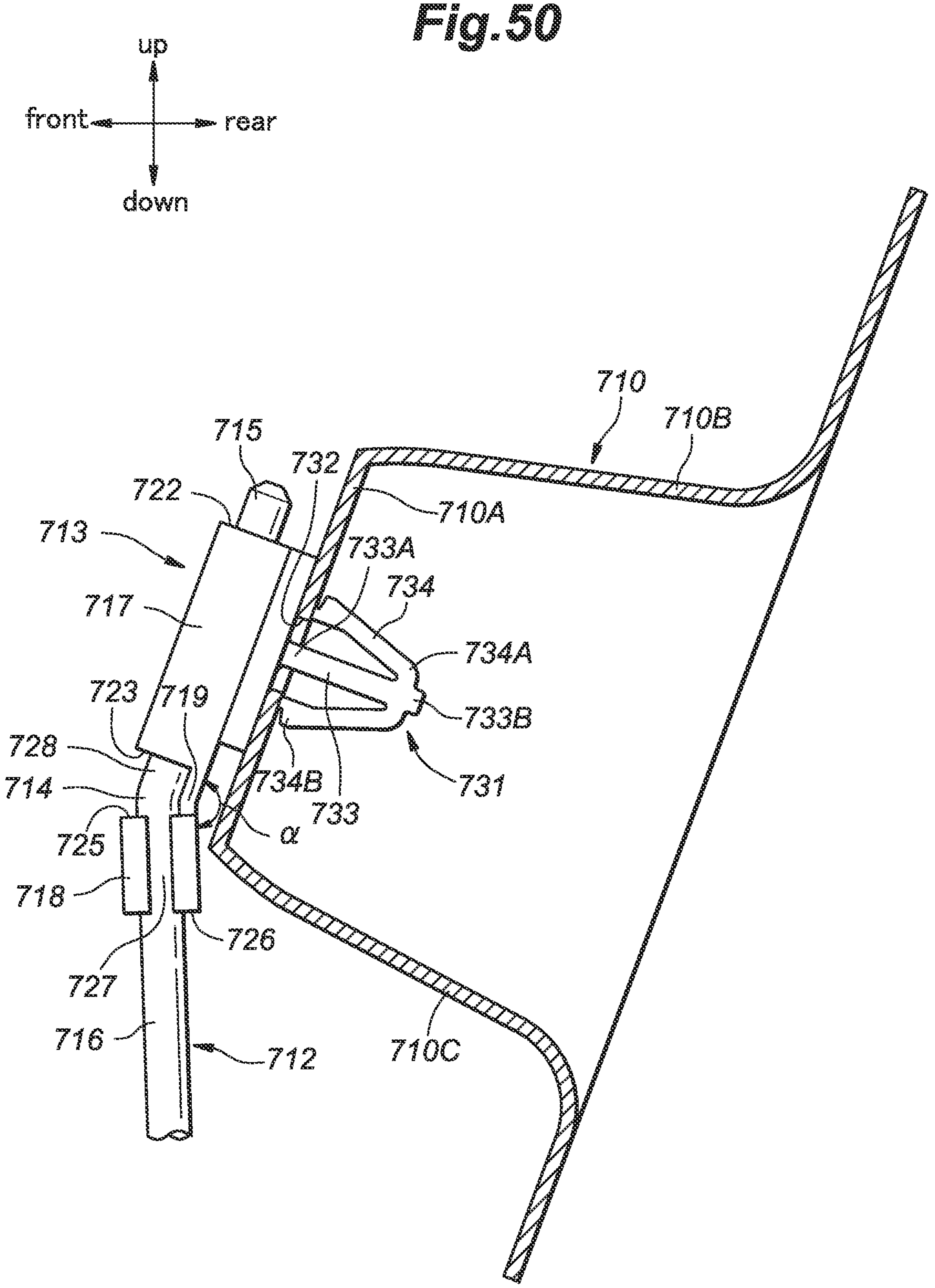
FIG. 50 is an explanatory view showing the clip of the fourteenth embodiment engaging an upper member.

An engaging portion 731 for engaging the wire 712 with the upper member 710 is provided on the outer surfaces of the side wall 724B of the first portion 717. The upper member 710 has a plurality of engaging holes 732 for engaging the clips 713 in the front wall portion 710A thereof. As shown in FIG. 50, in the illustrated embodiment, an engaging hole 732 is formed in each of the left and right portions of the front wall portion 710A of the upper member 710. Each engaging hole 732 is formed in the upper member 710 so as to be passed through in the fore and aft direction. The engaging portion 731 is flexible and made of resin, for example. The engaging portion 731 includes a support portion (pillar portion) 733 that extends substantially perpendicularly from the outer surface of the side wall 724B of the first portion 717, and a plurality of elastic claws 734 projecting from the tip end 733B of the support portion 733 toward the base end 733A of the support portion 733. In the illustrated embodiment, a pair of elastic claws 734 are formed symmetrically with respect to the support portion 733, and arranged along the first axis A1. Each elastic claw 734 has a base portion 734A provided at the tip end 733B of the support portion 733. Each elastic claw 734 extends away from the outer peripheral surface of the support portion 733 as one moves from the base portion 734A toward the base end 733A, and has a free end portion 734B.

The clip 713 is fixed to the upper member 710 by passing the support portion 733 along with the elastic claws 734 through the engaging hole 732 until the free end portions 734B of the elastic claws 734 abut the back surface of the upper member 710.

The procedure for fixing the wire 712 to the upper member 710 is described in the following. First, the worker places the clip 713 behind the bend 714 of the wire 712 so that the third groove 728 opens forward and extends laterally. Then, the worker receives the bend 714 of the wire 712 in the third groove 728 from the front. Subsequently, the worker rotates the clip 713 about an axis extending through the third groove 728 in the fore and aft direction. As a result, the first rod part 715 enters the first groove 724 and the second rod part 716 enters the second groove 727. At this time, the first rod part 715 passes between the first projecting portions 729, and the second rod part 716 passes between the second projecting portions 730. As a result, the first rod part 715 is interposed between the first projecting portions 729 and is fixedly secured, and the second rod part 716 is interposed between the second projecting portions 730 and is fixedly secured. As a result, clip 713 is connected to the wire 712.

Next, the worker inserts the engaging portion 731 of the clip 713 with the wire 712 engaged thereto into the engaging hole 732. Thereby, clip 713 is fixed to upper member 710.

The wire 712 includes the first rod part 715 and the second rod part 716 with the bend 714 located therebetween, and the first rod part 715 is retained in the first groove 724 of the clip 713 while the second rod part 716 is retained in the second groove 727 of the clip 713. Thereby, the clip 713 can be positioned relative to the wire 712 with ease so that the assembly work is facilitated. The first groove 724 and the second groove 727 are opened in different directions. Since the opening width of the first groove 724 is narrower than the diameter of the first rod part 715 owing to the presence of the first projecting portions 729, and the opening width of the second groove 727 is narrower than the diameter of the second rod part 716 owing to the presence of the second projecting portions 730, the clip 713 is prevented from being dislodged from the wire 712.

The side surfaces 724D forming the open end of the first groove 724 are inclined so as to come closer to each other toward the bottom portion 724A of the first groove 724, and the side surfaces 727D forming the open end of the second groove 727 are inclined so as to come closer to each other toward the bottom 727A of the second groove 727. Owing to this configuration of the side surfaces 724D and 727D, the wire 712 can be easily received by the first groove 724 and the second groove 727 by the worker pushing the wire 712 into the first groove 724 and the second groove 727.

The third groove 728 is defined by the connecting portion 719, the second end surface 723, and the third end surface 725, and the first groove 724 and the second groove 727 are open toward the third groove 728 along the extending direction of the third groove 728. Owing to this structure, the worker can easily fit the first rod part 715 and the second rod part 716 into the first groove 724 and the second groove 727, respectively, by inserting the bend 714 of the wire 712 in the third groove 728 from the front, and then rotating the clip 713 around the axis that passes through the third groove 728 and extends in the fore and aft direction. Since the angle formed by the first axis A1 and the second axis A2 is set equal to the tilt angle α between the first rod part 715 and the second rod part 716, the clip 713 can be easily positioned with respect to the wire 712 by using a simple structure. The front wall portion 710A of the upper member 710 is provided with the engaging hole 732 so that the engaging portion 731 provided in the first portion 717 of the clip 713 can be inserted into the engaging hole 732 from the front.

Fifth Embodiment

Figure 51:
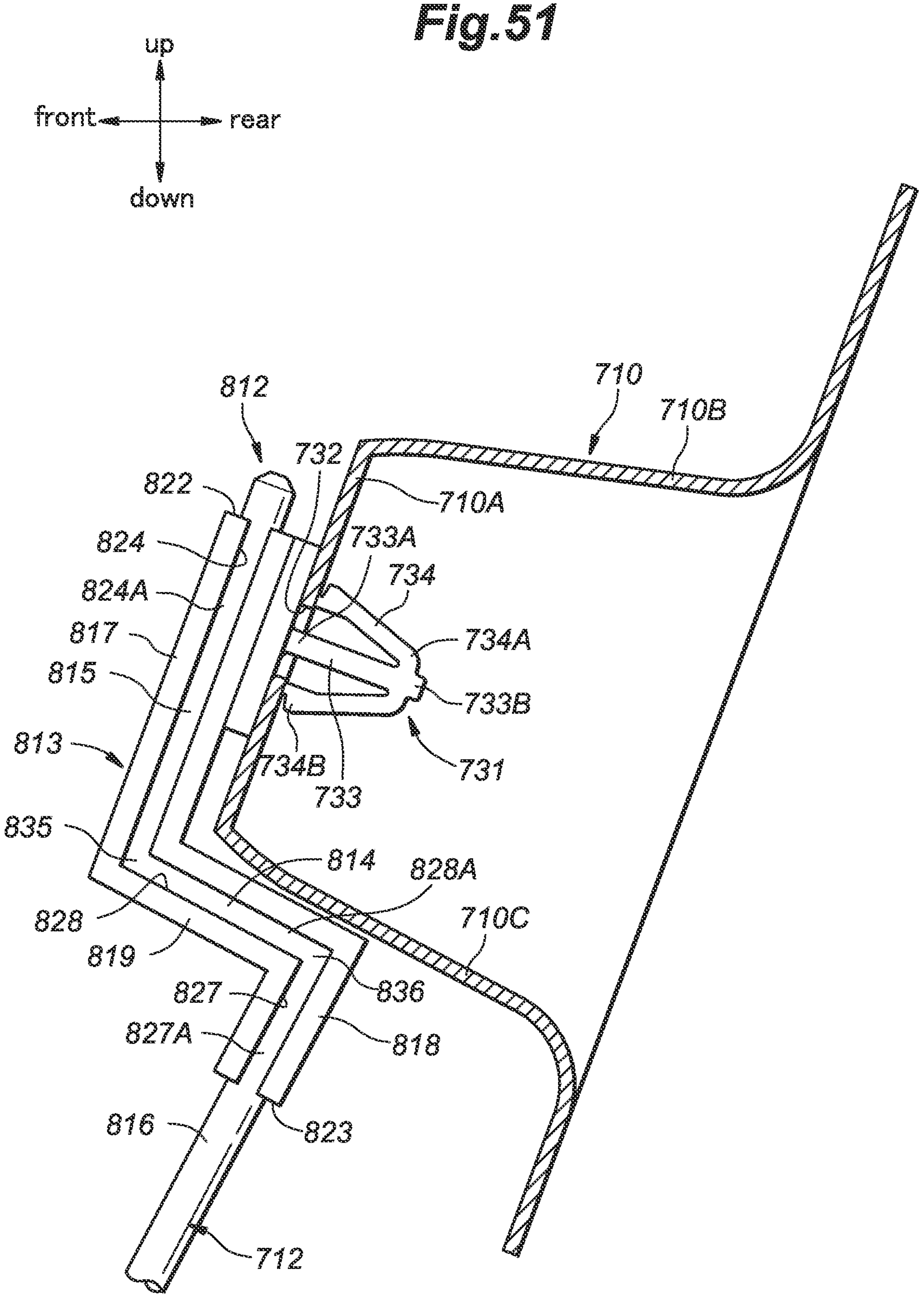
FIG. 51 is an explanatory view showing a clip according to a fifteenth embodiment of the present invention engaging an upper member.

A clip and a vehicle seat according to a fifteenth embodiment of the present invention will be described in the following with reference to FIG. 51. In FIG. 51, the parts corresponding to those in FIG. 50 are denoted by like reference numerals, and such parts may be omitted in the following description.

The upper part of each wire 712 has a first bend 835 that is bent rearward by approximately 90 degrees and a second bend 836 that is bent downward by approximately 90 degrees. The wire 712 has a first rod part 815, a second rod part 816 and an intermediate rod part 814 which are connected together by the first bend 835 and the second bend 836. The first rod part 815 is positioned above the first bend 835 and extends linearly vertically. The intermediate rod part 814 is positioned between the first bend 835 and the second bend 836, is connected substantially perpendicularly to the first rod part 815, and extends linearly in the fore and aft direction. The second rod part 816 is positioned below the second bend 836, is connected substantially perpendicularly to the intermediate rod part 814, and extends linearly vertically.

A clip 813 according to the fifteenth embodiment includes a first portion 817 extending in the same direction as the first rod part 815, a connecting portion 819 extending in the same direction as the intermediate rod part 814, and a second portion 818 extending in the same direction as the second rod part 816, all directly and integrally connected to each other. The clip 813 thus has a crank-shape conforming to the upper part of the wire 712. The first portion 817, the connecting portion 819, and the second portion 818 are each provided with an external shape which is, for example, a rectangular parallelepiped, a cylinder, or the like.

The first portion 817 has a fifth end surface 822 at one end along the own axis, and is connected to an end of the connecting portion 819 at the other end. The second portion 818 has an end connected to the other end of the connecting portion 819 and has a sixth end surface 823 at the other end.

The first portion 817 has a first groove 824 extending along the own axis. The first groove 824 has a slotted opening 824A and receives the first rod part 815 therein. The second portion 818 has a second groove 827 extending along the own axis. The second groove 827 has a slotted opening 827A and receives the second rod part 816 therein. The connecting portion 819 has a third groove 828 extending along the own axis. The third groove 828 has a slotted opening 828A, and receives the intermediate rod part 814 therein. The first groove 824, the second groove 827 and the third groove 828 extend continuously from one to the other via connecting portions corresponding to the first bend 835 and the second bend 836. The first groove 824, the second groove 827 and the third groove 828 may have substantially the same shape as the first groove 724 of the fourteenth embodiment.

An engaging portion 731 is provided on the first portion 817.

The procedure for fixing the wire 712 to the upper member 710 will be described in the following. The worker pushes the first rod part 815 into the first groove 824, the second rod part 816 into the second groove 827, and the intermediate rod part 814 into the third groove 828 from the front. As a result, the first portion 817 is fixed to the first rod part 815, the second portion 818 to the second rod part 721, and the connecting portion 819 to the intermediate rod part 814, respectively, with the result that the clip 813 is secured to the wire 712.

Next, the worker inserts the engaging portion 731 of the clip 813 with the wire 712 connected thereto into the engaging hole 732. Thereby, the clip 813 is fixed to upper member 710.

The clip 813 is thus fixed to the wire 712 in a stable manner owing to the manner in which the first rod part 815 is received by the first groove 824, the second rod part 816 is received by the second groove 827, and the intermediate rod part 814 is received by the third groove 828.

Sixteenth Embodiment

Figure 52:
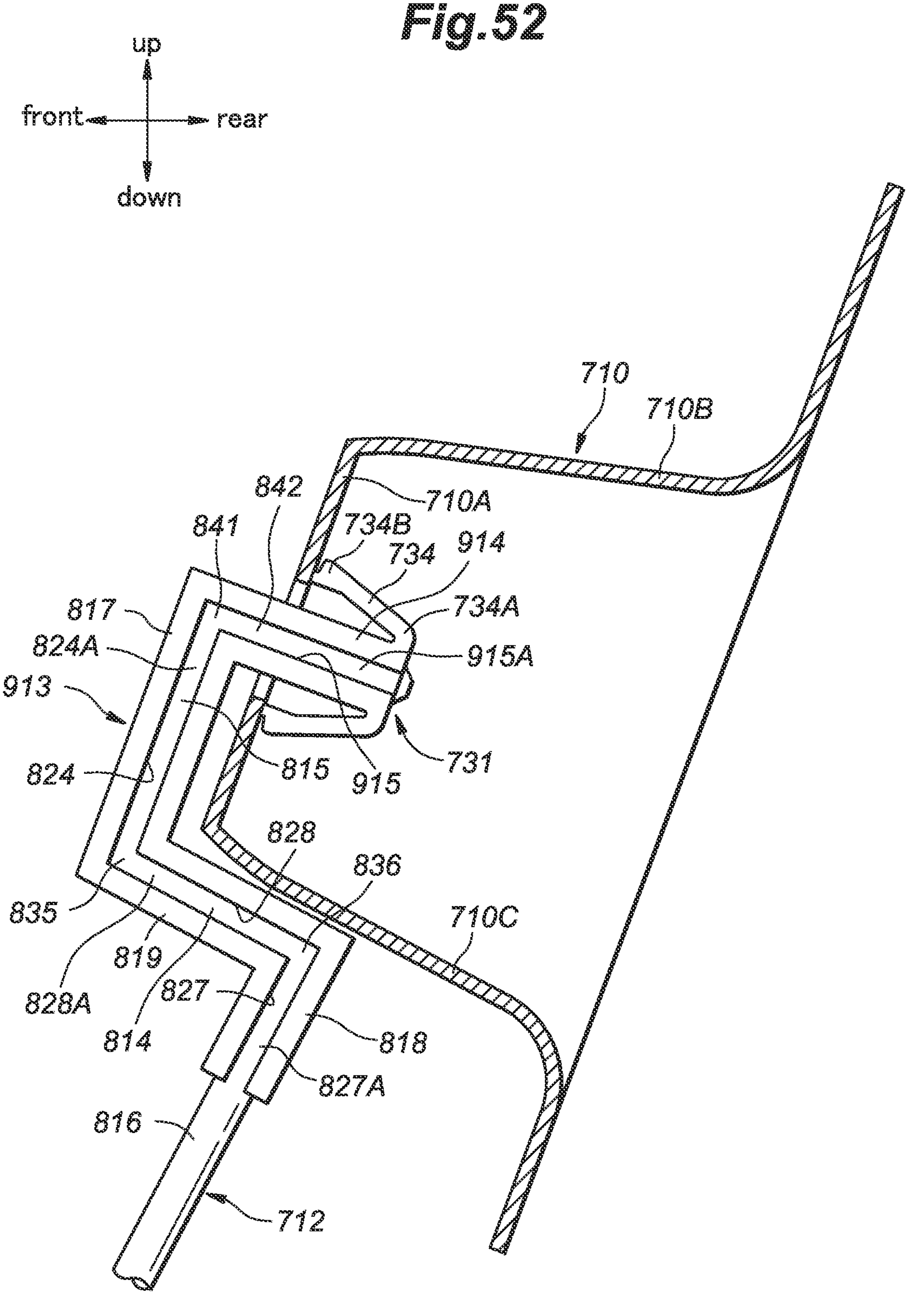
FIG. 52 is an explanatory view showing a clip according to a sixteenth embodiment of the present invention engaging an upper member.

A clip and vehicle seat according to a sixteenth embodiment of the present invention will be described in the following with reference to FIG. 52. In FIG. 52, the parts corresponding to those in FIG. 51 are denoted by like reference numerals, and such parts may be omitted in the following description.

The wire 712 further has a fourth rod part 842 extending rearward from the upper end of the first rod part 815 via a third bend 841.

The clip 913 according to the sixteenth embodiment further has a fourth portion 914 extending from the upper end of the first portion 817 in the same direction as the fourth rod part 842. The fourth portion 914 has a fourth groove 915 extending along the axial direction of the fourth portion 914. The fourth groove 915 has a slotted opening 915A to receive the first rod part 815. The fourth groove 915 is connected to the first groove 824. The fourth groove 915, similarly to the first groove 824, may have substantially the same shape as the first groove 724 of the fourteenth embodiment.

The clip 913 has an engaging portion 731 integrally formed at the tip of the fourth portion 914.

The procedure for fixing the wire 712 to the upper member 710 will be described in the following. The worker inserts the first rod part 815 into the first groove 824, the second rod part 816 into the second groove 827, the intermediate rod part 814 into the third groove 828, and the fourth rod part 842 into the fourth groove 915 by pushing these rod parts from the front until these rod parts are fully received in the corresponding grooves. As a result, the first portion 817 is connected to the first rod part 815, the second portion 818 is connected to the second rod part 721, the connecting portion 819 is connected to the intermediate rod part 814, and the fourth portion 914 is connected to the fourth rod part 842 with the result that the clip 813 is firmly secured to the wire 712.

Next, the worker inserts the fourth rod part 842 and the engaging portion 731 of the clip 913 with the wire 712 fixed thereto into the engaging hole 732 from the front. At this time, the fourth rod part 842 also passes through the engaging hole 732 at the same time as the engaging portion 731 is inserted into the engaging hole 732. Thereby, the clip 813 is fixed to upper member 710.

The first rod part 815 is received in the first groove 824, the second rod part 716 in the second groove 827, the intermediate rod part 814 in the third groove 828, and the fourth rod part 842 in the third groove 828 so that the clip 913 is connected to the wire 712 in a stable manner. Since the engaging portion 731 is provided at the tip of the fourth portion 914, the fourth portion 914 serves as the support portion 733 of the fourteenth embodiment so that there is no need to provide a separate support portion 733. Thereby, the structure of the clip 813 can be simplified.

Seventeenth Embodiment

Figure 53:
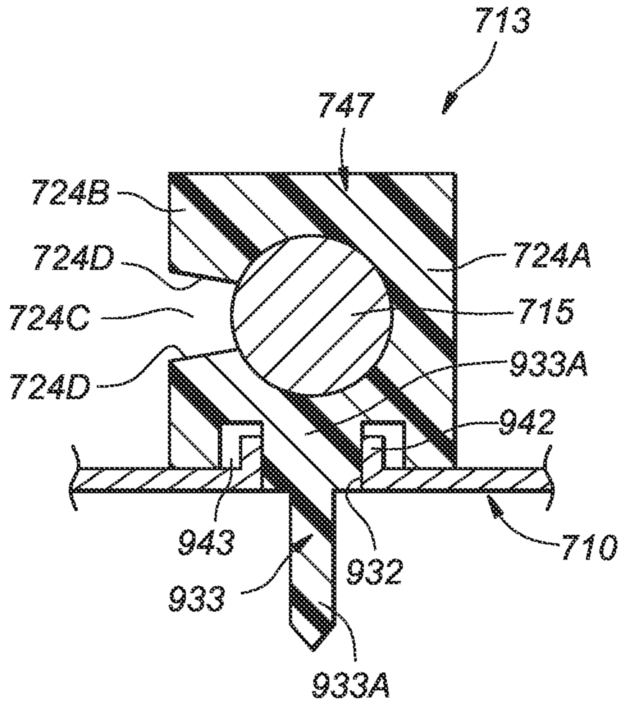
FIG. 53 is a sectional view of a clip according to a seventeenth embodiment of the present invention.

A clip according to a seventeenth embodiment of the present invention will be described in the following with reference to FIG. 53. In FIG. 53, the parts corresponding to those in FIG. 48 are denoted by like reference numerals, and such parts may be omitted in the following description.

As shown in FIG. 53, the upper member 710 has a cylindrical protruding portion 942 on the edge of the engaging hole 932. The protruding portion 942 projects forward from the edge of the engaging hole 932. The protruding portion 942 may be, for example, a burr that is produced when the engaging hole 932 is drilled from the rear side of the upper member 710 with a drill.

The first portion 717B of the clip 713 has a columnar support portion 933 protruding outward from the outer surface and a fifth groove 943 annularly formed around the support portion 933 on the outer surface. The support portion 933 has a large-diameter portion 933A that fits into the engaging hole 932 on the base end side, and a sharpened small-diameter portion 933B that is smaller in diameter than the large-diameter portion 933A on the free end side. The protruding portion 942 is prevented from interfering with the first portion 717B by the fifth groove 943.

The clip 713 is fixed to the upper member 710 by inserting the large-diameter portion 933A of the support portion 933 into the engaging hole 932. The clip 713 according to the seventeenth embodiment has a simpler structure than the clips 713 according to the fifteenth and sixteenth embodiments.

Not all of the constituent elements shown in the above embodiments are essential to the broad concept of the present invention, and they can be appropriately selected, omitted and substituted without departing from the gist of the present invention.

| LIST OF REFERENCE NUMERALS |
| --- |
| 1: motion sickness preventing system |
| 2: vehicle |
| 3: vehicle cabin |
| 4: floor |
| 5: ceiling |
| 10: seat device |
| 12: slide rail device |
| 20: seat main body |
| 22: seat cushion |
| 22A: foam pad |
| 23: slit |
| 24: electric reclining device |
| 25: bolster part |
| 25A: foam pad |
| 26: seat back |
| 27: slit |
| 28: headrest |
| 30: air cell (vibration generator) |
| 32: air cell (vibration generator) |
| 34: resin sheet |
| 36: resin sheet |
| 50: control unit |
| 52: input unit |
| 54: arithmetic processing unit |
| 56: output unit |
| 58: air cell control unit |
| 60: acceleration sensor (behavior detection unit) |
| 62: steering angle sensor (behavior detection unit) |
| 64: vehicle speed sensor |
| 66: tilt angle sensor (tilt angle detection unit) |
| 70: navigation device |
| 101: preventing system |
| 130: left speaker |
| 130A: sound output unit |
| 132: right speaker |
| 132A: sound output unit |
| 158: speaker control unit |
| 203: front light emitting device |
| 204: roof light emitting device |
| 226: left (right) light emitting |
| 229: main part |
| 230: post |
| 232: air cell |
| 233: neck support portion |
| 240: upper member |
| 242: lower member |
| 242A: opening |
| 244: guide rail |
| 245: bracket |
| 246: guide rail |
| 248: linear actuator |
| 249: operating rod |
| 258: air cell control unit |
| 305: front seat |
| 306: rear seat |

-continued

| LIST OF REFERENCE NUMERALS |
| --- |
| 308: seat cushion |
| 309: seat back |
| 310: headrest |
| 311: slide rail |
| 312: instrument panel |
| 313: front door |
| 314: rear door |
| 315: door trim |
| 315P: door pocket |
| 316: door trim |
| 316P: door pocket |
| 317: windshield |
| 318: front pillar |
| 321: vehicle behavior sensor |
| 321A: acceleration sensor |
| 321B: 6-axis inertial sensor |
| 321C: steering angle sensor |
| 321D: accelerator sensor |
| 321E: brake sensor |
| 321F: vehicle speed sensor |
| 322: light emitting device |
| 324: control unit |
| 326: left (right) light emitting device |
| 327: front (rear) light emitting device |
| 328: auxiliary light emitting device |
| 328A: left auxiliary light emitting portion |
| 328B: right auxiliary light emitting portion |
| 329: front light emitting device |
| 331: seat back light emitting device |
| 331A: light emitting device |
| 331B: light emitting region |
| 332: dashboard light emitting device |
| 332A: light emitting device |
| 333: roof light emitting device |
| 335: trim lower edge light emitting device |
| 341: floor light emitting device |
| 341A: light emitting device |
| 341B: light emitting region |
| 342: door light emitting device |
| 342A: light emitting device |
| 343: pillar light emitting device |
| 343A: light emitting device |
| 345: front door light emitting device |
| 345A: light emitting device |
| 345M: primary front door light emitting portion |
| 345S: auxiliary front door light emitting portion |
| 346: rear door light emitting device |
| 346A: light emitting device |
| 346M: main rear door light emitting portion |
| 346S: auxiliary rear door light emitting portion |
| 350: prediction device |
| 352: navigation device |
| 400: motion sickness preventing system |
| 405: front seat |
| 406: rear seat |
| 410: seat cushion |
| 411: seat back |
| 412: headrest |
| 413: navigation device |
| 415: vehicle behavior sensor |
| 415A: 6-axis inertial sensor |
| 415B: 3-axis inertial sensor |
| 415C: acceleration sensor |
| 415D: vehicle speed sensor |
| 415E: steering angle sensor |
| 415F: accelerator sensor |
| 415G: brake sensor |
| 416: control unit |
| 417: terminal device |
| 421: processing device |
| 422: RAM |
| 423: ROM |
| 424: storage device |
| 425: GPS receiver |
| 426: touch panel |
| 427: screen |
| 427A: application execution screen |

-continued

| LIST OF REFERENCE NUMERALS |
| --- |
| 440: illuminated area |
| 450: biosensor |
| 460: tablet terminal device |
| 611: listing edge |
| 612: first edge portion |
| 613: second edge portion |
| 614: listing member |
| 615: substrate |
| 616: engaging member |
| 617: deformable portion |
| 618: marking |
| 619: marking |
| 620: sewing line |
| 621: locking claw |
| 625: pad |
| 626: skin member |
| 627: listing portion |
| 629: listing groove |
| 701: vehicle seat |
| 704: seat cushion frame |
| 705: cushion side member |
| 706: front member |
| 707: seat back frame |
| 708: pressure receiving member |
| 709: back side member |
| 710: upper member |
| 710A: front wall portion |
| 710B: upper wall portion |
| 710C: lower wall portion |
| 711: lower member |
| 712: wire |
| 713: clip |
| 714: bending portion |
| 715: first rod part |
| 716: second rod part |
| 717: first portion |
| 717 B: first portion |
| 718: second portion |
| 719: connecting portion |
| 721: second rod part |
| 722: first end surface |
| 723: second end surface |
| 724: first groove |
| 724A: bottom portion |
| 724B: side wall |
| 724C: slotted opening |
| 724D: side surface |
| 725: third end surface |
| 726: fourth end surface |
| 727: second groove |
| 727A: bottom portion |
| 727B: side wall |
| 727C: slotted opening |
| 727D: side surface |
| 728: third groove |
| 729: first projecting portion |
| 730: second projecting portion |
| 731: engaging portion |
| 732: engagement hole |
| 733: support portion |
| 733A: base end |
| 733B: tip |
| 734: elastic claw |
| 734A: base portion |
| 734B: free end portion |
| 813: clip |
| 814: intermediate rod part |
| 815: first rod part |
| 816: second rod part |
| 817: first part |
| 818: second part |
| 819: connection part |
| 822: fifth end surface |
| 823: sixth end surface |
| 824: first groove |
| 824A: slotted opening |
| 827: second groove |

-continued

| LIST OF REFERENCE NUMERALS |
| --- |
| 827A: slotted opening |
| 828: third groove |
| 828A: slotted opening |
| 835: first curved portion |
| 836: second curved portion |
| 841: third curved portion |
| 842: fourth rod part |
| 913: clip |
| 914: fourth portion |
| 915: fourth groove |
| 915A: slotted opening |
| 932: engagement hole |
| 933: support portion |
| 933A: large diameter portion |
| 933B: small diameter portion |
| 942: protruding portion |
| 943: fifth groove |
| 1311L: left illumination portion |
| 1311R: right illumination portion |
| 1313: left (right) light emitting device |
| 1315: light emitting region |
| 1317: front (rear) light emitting device |

The invention claimed is:

1. A vehicle seat device comprising a seat main body provided with a seat cushion and a seat back connected to a rear part of the seat cushion so as to be able to change a tilt angle thereof about a horizontal axis, wherein the vehicle seat device further comprises:

a plurality of vibration generators provided in the seat cushion and the seat back and configured to apply a vibrational stimulus to a seated occupant;

a tilt angle detection unit for detecting the tilt angle of the seat back relative to the seat cushion;

a behavior detection unit for detecting a behavior of the vehicle; and a control unit configured to receive the tilt angle detected by the tilt angle detection unit and information on the behavior of the vehicle detected by the behavior detection unit, and activate the vibration generators of the seat cushion and the seat back when the vehicle behavior that is received meets a prescribed behavior criterion in such a manner that the vibration generators of the seat cushion vibrate with a greater intensity than the vibration generators of the seat back when the tilt angle is less than a predetermined value, and the vibration generators of the seat back vibrate with a greater intensity than the vibration generators of the seat cushion when the tilt angle is equal to or greater than the predetermined value.

2. The vehicle seat device according to claim 1, wherein the behavior detection unit includes an acceleration detection unit for detecting an acceleration of the vehicle, and the control unit causes an intensity of the vibration generated by the vibration generators to be greater as the acceleration increases.

3. The vehicle seat device according to claim 2, wherein the vehicle seat device further includes a vehicle speed detection unit for detecting a traveling speed of the vehicle, and the control unit increases the intensity of the vibration according to the detected traveling speed.

4. The vehicle seat device according to claim 2, wherein the vibration generators are configured to adjust the intensity of the vibration by changing at least one of an amplitude and a frequency of the vibration.

5. The vehicle seat device according to claim 1, wherein the behavior detection unit includes a steering angle detection unit for detecting a steering angle of the vehicle, and the control unit causes an intensity of the vibration generated by the vibration generators to be greater as the steering angle increases.

6. The vehicle seat device according to claim 1, wherein the control unit includes an input unit that accepts an input of navigation information including current location information of the vehicle and travel route information of the vehicle on map data from a navigation device mounted on the vehicle, and the control unit causes an intensity of the vibration generated by the vibration generators to be greater when a curvature of a road on the travel route at a current location or a predetermined distance ahead of the current location is equal to or greater than a predetermined value than when the curvature is less than the predetermined value.

7. The vehicle seat device according to claim 1, wherein the vibration generators are arranged laterally, and the information on the behavior of the vehicle includes information about a turning direction of the vehicle, the control unit intensifying the vibration of the vibration generators on a side toward which the vehicle is turning to be greater than the vibration of the vibration generators on a side away from which the vehicle is turning.

8. The vehicle seat device according to claim 1, wherein the vibration generators provided on the seat cushion include one that applies a vibration stimulation to a hip of the seat occupant.

9. The vehicle seat device according to claim 1, wherein the vibration generators include air cells that are selectively inflated by being supplied with compressed air.

* * * * *